(12) United States Patent
Dubin et al.

(10) Patent No.: US 11,741,760 B1
(45) Date of Patent: Aug. 29, 2023

(54) MANAGING A PLURALITY OF PHYSICAL ASSETS FOR REAL TIME VISUALIZATIONS

(71) Applicant: Samsara Inc., San Francisco, CA (US)

(72) Inventors: Hannah Dubin, San Francisco, CA (US); Kevin Omwega, Austin, TX (US); Jeremy Intal, East Aurora, NY (US); Alan Liu, London (GB); Ewelina Sieradzka, San Francisco, CA (US)

(73) Assignee: Samsara Inc., San Francisco, CA (US)

( * ) Notice: Subject to any disclaimer, the term of this patent is extended or adjusted under 35 U.S.C. 154(b) by 0 days.

(21) Appl. No.: 17/664,002

(22) Filed: May 18, 2022

Related U.S. Application Data

(60) Provisional application No. 63/363,100, filed on Apr. 15, 2022.

(51) Int. Cl.
*G07C 5/00* (2006.01)
*G06F 3/0482* (2013.01)
(Continued)

(52) U.S. Cl.
CPC .......... *G07C 5/008* (2013.01); *G06F 3/0482* (2013.01); *G06T 11/00* (2013.01); *G07C 5/006* (2013.01); *G07C 5/06* (2013.01); *G07C 5/0825* (2013.01); *G07C 5/12* (2013.01); *G08G 1/13* (2013.01); *G06Q 50/30* (2013.01); *G06T 2200/24* (2013.01)

(58) Field of Classification Search
CPC .......... G07C 5/008; G07C 5/006; G07C 5/06; G07C 5/0825; G07C 5/12; G06F 3/0482; G06T 11/00; G06T 2200/24; G08G 1/13; G06Q 50/30

USPC .......................................................... 340/990
See application file for complete search history.

(56) References Cited

U.S. PATENT DOCUMENTS 5,917,433 A 6/1999 Keillor et al.
6,157,864 A 12/2000 Schwenke et al.
(Continued)

OTHER PUBLICATIONS

Elias N. Malamas et al. "A survey on industrial vision systems, applications and tools", Sep. 17, 2002, Image and Vision Computing 21, pp. 171-188.
(Continued)

*Primary Examiner* — Omar Casillashernandez
(74) *Attorney, Agent, or Firm* — Knobbe, Martens, Olson & Bear, LLP

(57) ABSTRACT

A management server system may obtain sensor data generated by a plurality of sensors from a plurality of gateway devices. The sensor data may be associated with a plurality of vehicles. The management server system may identify, for each vehicle of the plurality of vehicles, a subset of the sensor data associated with a particular vehicle. The management server system may generate, in real time, for each vehicle of the plurality of vehicles, a virtual representation of the particular vehicle based on the subset of the sensor data associated with the particular vehicle. The management server system may generate a user interface that includes visualizations of virtual representations of the plurality of vehicles. The management server system may update, in real time, the visualizations of the virtual representations of the plurality of vehicles based on obtaining additional sensor data from the plurality of gateway devices.

20 Claims, 28 Drawing Sheets

(51) Int. Cl.
  *G06T 11/00* (2006.01)
  *G07C 5/12* (2006.01)
  *G07C 5/06* (2006.01)
  *G08G 1/13* (2006.01)
  *G07C 5/08* (2006.01)
  *G06Q 50/30* (2012.01)

(56) References Cited

U.S. PATENT DOCUMENTS

| | | |
|---|---|---|
| 6,452,487 B1 | 9/2002 | Krupinski |
| 6,801,920 B1 | 10/2004 | Wischinski |
| 7,596,417 B2 | 9/2009 | Fister et al. |
| 7,957,936 B2 | 6/2011 | Eryurek et al. |
| 8,633,672 B2 | 1/2014 | Jung et al. |
| 9,024,744 B2 | 5/2015 | Klose et al. |
| 9,230,250 B1 | 1/2016 | Parker et al. |
| 9,445,270 B1 | 9/2016 | Bicket et al. |
| 9,477,639 B2 | 10/2016 | Fischer et al. |
| 10,033,706 B2 | 7/2018 | Bicket et al. |
| 10,085,149 B2 | 9/2018 | Bicket et al. |
| 10,102,495 B1 | 10/2018 | Zhang et al. |
| 10,173,486 B1 | 1/2019 | Lee et al. |
| 10,173,544 B2 | 1/2019 | Hendrix et al. |
| 10,196,071 B1 | 2/2019 | Rowson et al. |
| 10,206,107 B2 | 2/2019 | Bicket et al. |
| 10,388,075 B2 | 8/2019 | Schmirler et al. |
| 10,390,227 B2 | 8/2019 | Bicket et al. |
| 10,444,949 B2 | 10/2019 | Scott et al. |
| 10,579,123 B2 | 3/2020 | Tuan et al. |
| 10,609,114 B1* | 3/2020 | Bicket .................. H04L 67/02 |
| 10,623,899 B2 | 4/2020 | Watkins et al. |
| 10,827,324 B1* | 11/2020 | Hajimiri ............... H04W 4/029 |
| 10,843,659 B1* | 11/2020 | Innocenzi ............... H04W 4/48 |
| 11,046,205 B1 | 6/2021 | Govan et al. |
| 11,122,488 B1 | 9/2021 | Lloyd et al. |
| 11,126,910 B1 | 9/2021 | Akhtar et al. |
| 11,127,130 B1 | 9/2021 | Jain et al. |
| 11,128,130 B2 | 9/2021 | Jain et al. |
| 11,131,986 B1 | 9/2021 | Gal et al. |
| 11,132,853 B1 | 9/2021 | Akhtar et al. |
| 11,137,744 B1 | 10/2021 | Heddleston et al. |
| 11,158,177 B1 | 10/2021 | ElHattab et al. |
| 11,184,422 B1 | 11/2021 | Bicket et al. |
| 11,188,046 B1 | 11/2021 | ElHattab et al. |
| 11,190,373 B1 | 11/2021 | Stevenson et al. |
| 11,341,786 B1 | 5/2022 | Calmer et al. |
| 11,349,901 B1 | 5/2022 | Duffield et al. |
| 11,352,013 B1 | 6/2022 | Srinivasan et al. |
| 11,352,014 B1 | 6/2022 | Srinivasan et al. |
| 11,356,605 B1 | 6/2022 | Shemet et al. |
| 11,356,909 B1 | 6/2022 | Lloyd |
| 11,365,980 B1 | 6/2022 | Akhtar et al. |
| 11,386,325 B1 | 7/2022 | Srinivasan et al. |
| 11,451,610 B1 | 9/2022 | Saunders et al. |
| 11,451,611 B1 | 9/2022 | Saunders et al. |
| 11,479,142 B1 | 10/2022 | Govan et al. |
| 2002/0061758 A1 | 5/2002 | Zarlengo et al. |
| 2002/0169850 A1 | 11/2002 | Batke et al. |
| 2005/0286774 A1 | 12/2005 | Porikli |
| 2006/0167591 A1 | 7/2006 | McNally |
| 2008/0319602 A1 | 12/2008 | McClellan et al. |
| 2009/0240427 A1 | 9/2009 | Siereveld et al. |
| 2010/0049639 A1 | 2/2010 | Ferro et al. |
| 2011/0276265 A1 | 11/2011 | Husain |
| 2012/0201277 A1 | 8/2012 | Tanner et al. |
| 2012/0235625 A1 | 9/2012 | Takehara |
| 2012/0303397 A1 | 11/2012 | Prosser |
| 2013/0162421 A1 | 6/2013 | Inaguma et al. |
| 2013/0211559 A1 | 8/2013 | Lawson et al. |
| 2013/0244210 A1 | 9/2013 | Nath et al. |
| 2013/0312509 A1* | 11/2013 | Solomon ............. B60C 23/0486<br>73/146.4 |
| 2014/0012492 A1 | 1/2014 | Bowers et al. |
| 2014/0095061 A1 | 4/2014 | Hyde |
| 2014/0098060 A1 | 4/2014 | McQuade et al. |
| 2014/0195106 A1 | 7/2014 | McQuade et al. |
| 2014/0278108 A1 | 9/2014 | Kerrigan et al. |
| 2014/0328517 A1 | 11/2014 | Gluncic |
| 2014/0337429 A1 | 11/2014 | Asenjo et al. |
| 2014/0354227 A1 | 12/2014 | Tyagi et al. |
| 2014/0354228 A1 | 12/2014 | Williams et al. |
| 2015/0044641 A1 | 2/2015 | Chauncey et al. |
| 2015/0074091 A1 | 3/2015 | Walkin et al. |
| 2015/0226563 A1 | 8/2015 | Cox et al. |
| 2015/0283912 A1 | 10/2015 | Shimizu et al. |
| 2016/0275376 A1 | 9/2016 | Kant |
| 2016/0288744 A1 | 10/2016 | Rutherford et al. |
| 2016/0294819 A1* | 10/2016 | Salm .................. H04L 63/0853 |
| 2016/0343091 A1 | 11/2016 | Han et al. |
| 2016/0375780 A1 | 12/2016 | Penilla et al. |
| 2017/0039784 A1 | 2/2017 | Gelbart et al. |
| 2017/0060726 A1 | 3/2017 | Glistvain |
| 2017/0102463 A1 | 4/2017 | Hwang |
| 2017/0123397 A1 | 5/2017 | Billi et al. |
| 2017/0140603 A1 | 5/2017 | Ricci |
| 2017/0195265 A1 | 7/2017 | Billi et al. |
| 2017/0263049 A1 | 9/2017 | MacDonald et al. |
| 2017/0278004 A1 | 9/2017 | McElhinney et al. |
| 2017/0286838 A1 | 10/2017 | Cipriani et al. |
| 2017/0291611 A1 | 10/2017 | Innes et al. |
| 2017/0332199 A1 | 11/2017 | Elliott et al. |
| 2017/0345283 A1 | 11/2017 | Kwon et al. |
| 2017/0366935 A1 | 12/2017 | Ahmadzadeh et al. |
| 2018/0001771 A1 | 1/2018 | Park et al. |
| 2018/0012196 A1 | 1/2018 | Ricci et al. |
| 2018/0025636 A1 | 1/2018 | Boykin et al. |
| 2018/0063576 A1 | 3/2018 | Tillman et al. |
| 2018/0093672 A1 | 4/2018 | Terwilliger et al. |
| 2018/0234514 A1 | 8/2018 | Rajiv et al. |
| 2018/0262724 A1 | 9/2018 | Ross |
| 2018/0356800 A1 | 12/2018 | Chao et al. |
| 2018/0364686 A1 | 12/2018 | Naidoo et al. |
| 2019/0003848 A1* | 1/2019 | Hoten ................ G01C 21/3644 |
| 2019/0118655 A1 | 4/2019 | Grimes et al. |
| 2019/0174158 A1 | 6/2019 | Herrick et al. |
| 2019/0244301 A1 | 8/2019 | Seth et al. |
| 2019/0286948 A1 | 9/2019 | Sathyanarayana et al. |
| 2019/0318419 A1* | 10/2019 | VanderZanden ....... G08G 1/005 |
| 2019/0327590 A1 | 10/2019 | Kubo et al. |
| 2019/0327613 A1 | 10/2019 | Bicket et al. |
| 2020/0074397 A1 | 3/2020 | Burda et al. |
| 2020/0139847 A1 | 5/2020 | Baumer et al. |
| 2020/0150739 A1 | 5/2020 | Tuan et al. |
| 2020/0162489 A1 | 5/2020 | Bar-Nahum et al. |
| 2020/0342230 A1 | 10/2020 | Tsai et al. |
| 2020/0342235 A1 | 10/2020 | Tsai et al. |
| 2020/0342274 A1 | 10/2020 | ElHattab et al. |
| 2020/0342506 A1 | 10/2020 | Levy et al. |
| 2020/0342611 A1 | 10/2020 | ElHattab et al. |
| 2020/0344301 A1* | 10/2020 | ElHattab ................. G06V 20/40 |
| 2020/0371773 A1 | 11/2020 | Kato et al. |
| 2020/0389415 A1 | 12/2020 | Zhao et al. |
| 2021/0006950 A1 | 1/2021 | Hajimiri et al. |
| 2021/0352438 A1* | 11/2021 | Ford .................... H04W 4/029 |
| 2022/0108260 A1 | 4/2022 | DaCosta et al. |

OTHER PUBLICATIONS

*Interval Licensing LLC v. AOL, Inc., Apple, Inc., Google LLC, Yahoo!, Inc.*, United States Court of Appeals for the Federal Circuit, Jul. 20, 2018, pp. 9-18.

* cited by examiner

Eco-Driving Report

Summary
Feb 6 - Feb 7

[Day ▾] [< Feb 6 Feb 7 >] [Live] [show as] [grades ▾] [more actions ▾]

838 — (F)

840:
- Cruise Central — E — Green Band — F
- Anticipation — F — Coasting (any gear) — E
- High Engine Torque — D — Idling — G

Total Driving Time
1177h 53m

Total Engine on Time
1231h 6m

Drivers / Vehicles

[Search Drivers] [Tags ▾]   182 drivers from Feb 4, 2020 4:04PM - Feb 7, 2020 4:04 PM

| DRIVER | OUTBILL® | Cruise Control ◆ | COASTING (ANY GEAR) ◆ | HIGH ENGINE TORQUE ◆ | IDLING ◆ | ANTICIPATION ◆ | COXXN BAND ◆ | TOTAL DRIVING TIME ◆ | TOTAL ENGINE ON TIME ◆ |
|---|---|---|---|---|---|---|---|---|---|
| 1 | (F) | G | F | A | G | G | G | 3m 33s | 7m 4s |
| 3 | (D) 836 C | C | B | B | D | G | E | 6h 35m | 6h 41m |
| 6 | (F) | F | E | G | G | F | G | 5h 31m | 6h 22m |
| 4 | (E) | F | B | F | A | F | F | 27m 24s | 21m 24s |
| 2 | (F) | G | E | G | G | A | G | 1h 21m | 1h 30m |

FIG. 8B

Fuel & Energy Usage

| VEHICLE | FUEL CONSUMED | ENERGY CONSUMED | %DRIVING ELECTRIC | TOTAL MILES DRIVEN | CARBON EMISSIONS | EFFECTIVE MPG |
|---|---|---|---|---|---|---|
| 14783 | 50.3 gal | 51 kWh | 80% | 231.4 mi | 1,006 lbs | 40.9%MPGe |
| 34873 | 100.2 gal | 19 kWh | 48% | 112.9 mi | 2,004 lbs | 25.9%MPGe |
| 68944 | - | 70 kWh | 100% | 101.7 mi | 0 lbs | 49.6%MPGe |
| 479834 | 346 gal | - | - | 395.0 mi | 6,920 lbs | 25.9%MPGe |
| 269045 | 3.9 gal | 60 kWh | 95% | 78.2 mi | 78 lbs | 25.9%MPGe |
| 917364 | - | 31 kWh | 100% | 60.1 mi | 0 lbs | 66.3%MPGe |

Efficiency for PHEV is Calculated by Weighting mpgE and mpg by Miles Driven in Electric/Gas Mode

FIG. 9

EV Charging
Vehicles    Charging Stations

| VEHICLE | # OF CHARGES | AVG. CHARGE TIME | TOTAL KWH CHARGED |
|---|---|---|---|
| 14783 | 23 | 32 minutes | 23 kWh |
| 34873 | 6 | 213 minutes | 30 kWh |
| 68944 | 13 | 592 minutes | 44 kWh |
| 479834 | 16 | 401 minutes | 22 kWh |
| 269045 | 22 | 47 minutes | 51 kWh |
| 917364 | 1 | 800 minutes | 17 kWh |

Week ▾    Sep 5 – Sep 12    Live 1-100 of 357    More Actions ▾

FIG. 10A

EV Charging - 34873

| LOCATION | START SOC | END SOC | LAST CHARGE | START TIME | END TIME | DURATION |
|---|---|---|---|---|---|---|
| 533 Cowper St, Palo Alto, CA 94301 | 14% | 94% | 4.9 kWh | Sep 5, 6:44 AM | Sep 5, 10:06 AM | 3h 22m |
| 533 Cowper St, Palo Alto, CA 94301 | 14% | 95% | 5 kWh | Sep 6, 10:48 AM | Sep 6, 2:20 PM | 3h 32m |
| 533 Cowper St, Palo Alto, CA 94301 | 12% | 94% | 5.1 kWh | Sep 7, 10:37 AM | Sep 7, 2:21 PM | 3h 44m |
| 533 Cowper St, Palo Alto, CA 94301 | 14% | 95% | 5 kWh | Sep 8, 8:45 AM | Sep 8, 12:15 PM | 3h 30m |
| 533 Cowper St, Palo Alto, CA 94301 | 13% | 94% | 5 kWh | Sep 9, 10:45 AM | Sep 9, 2:21 PM | 3h 36m |
| 533 Cowper St, Palo Alto, CA 94301 | 12% | 93% | 5 kWh | Sep 10, 10:53 AM | Sep 10, 2:27 PM | 3h 34m |

FIG. 10B

| VEHICLE | % DRIVING ELECTRIC | ENERGY CONSUMED | ENERGY RECOVERED | EFFECTIVE MPG | TOTAL EMISSIONS SAVED |
|---|---|---|---|---|---|
| 14783 | 100% | 51 kWh | 9% | 25 MPGe | 30.2 lbs |
| 34873 | 100% | 120 kWh | 2% | 30 MPGe | 71.2 lbs |
| 68944 | 100% | 48 kWh | 11% | 32 MPGe | 28.4 lbs |
| 479834 | 100% | 80 kWh | 10% | 26 MPGe | 47.4 lbs |
| 269045 | 100% | 80 kWh | 9% | 24 MPGe | 47.4 lbs |
| 917364 | 100% | 150 kWh | 10% | 33 MPGe | 89.0 lbs |
| 387963 | 100% | 300 kWh | 8% | 32 MPGe | 178.0 lbs |

FIG. 11

Fuel & Energy
Vehicles  Routes

Week ▼  < Sep 5 - Sep 12 >  Live

Tags ▼  More Actions ▼

1-100 of 357

| ROUTE | CRUISE CONTROL | # OF RUNS | AVG. ENERGY CONSUMED | AVG. ENERGY RECOVERED | AVG. EMISSIONS SAVED |
|---|---|---|---|---|---|
| Line A ← 1206 | 3 | 15 | 75 kWh | 8% | 44.5 lbs |
| Line B | 4 | 4 | 19 kWh | 2% | 52.5 lbs |
| Line C | 8 | 8 | 70 kWh | 14% | 12.2 lbs |
| Line D | 7 | 7 | 80 kWh | 10% | 22.5 lbs |
| Line E | 3 | 3 | 60 kWh | 9% | 38.6 lbs |
| Line F | 5 | 5 | 22 kWh | 4% | 61.5 lbs |

MANAGING A PLURALITY OF PHYSICAL ASSETS FOR REAL TIME VISUALIZATIONS

CROSS-REFERENCE TO RELATED APPLICATIONS

This application claims the benefit of priority of U.S. Provisional Patent Application No. 63/363,100, filed Apr. 15, 2022, entitled "REFINING ISSUE DETECTION ACROSS A FLEET OF PHYSICAL ASSETS," which is hereby incorporated by reference herein in its entirety and for all purposes. Any and all applications for which a foreign or domestic priority claim is identified in the Application Data Sheet as filed with the present application are hereby incorporated by reference under 37 CFR 1.57 for all purposes and for all that they contain.

TECHNICAL FIELD

Embodiments of the present disclosure relate to vehicle gateway devices, sensors, systems, and methods that allow for efficient monitoring, management, data acquisition, and data processing for vehicles and/or fleets. Embodiments of the present disclosure further relate to devices, systems, and methods that provide interactive graphical user interfaces for vehicle and/or fleet monitoring and management.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Most modern vehicles have a vehicle bus. A vehicle bus is an internal communications network that connects components, such as a car's electronic controllers, within a vehicle. Example protocols that a vehicle bus can use include, but are not limited to, Controller Area Network (CAN), Local Interconnect Network (LIN), OBD-II or OBD2, and/or J1939. The vehicle bus can have an interface that enables an external device to access the vehicle's electronic controllers. In particular, the external device can access vehicle diagnostics, such as fuel level, engine revolutions per minute (RPM), speed, engine torque, engine load, brake use, etc. The vehicle diagnostic data can be voluminous. Moreover, the vehicle diagnostic data can be retrieved substantially in real-time and at a high frequency, such as every millisecond. Additional devices that can collect data from a vehicle include cameras and sensors, such as dashboard cameras and temperature monitors.

SUMMARY

The systems, methods, and devices described herein each have several aspects, no single one of which is solely responsible for its desirable attributes. Without limiting the scope of this disclosure, several non-limiting features will now be described briefly.

Fleets of physical assets can include a large number of physical assets that are located in a plurality of locations. Further, each physical asset of the fleet of physical assets can be a different asset, perform different operations, etc. For example, physical assets can include vehicles (e.g., automobiles, trailers, refrigerated trailers, refrigerated vehicles (e.g., box trucks)), equipment (e.g., generators, sensors, motors, etc.), or any other assets. Due to the complexity and diversity of, not only the physical assets themselves, but also the activities of the physical assets in a fleet of physical assets, it can be very difficult to monitor the fleet of physical assets. Further, it can be difficult to diagnose issues for each of the fleet of physical assets (e.g., determine why and how fuel and energy are used by the physical assets, determine the location of the physical assets, determine why a physical asset is acting in a particular manner, etc.). As each physical asset of the fleet of physical assets can include a plurality of sensors, the sensor data associated with a particular physical asset can be voluminous and parsing the sensor data can be time-consuming and difficult. Therefore, just collecting and parsing the sensor data can be very technically difficult.

Advantageously, various embodiments of the present disclosure may overcome various disadvantages of prior systems and methods. A gateway device can be attached to each physical asset in the fleet of physical assets. The gateway device can obtain sensor data generated by a plurality of sensors associated with a particular physical asset. For example, the plurality of sensors may include a temperature sensor, a lock sensor, a humidity sensor, a cargo monitor sensor, a latch sensor, a door monitor sensor, or any component monitoring sensor to monitor a component of the physical asset. Each of the plurality of sensors may transmit sensor data to the gateway device. Each of a plurality of gateway devices can transmit obtained sensor data to a management server system.

The management server system may generate a user interface. For example, the management server system can generate the user interface in real time based on the obtained sensor data. The user interface may include virtual representations of physical assets. The management server system may generate the virtual representations in real time. Further, the management server system can include visualizations of the virtual representations of the physical assets. The visualizations may identify particular characteristics of the physical assets. The management server system may cause display of the user interface on a user computing device. The user interface can update the visualizations of the virtual representations of the physical assets in real time. The user interface can further include filters that enable a user to select a particular filter for the fleet of physical assets associated with the sensor data. Based on a selection of a filter (e.g., by a user computing device), the management server system can filter sensor data to identify a portion of the sensor data. Further, the management server system can identify a subset of the fleet of physical assets associated with the filtered sensor data. Based on the filtered sensor data, the management server system can generate an updated user interface.

Advantageously, various embodiments of the present disclosure may overcome various disadvantages of prior systems and methods. A management server system may include a computer readable storage medium having program instructions embodied therewith and one or more processors configured to execute the program instructions. The management server system may obtain, from a plurality of gateway devices, sensor data generated by a plurality of sensors. The plurality of sensors may be associated with a plurality of physical assets. The management server system may generate a user interface. The user interface may include one or more visualizations of the plurality of physical assets and one or more filters. The one or more visualizations may identify one or more characteristics of the plurality of physical assets based at least in part on the sensor data. The management server system may obtain a selection of a filter of the one or more filters. The management server system may, based at least in part on the selection of the filter, filter the sensor data to identify a portion of the sensor data. The management server system may identify one or more physical assets of the plurality of physical assets associated with the portion of the sensor data by filtering the plurality of physical assets based at least in part on the portion of the sensor data. The management server system may generate an updated user interface. The updated user interface comprises one or more visualizations of the one or more physical assets.

In various embodiments, to obtain the selection of the filter of the one or more filters, the management server system may obtain the selection of the filter as an input via a drop-down menu, a search bar, or an interactive parameter.

In various embodiments, the management server system may store the sensor data in a data store of the management server system.

In various embodiments, the one or more visualizations of the plurality of physical assets may include a pictorial representation of each of the plurality of physical assets.

In various embodiments, the one or more characteristics of the plurality of physical assets may include at least one of a location of a physical asset of the plurality of physical assets, a status of the physical asset, a utilization of the physical asset, a job associated with the physical asset, maintenance information associated with the physical asset, a battery voltage of the physical asset, fuel information associated with the physical asset, a status of an engine of the physical asset, a gateway device associated with the physical asset, a status of the gateway device associated with the physical asset, or information identifying the physical asset.

In various embodiments, the management server system may obtain a selection of a physical asset of the plurality of physical assets. Further, the management server system may generate an additional user interface. The additional user interface may indicate a location of the physical asset.

In various embodiments, the management server system may obtain a selection of a physical asset of the plurality of physical assets. Further, the management server system may generate an additional user interface. The additional user interface may include a map. The additional user interface may indicate a location of the physical asset relative to the map.

In various embodiments, the plurality of sensors may generate the sensor data over a period of time. The management server system may determine one or more temporal characteristics of the plurality of physical assets based at least in part on the sensor data. The management server system may obtain a selection of a physical asset of the plurality of physical assets. The management server system may generate an additional user interface. The additional user interface may include a map. The additional user interface may indicate a plurality of locations of the physical asset over the period of time relative to the map based at least in part on the one or more temporal characteristics.

In various embodiments, the plurality of sensors may generate the sensor data over a period of time. The management server system may determine one or more temporal characteristics of the plurality of physical assets based at least in part on the sensor data. The one or more visualizations of the plurality of physical assets may identify the one or more temporal characteristics of the plurality of physical assets over the period of time.

In various embodiments, the management server system may determine one or more issues associated with a physical asset of the plurality of physical assets based at least in part on the sensor data. The one or more characteristics of the plurality of physical assets may include the one or more issues.

In various embodiments, the management server system may determine one or more issues associated with a physical asset of the plurality of physical assets based at least in part on the sensor data. The management server system may determine an identifier of the one or more issues associated with the physical asset. The user interface may further include the identifier of the one or more issues.

In various embodiments, the management server system may determine one or more issues associated with a physical asset of the plurality of physical assets based at least in part on the sensor data. The management server system may determine an identifier of the one or more issues associated with the physical asset. The user interface may further include the identifier of the one or more issues. The identifier of the one or more issues may identify a source of the one or more issues.

In various embodiments, the management server system may determine one or more issues associated with a physical asset of the plurality of physical assets based at least in part on the sensor data. Further, the management server system may determine an identifier of the one or more issues associated with the physical asset. The user interface may further include the identifier of the one or more issues. The identifier of the one or more issues may identify a sensor of the plurality of sensors. The sensor may be associated with the physical asset and the sensor may be associated with the one or more issues.

In various embodiments, the management server system may determine one or more issues associated with a physical asset of the plurality of physical assets based at least in part on the sensor data. Further, the management server system may determine a diagnostic trouble code associated with the one or more issues associated with the physical asset. The user interface may further include the diagnostic trouble code associated with the one or more issues.

In various embodiments, the management server system may obtain a selection of a physical asset of the plurality of physical assets. Further, the management server system may generate an additional user interface. The additional user interface may identify raw machine data associated with the physical asset.

In various embodiments, the management server system may obtain one or more alerts. Further, the management server system may generate an additional user interface. The additional user interface may identify an alert of the one or more alerts based at least in part on the sensor data.

In various embodiments, the management server system may obtain, from a user computing device, rule information identifying one or more rules. The one or more rules including a manner of displaying the one or more visualizations. The user interface may be based at least in part on the one or more rules.

In various embodiments, the management server system may cause display, via a user computing device, of the user interface. Further, the management server system may cause display, via a user computing device, of the updated user interface.

According to various embodiments of the present disclosure, a method can include obtaining, from a plurality of gateway devices, sensor data generated by a plurality of sensors. The plurality of sensors may be associated with a plurality of physical assets. The method may further include generating a user interface. The user interface may include one or more visualizations of the plurality of physical assets and one or more filters. The one or more visualizations may identify one or more characteristics of the plurality of physical assets based at least in part on the sensor data. The method may further include obtaining a selection of a filter of the one or more filters. The method may further include based at least in part on the selection of the filter, filtering the sensor data to identify a portion of the sensor data. The method may further include identifying one or more physical assets of the plurality of physical assets associated with the portion of the sensor data by filtering the plurality of physical assets based at least in part on the portion of the sensor data. The method may further include generating an updated user interface. The updated user interface may include one or more visualizations of the one or more physical assets.

In various embodiments, a subset of the plurality of sensors and a gateway device of the plurality of gateway devices may be associated with a physical asset. The subset of the plurality of sensors may transmit the subset of the sensor data to the gateway device via a first network. The method may further include obtaining the sensor data generated by the plurality of sensors by obtaining, from the gateway device, the subset of the sensor data via a second network.

A management server system may include a computer readable storage medium having program instructions embodied therewith and one or more processors configured to execute the program instructions. The management server system may obtain, from a plurality of gateway devices, sensor data generated by a plurality of sensors. The plurality of sensors may be associated with a plurality of vehicles. The management server system may identify, for each vehicle of the plurality of vehicles, a subset of the sensor data associated with a particular vehicle. The management server system may generate, in real time, for each vehicle of the plurality of vehicles, a virtual representation of the particular vehicle based at least in part on the subset of the sensor data associated with the particular vehicle. The management server system may generate a user interface. The user interface may include one or more visualizations of virtual representations of the plurality of vehicles. The one or more visualizations of the virtual representations may identify one or more characteristics of each of the plurality of vehicles. The management server system may update, in real time, the one or more visualizations of the virtual representations of the plurality of vehicles based at least in part on obtaining additional sensor data from the plurality of gateway devices.

In various embodiments, the management server system may compare, for each vehicle of the plurality of vehicles, the subset of the sensor data associated with the particular vehicle to a particular threshold value associated with the particular vehicle. The user interface may further include comparison information identifying one or more vehicles of the plurality of vehicles. One or more subsets of the sensor data associated with the one or more vehicles may not satisfy one or more threshold values associated with the one or more vehicles.

In various embodiments, the plurality of vehicles may include a plurality of refrigerated trailers.

In various embodiments, the one or more visualizations of the virtual representations may further identify, for each vehicle of the plurality of vehicles, a plurality of zones of the particular vehicle. Each zone of the plurality of zones may be associated with a particular subset of the one or more characteristics of the particular vehicle.

In various embodiments, the management server system may store the sensor data in a data store of the management server system.

In various embodiments, the one or more visualizations of the virtual representations may include a pictorial representation of each of the plurality of vehicles.

In various embodiments, the one or more characteristics of each of the plurality of vehicles may include at least one of: a temperature of a vehicle, a location of the vehicle, a status of the vehicle, a job associated with the vehicle, maintenance information associated with the vehicle, a battery voltage of the vehicle, fuel information associated with the vehicle, a status of an engine of the vehicle, a gateway device associated with the vehicle, a status of the gateway device associated with the vehicle, or information identifying the vehicle.

In various embodiments, the management server system may obtain a selection of a vehicle of the plurality of vehicles. Further, the management server system may generate an additional user interface. The additional user interface may indicate a location of the vehicle.

In various embodiments, the management server system may obtain a selection of a vehicle of the plurality of vehicles. Further, the management server system may generate an additional user interface. The additional user interface may include a map. The additional user interface may indicate a location of the vehicle relative to the map.

In various embodiments, the plurality of sensors may generate the sensor data over a period of time. Further, the management server system may obtain a selection of a vehicle of the plurality of vehicles. The management server system may determine one or more temporal characteristics of the vehicle based at least in part on the sensor data. Further, the management server system may generate an additional user interface. The additional user interface may include a map. The additional user interface may indicate a plurality of locations of the vehicle over the period of time relative to the map based at least in part on the one or more temporal characteristics.

In various embodiments, the plurality of sensors may generate the sensor data over a period of time. Further, the management server system may obtain a selection of a vehicle of the plurality of vehicles. The management server system may determine one or more temporal characteristics of the vehicle based at least in part on the sensor data. Further, the management server system may generate an additional user interface. The additional user interface may include a map. The additional user interface may indicate a plurality of locations and a plurality of temperatures of the vehicle over the period of time relative to the map based at least in part on the one or more temporal characteristics. Each of the plurality of temperatures may be associated with a particular location of the plurality of locations.

In various embodiments, the plurality of sensors may generate the sensor data over a period of time. The management server system may determine one or more temporal characteristics of a vehicle based at least in part on the sensor data. The one or more visualizations of the virtual representations may identify the one or more temporal characteristics of the vehicle over the period of time.

In various embodiments, the management server system may obtain a selection of a vehicle of the plurality of vehicles. Further, the management server system may generate an additional user interface. The additional user interface may identify raw machine data associated with the vehicle.

In various embodiments, the management server system may obtain one or more alerts. Further, the management server system may generate an additional user interface. The additional user interface may identify an alert of the one or more alerts based at least in part on the sensor data.

In various embodiments, the management server system may cause display, via a user computing device, of the user interface.

In various embodiments, the plurality of sensors may include at least one of a temperature sensor, a lock sensor, a humidity sensor, a cargo monitor sensor, a latch sensor, or a door monitor sensor.

In various embodiments, a subset of the plurality of sensors and a gateway device of the plurality of gateway devices may be associated with a vehicle. The subset of the plurality of sensors may transmit the subset of the sensor data to the gateway device via a first network. The management server system may obtain, from the gateway device, the subset of the sensor data via a second network.

In various embodiments, the management server system may compare, for each vehicle of the plurality of vehicles, the subset of the sensor data associated with the particular vehicle to a particular threshold value associated with the particular vehicle. Further, the management server system may generate comparison information based on comparing, for each vehicle of the plurality of vehicles, the subset of the sensor data associated with the particular vehicle to the particular threshold value. The management server system may route, to a user computing device, the comparison information. According to various embodiments of the present disclosure, a method can include obtaining, from a plurality of gateway devices, sensor data generated by a plurality of sensors. The plurality of sensors may be associated with a plurality of vehicles. The method may include identifying, for each vehicle of the plurality of vehicles, a subset of the sensor data associated with a particular vehicle. The method may include generating, in real time, for each vehicle of the plurality of vehicles, a virtual representation of the particular vehicle based at least in part on the subset of the sensor data associated with the particular vehicle. The method may include generating a user interface. The user interface may include one or more visualizations of virtual representations of the plurality of vehicles. The one or more visualizations of the virtual representations may identify one or more characteristics of each of the plurality of vehicles. The method may include updating, in real time, the one or more visualizations of the virtual representations of the plurality of vehicles based at least in part on obtaining additional sensor data from the plurality of gateway devices.

In various embodiments, the method may further include comparing, for each vehicle of the plurality of vehicles, the subset of the sensor data associated with the particular vehicle to a particular threshold value associated with the particular vehicle. Further, the method may include generating comparison information based on comparing, for each vehicle of the plurality of vehicles, the subset of the sensor data associated with the particular vehicle to the particular threshold value. Further, the method may include routing, to a user computing device, the comparison information.

BRIEF DESCRIPTION OF THE DRAWINGS

The following drawings and the associated descriptions are provided to illustrate embodiments of the present disclosure and do not limit the scope of the claims. Aspects and many of the attendant advantages of this disclosure will become more readily appreciated as the same become better understood by reference to the following detailed description, when taken in conjunction with the accompanying drawings, wherein:

FIGS. 8A-8B illustrate example interactive graphical user interfaces for analyzing driver efficiency, according to various embodiments of the present disclosure.

FIG. 9 illustrates an example interactive graphical user interface for analyzing vehicle fuel/energy usage, according to various embodiments of the present disclosure.

FIGS. 10A-10B illustrate example interactive graphical user interfaces for analyzing vehicle charging, according to various embodiments of the present disclosure.

FIG. 11 illustrates another example interactive graphical user interface for analyzing vehicle fuel/energy usage, according to various embodiments of the present disclosure.

FIGS. 12 and 13 illustrate example interactive graphical user interfaces for analyzing route efficiency and/or fuel/energy usage, according to various embodiments of the present disclosure.

FIG. 15 illustrates an example interactive graphical user interface for presenting vehicle metadata, according to various embodiments of the present disclosure.

DETAILED DESCRIPTION

Figure 1:
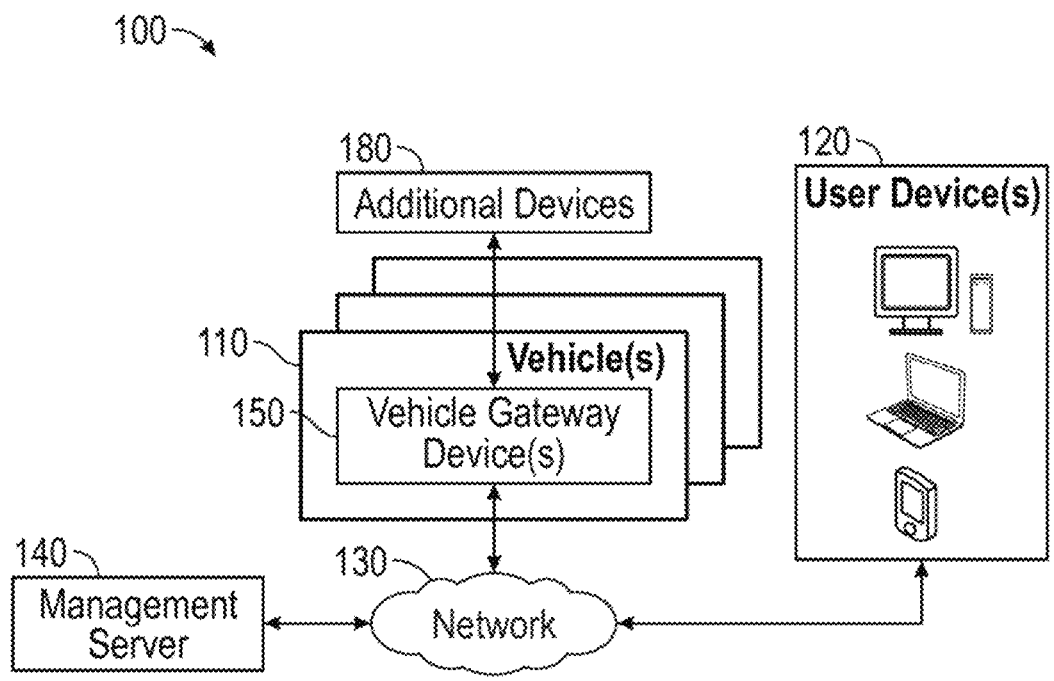
FIG. 1 illustrates a block diagram of an example operating environment in which one or more aspects of the present disclosure may operate, according to various embodiments of the present disclosure.

Although certain preferred embodiments and examples are disclosed below, inventive subject matter extends beyond the specifically disclosed embodiments to other alternative embodiments and/or uses and to modifications and equivalents thereof. Thus, the scope of the claims appended hereto is not limited by any of the particular embodiments described below. For example, in any method or process disclosed herein, the acts or operations of the method or process may be performed in any suitable sequence and are not necessarily limited to any particular disclosed sequence. Various operations may be described as multiple discrete operations in turn, in a manner that may be helpful in understanding certain embodiments; however, the order of description should not be construed to imply that these operations are order dependent. Additionally, the structures, systems, and/or devices described herein may be embodied as integrated components or as separate components. For purposes of comparing various embodiments, certain aspects and advantages of these embodiments are described. Not necessarily all such aspects or advantages are achieved by any particular embodiment. Thus, for example, various embodiments may be carried out in a manner that achieves or optimizes one advantage or group of advantages as taught herein without necessarily achieving other aspects or advantages as may also be taught or suggested herein.

I. Overview

As mentioned above, according to various embodiments of the present disclosure, an improved system can efficiently receive sensor data and analyze sensor data from a plurality of sensors. The system can receive the sensor data from a plurality of gateway devices (e.g., a plurality of vehicle gateway devices). Each of the gateway devices can be connected to a particular physical asset. For example, a first gateway device can be connected to a first physical asset and a second gateway device can be connected to a second physical asset. The physical asset can include any one or more physical assets including vehicles (e.g., automobiles, trailers, refrigerated trailers, refrigerated vehicles (e.g., refrigerated box trucks)), equipment (e.g., generators, sensors, motors, etc.), or any other assets. A gateway device that is connected to a particular physical asset can receive sensor data from a plurality of sensors associated with the physical asset. For example, each physical asset may be connected to a respective gateway device and each gateway device may receive sensor data from a plurality of sensors. Generally, the gateway device can gather sensor data related to the operation of the physical asset. For example, the sensor data may indicate a location of the physical asset, a status of the physical asset, or any other data associated with the physical asset. Therefore, the system can gather sensor data related to a plurality of physical assets and a respective plurality of sensors associated with each of the physical assets. As the sensors may produce sensor data at a high frequency (e.g., every millisecond), the amount of sensor data produced by the sensors may be large. Further, as each sensor may produce separate sensor data, the amount of sensor data produced by the sensors associated with a particular physical asset may be large. Therefore, the gateway device can obtain a large amount of sensor data at a high frequency (e.g., every millisecond) from the sensors associated with a physical asset. As each gateway device may separately route sensor data to the system, it may be difficult for the system to manage (e.g., parse) the sensor data based on the large amount of sensor data provided at a high frequency to the system.

In some embodiments, to provide access to the sensor data produced by the plurality of sensors, the system can generate a user interface that includes representations of the sensor data produced by the plurality of sensors. However, due to the large amount of sensor data, the generation of the user interface may be inefficient. Thus, some systems may be unable to report or display sensor data that is associated with particular sensors, particular assets, particular gateway devices, etc. in an efficient manner. For example, a user may implement a multi-step and inefficient process to identify particular sensor data. This can be disadvantageous as a user may desire to quickly and efficiently identify particular sensor data (e.g., to determine compliance with particular regulations or thresholds). For example, a user may desire to quickly and efficiently identify sensor data to determine compliance with vehicle temperature regulations. Further, due to the large amount of sensor data and the high frequency at which the sensor data is received, some systems may not be able to provide a real time representation of the sensor data. For example, while some systems may receive sensor data from multiple sensors, the systems may be unable to parse the sensor data in an efficient manner and generate real time representations of the sensors and/or real time representations components associated with the sensors. The lack of real time representations and/or real time updates in such systems may be disadvantageous and undesirable.

As mentioned above, according to various embodiments of the present disclosure, an improved system can receive sensor data and generate customized, improved user interfaces that offer distinct advantages over traditional systems, as discussed above. The sensor data received from the gateway devices can be used for fleet management purposes. In particular, the system can utilize the sensor data to identify or diagnose issues with each physical asset. For example, the system can identify an issue with the physical asset based on the sensor data. Further, the system can isolate a source (e.g., a sensor, a component, etc.) of the issue. As described herein, the system can aggregate and process the received sensor data in various ways. For example, the system can process the data per sensor, per type of sensor, per component, per gateway device, per physical asset, per physical asset characteristic, per user, per user characteristic, per fleet of physical assets, per cohort, and/or based on some other common characteristic. Based on processing the data, the system can identify a malfunction of a sensor, a trouble code of a sensor, sensor metrics, a malfunction of a component of the physical asset, a trouble code of the component, component metrics, etc. For example, the system can identify a temperature of a physical asset, a door status of a physical asset, a cargo status of a physical asset, a utilization of a physical asset, a maintenance period, etc. Further, the system can determine comparisons, trends, correlations, recommendations, route optimizations, and/or otherwise use the data for fleet management purposes. Further, the management server can generate reports, alerts, and various interactive graphical user interfaces from the data.

In various embodiments, the system can generate a user interface that includes visualizations of the plurality of physical assets. The visualization of the plurality of physical assets may identify metrics (e.g., characteristics) of the plurality of physical assets based on the sensor data (e.g., a location, a status, etc.) Further, the user interface may include filters. The system can cause display of the user interface via a user computing device. The system can obtain a selection of a filter from the user computing device. For example, the system can receive a network communication identifying a particular filter. Based on the selection of the filter, the system can filter the sensor data to identify a portion of sensor data. Further, the system can identify physical assets associated with the portion of sensor data by filtering the plurality of physical assets. For example, the system can identify physical assets that include sensors that produced the portion of sensor data. The system can generate an updated user interface that includes visualizations of the physical assets associated with the portion of sensor data.

In various embodiments, the system can identify sensor data associated with each of the physical assets. For example, the system can identify a portion of the sensor data associated with a first physical asset, a portion of the sensor data associated with a second physical asset, etc. The sensor data associated with a particular physical asset may be associated with a plurality of sensors and/or a plurality of gateway devices. For example, a physical asset may be associated with multiple sensors and/or multiple gateway devices. The system can generate, in real time, a virtual representation of each physical asset based on the sensor data associated with the physical asset. As discussed above, the system can generate a user interface that includes visualizations (e.g., visualizations of the virtual representations of the physical assets). Further, the system can update, in real time, the visualizations of the virtual representations of the physical assets based on additional sensor data.

Various aspects of the present disclosure may individually and/or collectively provide various technical advantages as described herein, and may overcome various disadvantages of prior systems and methods. As described herein, embodiments of the present disclosure may include gateway devices, including vehicle gateway devices, asset gateway devices (e.g., powered asset gateway devices or unpowered asset gateway devices), or any other gateway devices. The terms "vehicle gateway device", "asset gateway device" "gateway device", and the like, are used interchangeably herein. The gateway devices may automatically establish communication with a remote management server and may transmit physical asset data to the remote management server. Such received data may be useable by the management server for providing further analyses, insights, alerts, etc. to users via interactive graphical user interfaces. However, some existing systems that locally connect to and monitor a physical asset can generate voluminous amounts of data (such as generating data every millisecond), which can be impractical to transmit over a network to the management server in substantially real-time. Instead, in some embodiments, the gateway device can aggregate data at the physical asset level and transmit the aggregated data substantially in real-time. The aggregated data can be smaller in size than the raw physical asset data. Accordingly, the aggregated data can be transmitted to the management server faster than the raw physical asset data and by using less bandwidth.

Unlike some existing systems, the management server can use historical physical asset data from the gateway device to determine an expected physical asset state when an actual physical asset state may be technically impossible to determine for the physical asset. For example, some existing vehicle systems are unable to report a state of charge of a vehicle's battery while the battery is charging because some vehicle's electronic controller(s) and/or computer may be in an off state while charging. The management server can receive historical vehicle data for one or more vehicle batteries, such as the data from the vehicle where the battery is currently being charged. The management server can overcome the technical limitation(s) of some existing vehicle systems by determining an estimated charge level of a battery based on the historical battery data for one or more batteries and/or vehicles.

Embodiments of the disclosure will now be described with reference to the accompanying figures, wherein like numerals refer to like elements throughout. The terminology used in the description presented herein is not intended to be interpreted in any limited or restrictive manner, simply because it is being utilized in conjunction with a detailed description of certain specific embodiments of the disclosure. Furthermore, embodiments of the disclosure may include several novel features, no single one of which is solely responsible for its desirable attributes or which is essential to practicing the embodiments of the disclosure herein described.

II. Terms

In order to facilitate an understanding of the systems and methods discussed herein, a number of terms are defined below. The terms defined below, as well as other terms used herein, should be construed broadly to include the provided definitions, the ordinary and customary meaning of the terms, and/or any other implied meaning for the respective terms. Thus, the definitions below do not limit the meaning of these terms, but only provide example definitions.

User Input (also referred to as "Input"): Any interaction, data, indication, etc., received by a system/device from a user, a representative of a user, an entity associated with a user, and/or any other entity. Inputs may include any interactions that are intended to be received and/or stored by the system/device; to cause the system/device to access and/or store data items; to cause the system to analyze, integrate, and/or otherwise use data items; to cause the system to update to data that is displayed; to cause the system to update a way that data is displayed; and/or the like. Non-limiting examples of user inputs include keyboard inputs, mouse inputs, digital pen inputs, voice inputs, finger touch inputs (e.g., via touch sensitive display), gesture inputs (e.g., hand movements, finger movements, arm movements, movements of any other appendage, and/or body movements), and/or the like. Additionally, user inputs to the system may include inputs via tools and/or other objects manipulated by the user. For example, the user may move an object, such as a tool, stylus, or wand, to provide inputs. Further, user inputs may include motion, position, rotation, angle, alignment, orientation, configuration (e.g., fist, hand flat, one finger extended, etc.), and/or the like. For example, user inputs may comprise a position, orientation, and/or motion of a hand or other appendage, a body, a 3D mouse, and/or the like.

Data Store: Any computer readable storage medium and/or device (or collection of data storage mediums and/or devices). Examples of data stores include, but are not limited to, optical disks (e.g., CD-ROM, DVD-ROM, etc.), magnetic disks (e.g., hard disks, floppy disks, etc.), memory circuits (e.g., solid state drives, random-access memory (RAM), etc.), and/or the like. Another example of a data store is a hosted storage environment that includes a collection of physical data storage devices that may be remotely accessible and may be rapidly provisioned as needed (commonly referred to as "cloud" storage).

Database: Any data structure (and/or combinations of multiple data structures) for storing and/or organizing data, including, but not limited to, relational databases (e.g., Oracle databases, PostgreSQL databases, etc.), non-relational databases (e.g., NoSQL databases, etc.), in-memory databases, spreadsheets, comma separated values (CSV) files, eXtendible markup language (XML) files, TeXT (TXT) files, flat files, spreadsheet files, and/or any other widely used or proprietary format for data storage. Databases are typically stored in one or more data stores. Accordingly, each database referred to herein (e.g., in the description herein and/or the figures of the present application) is to be understood as being stored in one or more data stores. Additionally, although the present disclosure may show or describe data as being stored in combined or separate databases, in various embodiments such data may be combined and/or separated in any appropriate way into one or more databases, one or more tables of one or more databases, etc. As used herein, a data source may refer to a table in a relational database, for example.

Vehicle Metric Data: Any data that can describe an aspect of a vehicle or something related to a vehicle. Example vehicle metric data can be related to cruise control use, coasting, accelerator pedal use, idling, battery state, anticipation, motor rotations per minute, motor power, fuel level, engine revolutions per minute (RPM), speed, engine torque, engine load, brake use, etc. of the vehicle. Vehicle metric data does not necessarily have to be represented as a numerical value. For example, example vehicle metric data related to cruise control can indicate whether cruise control is either in an on or off state. Individual vehicle metrics can be associated with respective timestamps. As another example, a vehicle metric can be for coasting. The determination of whether the vehicle metric for coasting is either true or false can be based on a combination of vehicle parameters, such as engine torque, vehicle speed, brake pedal engagement, and/or accelerator pedal engagement. In some embodiments, some categories of vehicle metric data can come from diagnostic data that directly comes from the vehicle bus. Additional or alternatively, some vehicle metric data can be a composite of multiple vehicle parameters and/or be derived from another vehicle metric, such as, for example, coasting that can be derived from multiple parameters or accelerator pedal engagement that can be derived from engine torque and/or load, as described herein.

III. Example Operating Environment

FIG. 1 illustrates a block diagram of an example operating environment 100 in which one or more aspects of the present disclosure may operate, according to various embodiments of the present disclosure. The operating environment 100 may include one or more user devices 120, a management server 140, one or more vehicles 110, one or more vehicle gateway devices 150, and one or more additional devices 180. The various devices may communicate with one another via a communications network 130, as illustrated.

In general, the vehicle gateway device 150 comprises a housing including processor(s), memory, input/output ports, etc. that may be connected to components of a vehicle. For example, the vehicle gateway device 150 can interface with a vehicle bus of the vehicle 110. In particular, the vehicle gateway device 150 can connect to the vehicle bus of the vehicle 110 over an interface, such as, but not limited to, OBD-II or J1939. The vehicle gateway device 150 can receive and/or process data received via the interfaces of the vehicle gateway device 150. The vehicle gateway device 150 can include or be configured to be an electronic logging device (ELD). Accordingly, the vehicle gateway device 150 can record data regarding the operation of the vehicle 110, as well as driver activity including driver hours of service and record of duty status. Configurations of the vehicle gateway device 150 may include various analysis algorithms, program instructions, scripts, etc., as described herein. Additional details regarding the vehicle gateway device 150 are described in further detail herein, such as with respect to FIG. 3.

The vehicle gateway device 150 can store the received and/or processed data in a memory of the vehicle gateway device 150 (e.g., a computer readable storage medium). The vehicle gateway device 150 can communicate with the management server 140 over the network 130. In particular, the vehicle gateway device 150 can transmit the received and/or processed data to the management server 140. As another example, the vehicle gateway device 150 can transmit an alert to the management server 140. The management server 140 may thereby receive data from multiple vehicle gateway devices 150, and may aggregate and perform further analyses on the received data from vehicle gateway devices 150. In some embodiments, the vehicle gateway device 150 can receive updates from the management server 140.

In some embodiments, the features and services provided by the management server 140 may be implemented as web services consumable via the network 130. The management server 140 can be provided by one or more virtual machines implemented in a hosted computing environment. The hosted computing environment can include one or more rapidly provisioned and released computing resources. The computing resources can include computing, networking and/or storage devices.

The additional device(s) 180 may include various devices for monitoring a vehicle and/or vehicle-related activity. The additional device(s) 180 can be optional and some configurations of the environment 100 do not include any additional device(s) 180. Example additional device(s) 180 can include, but are not limited to, cameras (such as network-connected dash cams) and/or sensors. Example sensors can include, but are not limited to, wireless sensors to monitor reefers and cargo and wireless temperature sensors. Another additional device 180 can include a device that identifies a particular driver. For example, a driver can wear a keychain that automatically is wirelessly communicates with the vehicle gateway device 150 such that the driver can be automatically identified and the driver does not need to sign in to an application.

Various example user devices 120 are shown in FIG. 1, including a desktop computer, laptop, and a smartphone, each provided by way of illustration. In general, the user devices 120 can be any computing device such as a desktop, laptop or tablet computer, personal computer, tablet computer, wearable computer, server, personal digital assistant (PDA), hybrid PDA/mobile phone, mobile phone, smartphone, set top box, voice command device, digital media player, and the like. A user device 120 may execute an application (e.g., a browser, a stand-alone application, etc.) that allows a user to access interactive user interfaces, view analyses or aggregated data, and/or the like as described herein. In various embodiments, users may interact with various components of the example operating environment 100 (e.g., the management server 140) via the user device(s) 120. Such interactions may typically be accomplished via interactive graphical user interfaces; however, alternatively such interactions may be accomplished via command line and/or other means.

The network 130 may include any wired network, wireless network, or combination thereof. For example, the network 130 may be a personal area network, local area network, wide area network, over-the-air broadcast network (e.g., for radio or television), cable network, satellite network, cellular telephone network, or combination thereof. As a further example, the network 130 may be a publicly accessible network of linked networks, possibly operated by various distinct parties, such as the Internet. In some embodiments, the network 130 may be a private or semi-private network, such as a corporate or university intranet. The network 130 may include one or more wireless networks, such as a Global System for Mobile Communications (GSM) network, a Code Division Multiple Access (CDMA) network, a Long Term Evolution (LTE) network, or any other type of wireless network. The network 130 can use protocols and components for communicating via the Internet or any of the other aforementioned types of networks. For example, the protocols used by the network 130 may include Hypertext Transfer Protocol (HTTP), HTTP Secure (HTTPS), Message Queue Telemetry Transport (MQTT), Constrained Application Protocol (CoAP), and the like. Protocols and components for communicating via the Internet or any of the other aforementioned types of communication networks are well known to those skilled in the art and, thus, are not described in more detail herein.

In various embodiments, communications among the various components of the example operating environment 100 may be accomplished via any suitable means. For example, the vehicle gateway devices 150 may communicate the additional device(s) 180, the management server 140, and/or the user device(s) 120 via any combination of the network 130 or any other wired or wireless communications means or method (e.g., Bluetooth, WiFi, infrared, cellular, etc.).

Further details and examples regarding the implementations, operation, and functionality, including various interactive graphical user interfaces, of the various components of the example operating environment 100 are described herein in reference to various figures.

IV. Example Management Device/Server

Figure 2:
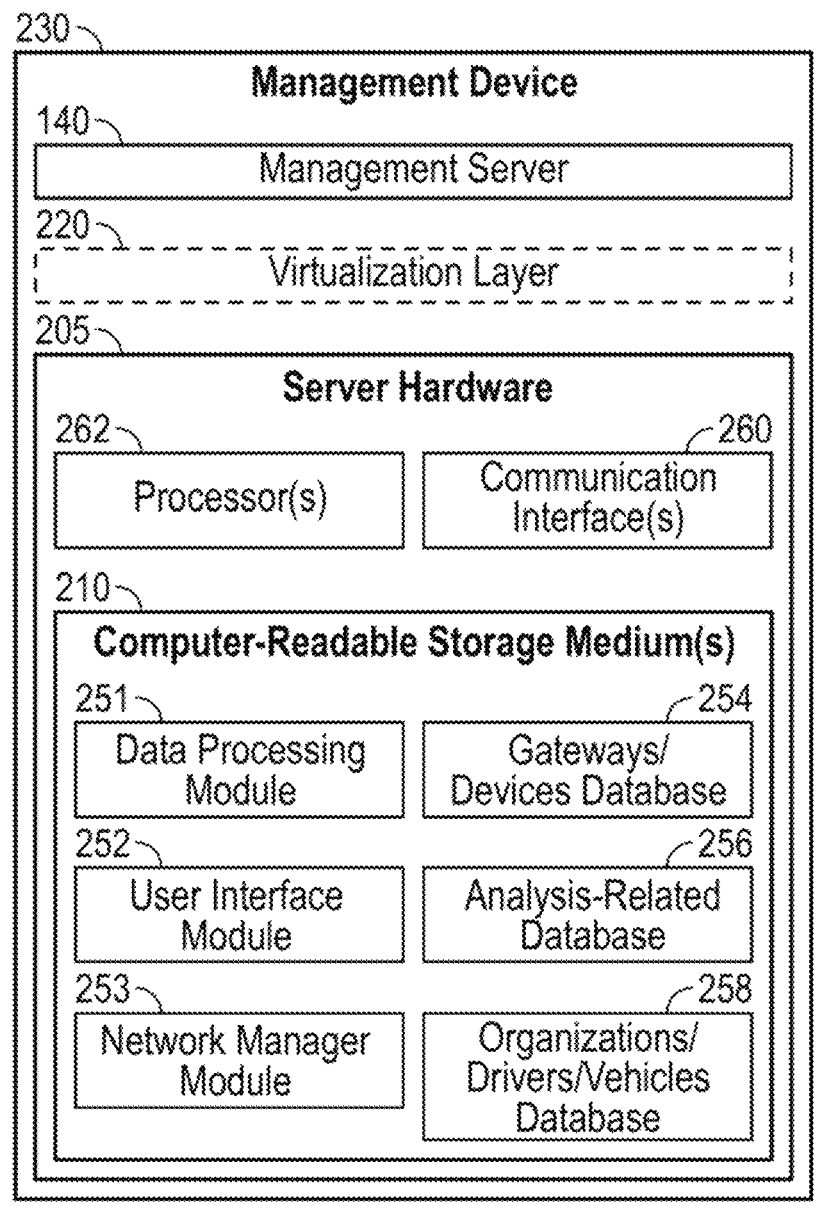
FIG. 2 illustrates a block diagram including an example implementation of a management device, according to various embodiments of the present disclosure.

FIG. 2 illustrates a block diagram including an example implementation of a management device 230, according to various embodiments of the present disclosure. In the example implementation, the management device 230 includes the management server 140. The management server 140 can be a Web or cloud server and/or a cluster of servers, running on one or more sets of server hardware. In some embodiments, the management server 140 works for both single and multi-tenant installations, meaning that multiple organizations with different administrators may have, e.g., multiple gateway devices and additional devices managed by the same management server.

According to various embodiments, the management server 140 may be implemented on the management device 230 (or multiple devices similar to the management device 230), which includes server hardware 205. The server hardware 205 can include one or more communication interfaces 260, one or more processors 262, and one or more computer readable storage mediums 210, each of which may be in communication with one another. The computer readable storage medium 210 can includes a data processing module 251, user interface module 252, network manager module 253, gateways/devices database 254, vehicle-related database 255, analysis-related database 256, and organizations/drivers/vehicles database 258. In various implementations, the various databases of the management device 230 may be combined or separated/partitioned as appropriate to implement the functionality described herein, and to maintain security and separation of data, e.g., for different organizations. In various implementations, the various databases may or may not be stored separately from the management device 230.

In various implementations one or more buses, interconnects, wires/cables, etc. may be used to interconnect the various components of the server hardware 205. In various implementations one or more interfaces, APIs, communication layers, buses, interconnects, wires/cables, etc. may be used to interconnect the various components of the management device 230.

In operation, the one or more communication interfaces 260, one or more processors 262, and one or more computer readable storage mediums 210 communicate with one another to, e.g., execute by the processor(s) 262 computer program instructions (e.g., as provided by the user interface module 252); receive, access, and transmit data (e.g., to/from the databases and via the communication interface(s) 260); and/or the like. In general, the server hardware 205 enables the functionality of the management server 140 as described herein. Further implementation details are described below.

In operation, the communication interface(s) 260 may provide wired and/or wireless communications with other devices and networks, as described herein. In various embodiments, communications among the various components of the example operating environment 100 may be accomplished via any suitable means. For example, the management server 140 and/or management device 230 may communicate with the vehicle gateway device 150, the additional device(s) 180, and/or the user device(s) 120 via any combination of the network 130 or any other communications means or method (e.g., Bluetooth, WiFi, infrared, cellular, etc.). Accordingly, the communications interface(s) 260 may include one or more of wired and wireless transceivers, such as a Joint Test Action Group (JTAG) transceiver, a Bluetooth or Bluetooth Low Energy (LE) transceiver, an IEEE 802.11 transceiver, an Ethernet transceiver, a USB transceiver, a Thunderbolt transceiver, an infrared transceiver, a wireless cellular telephony transceiver (e.g., 2G, 3G, 4G, 5G), or the like.

In operation, the data processing module 251 can process and analyze data (e.g., data received from the various devices, including the gateway devices and/or additional devices) as described herein. The data processing/analysis may usefully provide insights and information that may be provided via various interactive graphical user interfaces, as described herein.

In operation, the user interface module 252 may provide the various interactive graphical user interface functionality described herein. This may include, for example, generating user interface data useable for rendering the various interactive user interfaces described. The user interface data may be used by various computer systems, devices, and/or software programs (for example, a browser program of a user device 120), to render the interactive user interfaces. The interactive user interfaces may be displayed on, for example, electronic displays (including, for example, touch-enabled displays). For example, the user interface module 252 may provide various network accessible interactive graphical user interfaces, e.g., to allow the administrators of the various organizations and devices to create and log into an account associated with an organization to which a set of devices belong (e.g., gateway devices and additional devices), and manage, and access data associated with, those devices as described herein. As another example, the user interface module 252 may provide various network accessible interactive graphical user interfaces, e.g., to allow the analysts of the various organizations and devices to conduct operations analysis and/or operations configurations, as described herein.

In operation, the network manager module 253 may provide communication with and configuration and management of the various devices associated with each organization. This may include, for example, receiving and managing information related to the various devices (e.g., gateway devices and additional devices) at the time of manufacture, associating devices with particular organizations when they are purchased/claimed and implemented by the organizations (e.g., the claiming may be performed at least in part by populating the gateways/devices database 254 and the organizations/drivers/vehicles database 258 with appropriate information when the devices are associated with an organization), receiving data from the various devices (e.g., and storing the data in the gateways/devices database 254 or other appropriate database), sending data to various devices, and/or the like.

In operation, the gateways/devices database 254 can store information regarding the vehicle gateway devices 150 and/or the additional devices 180, and various relationships and associations among these devices. For example, the gateways/devices database 254 can store identifiers associated with these devices.

In operation, the analysis-related database 256 can store data (such as raw data, aggregated data, and/or analysis data) received from the vehicle gateway devices 150 and/or the additional devices 180. The analysis-related database 256 can further store processed data that is generated by the management server 140 for analysis purposes. The analysis data can include vehicle fuel/energy efficiencies, correlations among vehicle metrics and fuel/energy efficiencies, fuel/energy efficiency scores, safety measurements, correlations among vehicle metrics and safety measurements, safety scores, comparisons, trends, correlations, recommendations, and/or route optimizations.

In operation, the organizations/drivers/vehicles database 258 can store information regarding the organizations to which the vehicle gateway devices 150 and/or additional devices 180 belong. The organizations/drivers/vehicles database 258 can store data regarding the drivers and/or vehicles associated with the organization.

In various embodiments, the management server 140, as implemented by the management device 230, may include various other modules, components, engines, etc. to provide the functionality as described herein. It will be appreciated that additional components, not shown, may also be part of the management server 140 and/or the management device 230, and, in certain embodiments, fewer components than that shown in FIG. 2 may also be used in the management server 140 and/or the management device 230. For example, the management server 140 may include a security module used to manage cryptographic keys, certificates, and/or other data associated with establishing secure communication with various other devices. For example, the devices database 254 may include an identifier of each device (e.g., a serial number), a secret to be used to establish a secure communication with the devices of the same organization, and/or a mechanism to authenticate the devices' identity (e.g., the public key of a private public key pair, the private key of which was embedded or stored in the device during the manufacturing, etc.).

While various embodiments do not implement virtualization, alternative embodiments may use different forms of virtualization-represented by a virtualization layer 220 in the management device 230. In these embodiments, the management server 140 and the hardware that executes it form a virtual management server, which is a software instance of the modules and/or databases stored on the computer readable storage medium 210.

For example, in an implementation the management device 230 (or one or more aspects of the management device 230, e.g., the management server 140) may comprise, or be implemented in, a "virtual computing environment." As used herein, the terms "virtual computing environment", "virtualization", "virtual machine", and/or the like should be construed broadly to include, for example, computer readable program instructions executed by one or more processors (e.g., as described below) to implement one or more aspects of the modules and/or functionality described herein. In some implementations the virtual computing environment may comprise one or more virtual machines, virtualization layers, containers, and/or other types of emulations of computing systems or environments. In some implementations the virtual computing environment may comprise a hosted computing environment that includes a collection of physical computing resources that may be remotely accessible and may be rapidly provisioned as needed (commonly referred to as "cloud" computing environment).

Implementing one or more aspects of the management device 230 as a virtual computing environment may advantageously enable executing different aspects or modules of the system on different computing devices or processors, which may increase the scalability of the system. Implementing one or more aspects of the management device 230 as a virtual computing environment may further advantageously enable sandboxing various aspects, data, or modules of the system from one another, which may increase security of the system by preventing, e.g., malicious intrusion into the system from spreading. Implementing one or more aspects of the management device 230 as a virtual computing environment may further advantageously enable parallel execution of various aspects or modules of the system, which may increase the scalability of the system. Implementing one or more aspects of the management device 230 as a virtual computing environment may further advantageously enable rapid provisioning (or de-provisioning) of computing resources to the system, which may increase scalability of the system by, e.g., expanding computing resources available to the system or duplicating operation of the system on multiple computing resources. For example, the system may be used by thousands, hundreds of thousands, or even millions of users simultaneously, and many megabytes, gigabytes, or terabytes (or more) of data may be transferred or processed by the system, and scalability of the system may enable such operation in an efficient and/or uninterrupted manner.

V. Example Vehicle Gateway Device

Figure 3:
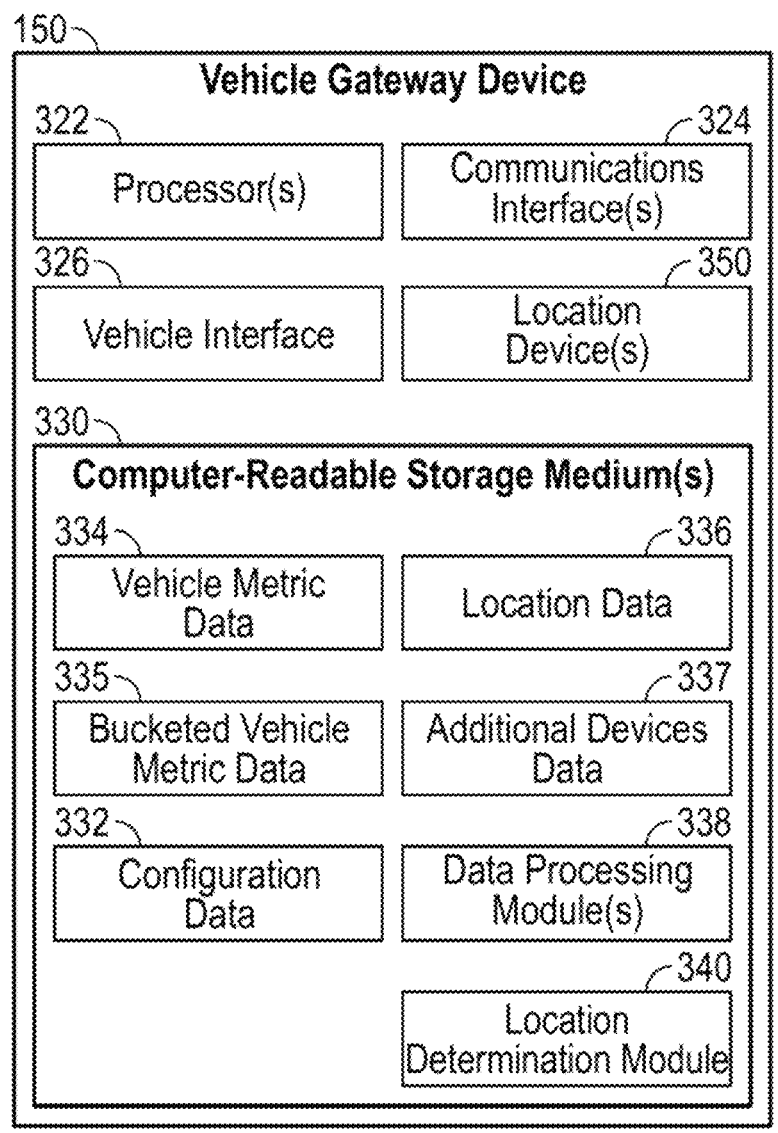
FIG. 3 illustrates a block diagram of an example vehicle gateway device, according to various embodiments of the present disclosure.

FIG. 3 illustrates a block diagram of an example vehicle gateway device 150, according to various embodiments of the present disclosure. The vehicle gateway device 150 can include one or more processors 322, one or more communication interfaces 324, one or more vehicle interfaces 326, location device(s) 350, and one or more computer readable storage mediums 330, each of which may be in communication with one another. The computer readable storage medium(s) 330 can include configuration data 332, vehicle metric data 334, bucketed vehicle metric data 335, location data 336, additional devices data 337, data processing module(s) 338, and location determination module 340. The configuration data 332, vehicle metric data 334, bucketed vehicle metric data 335, location data 336, additional devices data 337 can be stored in one or more databases of the vehicle gateway device 150. In various implementations one or more buses, interconnects, wires/cables, etc. may be used to interconnect the various components of the vehicle gateway device 150, and of the vehicle gateway device 150 more generally.

In operation, the one or more communication interfaces 324, one or more processors 322, and one or more computer readable storage mediums 330 communicate with one another to, e.g., execute by the processor(s) 322 computer program instructions (e.g., as provided by the data processing module(s) 338); receive, access, and transmit data (e.g., via the communication interface(s) 324); and/or the like. Example processor(s) 322 can include various types of processors, such as, but not limited to, general purposes processors, e.g., a microprocessor, and/or special purposes processors, e.g., Graphics Processing Units ("GPUs"), Application Specific Integrated Circuits ("ASICs"), Field-Programmable Gate Arrays ("FPGAs"). Further implementation details are described below.

The communication interface(s) 324 can enable wired and/or wireless communications with other devices and networks, as described herein. For example, the vehicle gateway device 150 can communicate with the additional device(s) 180, the management server 140, and/or the user device(s) 120 via any combination of the network 130 or any other communications means or method (e.g., Bluetooth, WiFi, infrared, cellular, etc.). Accordingly, the communications interface(s) 324 may include one or more of wired and wireless transceivers, such as a Joint Test Action Group (JTAG) transceiver, a Bluetooth or Bluetooth Low Energy (LE) transceiver, an IEEE 802.11 transceiver, an Ethernet transceiver, a USB transceiver, a Thunderbolt transceiver, an infrared transceiver, a wireless cellular telephony transceiver (e.g., 2G, 3G, 4G, 5G), or the like. The communications interface(s) 324 may further include, for example, serial inputs/outputs, digital inputs/output, analog inputs/outputs, and the like. As noted herein, the communications interface(s) 324 may further include one or more application programming interfaces (APIs).

The vehicle interface 326 can communicate with a vehicle bus. As described herein, the vehicle bus is an internal communications network that connects components, such as a car's electronic controllers, within a vehicle. Example protocols that the vehicle interface 326 can communicate with can include, but are not limited to, Controller Area Network (CAN), Local Interconnect Network (LIN), OBD-II or OBD2, and/or J1939. Accordingly, the vehicle interface 326 can allow access to the vehicle's electronic controllers. The vehicle gateway device 150, via the vehicle interface 326, can access vehicle diagnostics, such as fuel level, engine revolutions per minute (RPM), speed, engine torque, engine load, brake use, etc. In some embodiments, the vehicle gateway device 150, via the vehicle interface 326, can receive messages from the vehicle bus from the car's electronic controllers related to vehicle data, such as fuel level, engine revolutions per minute (RPM), speed, engine torque, engine load, brake use, etc. Additionally or alternatively, the vehicle gateway device 150, via the vehicle interface 326, can query the car's electronic controllers to receive vehicle data, such as fuel level, engine revolutions per minute (RPM), speed, engine torque, engine load, brake use, etc.

The location determination module 340 can use the location device(s) 350. Example location device(s) 350 can include a global positioning system (GPS) device or a global navigation satellite system (GLONASS) device. Data received from the location device(s) 350 can be stored as location data 336 in the computer readable storage medium(s) 330. In some embodiments, the location determination module 340 can determine the location of the vehicle gateway device 150 using various geolocation methods that use, but are not limited to, Wi-Fi, Bluetooth, Internet Protocol (IP), and/or proximity to beacons. The location determination module 340 may determine location of the gateway device 150 and generate location data 336 associated with the location of the gateway device 150. The location data 336 may include geographical positioning information (e.g., GPS coordinates or latitudinal and longitudinal coordinates) that may represent the location of the vehicle gateway device 150. Additionally or alternatively, the location information may identify an area within a grid (such as a map tile) that identifies and/or estimates the location of the vehicle gateway device 150.

In operation, the vehicle metric data 334 can include raw vehicle data received from the vehicle bus and/or the various additional devices 180 via the vehicle interface 326, communications interface(s) 324, and/or input ports of the vehicle gateway device 150. In operation, the bucketed vehicle metric data 334 can include aggregated metric data. In some embodiments, the data processing module 338 can bucket the raw vehicle data as aggregated data and can store the aggregated results as the bucketed vehicle metric data 334.

In operation, the additional devices data 337 can include data received from the various additional devices 180 via the vehicle interface 326, communications interface(s) 324, and/or input ports of the vehicle gateway device 150. Example additional devices data 337 can include, but is not limited to, camera data, video data, and/or temperature sensor data.

In operation, the configuration data 332 can include one or more configurations that configure operation of the vehicle gateway device 150. For example, such configurations may be received from a user and/or the management device 230 (and/or other devices in communication with the vehicle gateway device 150), and may include various communications specifications (e.g., that indicate functionality of the input and output ports), executable program instructions/code, algorithms or processes for processing the received data, and/or the like. The vehicle gateway device 150 may store multiple configurations in the configuration data 332, which may be selectively run or implemented, e.g., via user selection via the management server 140 and/or the user device(s) 120.

In operation, the data processing module(s) 338 can process and analyze received data. The processing and analysis by the data processing module(s) 338 may result in one or more outputs from the vehicle gateway device 150 that may be provided via the communications interface(s) 324, as further described herein. In various implementations, the data processing module(s) 338 may be executed by the processor(s) 322.

In various embodiments, firmware of the vehicle gateway device 150 may be updated such that the vehicle gateway device 150 may provide additional functionality. Such firmware updating may be accomplished, e.g., via communications with the management server 140, thereby enabling updating of multiple vehicle gateway devices 150 remotely and centrally. Additional functionality may include, for example, additional communications specifications, additional ways of communicating with additional devices 180 (e.g., additional control languages, etc.), additional configurations or options for configurations, and/or the like.

VI. Example Methods and Functionality for Efficient Data Aggregation

Figure 4A:
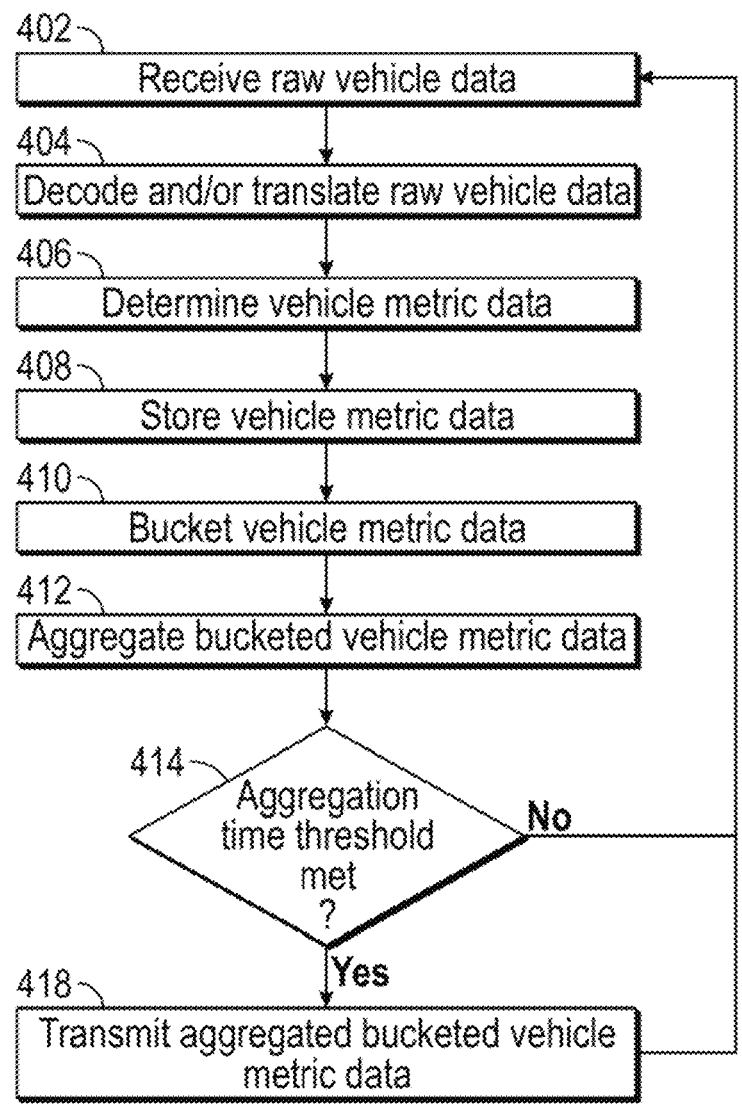
FIGS. 4A-4B are flowcharts illustrating example methods and functionality related to efficient data aggregation on a vehicle gateway device, according to various embodiments of the present disclosure.
Figure 4B:
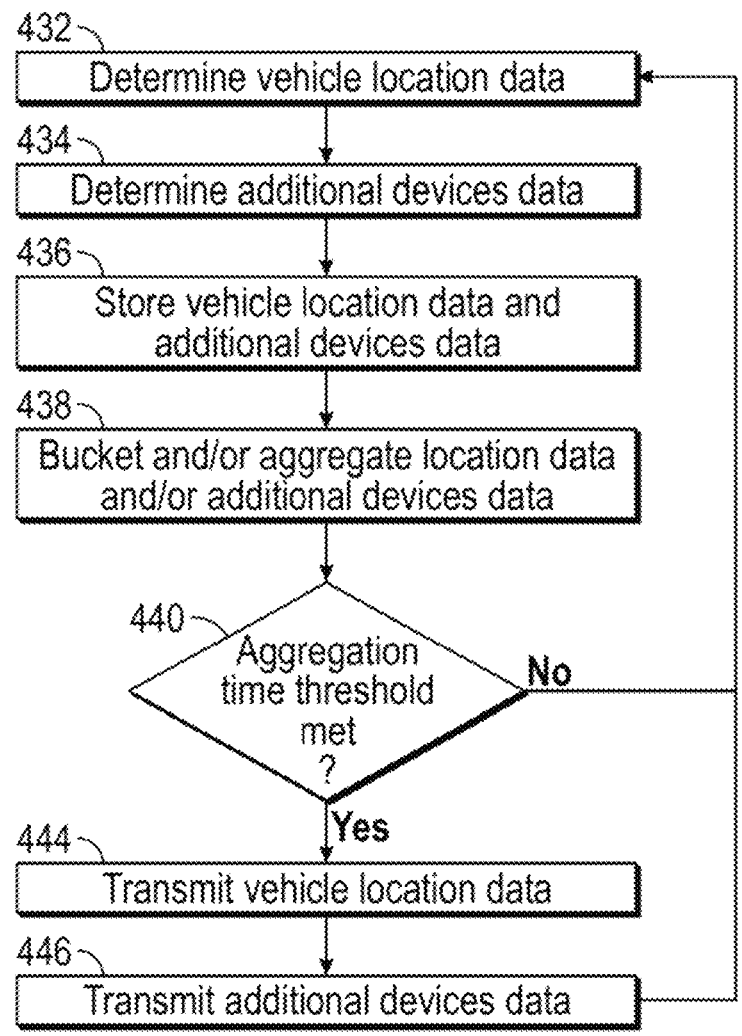

FIGS. 4A-4B are flowcharts illustrating example methods and functionality related to efficient data aggregation on a vehicle gateway device 150, according to various embodiments of the present disclosure. Turning to FIG. 4A, beginning at block 402, raw vehicle data can be received. In particular, the vehicle gateway device 150 can receive the raw vehicle data. The vehicle gateway device 150 can receive the raw vehicle data via the vehicle interface 326 with a vehicle 110. The vehicle gateway device 150 can communicate with electronic controllers of the vehicle 110 and/or the vehicle's computer over the vehicle interface 326 and the vehicle bus. The communication between the vehicle gateway device 150 and the vehicle 110 can use a particular communication protocol, such as OBD-II or J1939. In some embodiments, the vehicle gateway device 150 can record broadcasted data over the vehicle bus, thereby receiving the raw vehicle data. Additionally or alternatively, the vehicle gateway device 150 can request raw vehicle data over the vehicle bus. The raw vehicle data can be received over a period of time. As described herein, example raw vehicle data can include any vehicle diagnostic data, such as, but not limited to, data related to cruise control use, coasting, accelerator pedal use, idling, battery state, anticipation, motor rotations per minute, motor power, fuel level, engine revolutions per minute (RPM), speed, engine torque, engine load, brake use, etc. of the vehicle 110.

In some embodiments, the vehicle gateway device 150 can receive vehicle battery data associated with a battery from the vehicle 110. The vehicle battery data can represent a state of the vehicle battery. The vehicle battery data can be for an electric vehicle, a hybrid vehicle (such as a plug-in hybrid electric vehicle), or internal combustion engine (ICE) vehicles. The vehicle gateway device 150 can listen for battery-related messages from a battery management system (BMS) of the vehicle 110. Additionally or alternatively, the vehicle gateway device 150 can request vehicle battery data from the battery management system.

At block 404, the raw vehicle data can be decoded and/or translated. In particular, the vehicle gateway device 150 can decode and/or translate the raw vehicle data. The raw vehicle data can be in a particular data format, such as an OBD-II or J1939 data format. Accordingly, the vehicle gateway device 150 can decode and/or translate the raw vehicle data in the particular data format. The vehicle gateway device 150 can decode and/or translate the raw vehicle data based at least in part on rules specifically related to the vehicle. For example, the vehicle gateway device 150 can include rules for decoding particular data formats, such as OBD-II or J1939. The vehicle gateway device 150 can use different sets of rules for decoding and/or translating data from a particular vehicle depending on the communication protocol that the particular vehicle uses. In some embodiments, the vehicle gateway device 150 can decode and/or translate vehicle battery data from messages from the battery management system (BMS). Additionally or alternatively, the vehicle gateway device 150 can store the raw vehicle data in its original data format.

At block 406, vehicle metric data can be determined. In particular, the vehicle gateway device 150 can determine vehicle metric data from the raw vehicle data. For example, the raw vehicle data regarding cruise control use, coasting, accelerator pedal use, idling, battery state, anticipation, motor rotations per minute, motor power, fuel level, engine revolutions per minute (RPM), speed, engine torque, engine load, brake use, etc. can be voluminous. The vehicle gateway device 150 can parse and organize the raw vehicle data into individual vehicle metrics. For example, a value and/or on/off state can be determined for each of cruise control use, coasting, accelerator pedal use, idling, battery state, anticipation, motor rotations per minute, motor power, fuel level, engine revolutions per minute (RPM), speed, engine torque, engine load, brake use, etc. over the period of time. Moreover, some example vehicle metrics can be based on a combination of vehicle parameters. For example, a vehicle metric can be for coasting. The vehicle gateway device 150 can determine the vehicle metric for coasting to be either true or false based on a combination of vehicle parameters, such as engine torque, vehicle speed, brake pedal engagement, and/or accelerator pedal engagement. In particular, the vehicle gateway device 150 can determine the vehicle metric for coasting to be true when each of the following are determined to be true: engine torque is zero, vehicle speed is greater than zero, brake pedal is not engaged, and accelerator pedal is not engaged.

Another example of determined vehicle metric can be for accelerator pedal engagement. In some embodiments, accelerator pedal data from the vehicle bus may be unreliable. Accordingly, the vehicle gateway device 150 can determine the vehicle metric for accelerator pedal engagement based on at least one of engine torque or engine load. For example, the vehicle gateway device 150 can determine the vehicle metric for accelerator pedal engagement as a percentage based value ranges for engine torque and/or engine load.

Yet another example of determined vehicle metric can be for anticipation. Anticipation can generally refer to driver behavior with respect to anticipating having to brake, which can be indicative of fuel/energy efficient driving. For example, those drivers that anticipate traffic in their driving will typically not have to brake as hard. The vehicle metric for anticipation can be a categorizations of brake events, such as, any brake event and/or a quick brake event. The vehicle gateway device 150 can determine the brake event category based on a combination of vehicle parameters, such as brake pedal engagement, accelerator pedal engagement, engine torque, and/or engine load. In particular, the vehicle gateway device 150 can determine the vehicle metric for a quick brake event when each of the following are determined: the accelerator pedal is disengaged and the brake pedal is subsequently engaged in approximately less than one second. Any brake event can include any time the driver presses the brake pedal.

At block 408, the vehicle metric data can be stored. In particular, the vehicle gateway device 150 can store the vehicle metric data in the computer-readable storage medium(s) 330. For example, the vehicle gateway device 150 can store the vehicle metric data in a database on the computer-readable storage medium(s) 330. As described herein, aggregated bucketed vehicle metric data may be generated by the vehicle gateway device 150 and transmitted to the management server 140. However, in some environments, the management server 140 may query the vehicle gateway device 150 for particular vehicle metric data, which can be retrieved from the computer-readable storage medium(s) 330.

At block 410, the vehicle metric data can be bucketed. In particular, the vehicle gateway device 150 can determine corresponding vehicle metric buckets for each of the vehicle metrics. In some embodiments, there can be a single bucket for a particular metric. One example category of buckets is an engine revolutions per minute (RPM) category. Example buckets for RPM can include RPM bands with RPM ranges for each band. Example RPM band buckets include a first bucket for an RPM band of approximately 800-1700 RPM and a second bucket for an RPM band starting from a low of approximately 700-900 RPM to a high of approximately 1600-1800 RPM. In some embodiments and vehicles, the RPM band of approximately 800-1700 RPM can be an efficient range for operating a vehicle with respect to fuel/energy use and the RPM bands starting from a low of approximately 700-900 RPM to a high of approximately 1600-1800 RPM can be inefficient ranges for operation of the vehicle with respect to fuel/energy use. The bucket of 800-1700 RPM can be considered a "green" RPM range. Conversely, the other bucket can be considered a "red" RPM range(s). If the vehicle metric data includes RPM values of 798, 799, and 800 for each millisecond, respectively, then the 800 RPM value can be placed in the efficient RPM bucket and the 798 and 799 RPM values can be placed in the inefficient bucket. In some embodiments, the particular buckets can be customized for types of vehicles. For example, different types of vehicles can have different recommended RPM ranges for fuel/energy efficiency. The "green band" RPM range for different vehicle may vary by plus or minus 50 to 100 RPM depending on the particular vehicle or type of vehicle. Many of the vehicle metrics described herein can be useful indicators for fuel/energy efficient driving or the lack thereof.

Another example category of buckets is a cruise control category. Example buckets for cruise control can include a cruise control on bucket and a cruise control off bucket. For example, if the vehicle metric data includes instances of cruise control being on for timestamps 1 and 2 and cruise control being off for timestamp 3, then the first two instances can be placed in the cruise control on bucket and the remaining instance can be placed in the cruise control off bucket. Use of cruise control can increase or be indicative of fuel/energy efficient driving.

Yet another example category of buckets is a coasting category. Example buckets for coasting can include a coasting true bucket and a coasting false bucket. For example, if the vehicle metric data includes instances of coasting being true for timestamps 1 and 2 and coasting being false for timestamp 3, then the first two instances can be placed in the coasting true bucket and the remaining instance can be placed in the coasting false bucket. As described herein, the determination of whether coasting is true or false at a particular timestamp can be based on a number of vehicle parameters, such as engine torque, vehicle speed, brake pedal engagement, and/or accelerator pedal engagement. Similar to previous metrics, use of coasting can increase or be indicative of fuel/energy efficient driving.

Similar to the previous bucket examples, the following bucket examples can characterize the state of a vehicle over a period of time at respective timestamps of the vehicle. Yet another example category of buckets is an accelerator pedal engagement category. Example buckets for accelerator pedal engagement can include a first bucket for accelerator pedal engagement over approximately 95 percent, and a second bucket for accelerator pedal engagement less than or equal to approximately 95 percent. Yet another example category of buckets is for idling. Example buckets for idling can include a first bucket for idling true, and a second bucket for idling false. Yet another example category of buckets is for anticipation. Example buckets for idling can include a first bucket for any brake event, and a second bucket for a quick brake event. Similar to previous metrics, reduced use of accelerator pedal engagement above 95% and/or reduced idling can increase or be indicative of fuel/energy efficient driving.

Another example bucket is a bucket for a particular vehicle battery charge. For example, in the context of an electric vehicle or a plug-in hybrid electric vehicle, the vehicle gateway device 150 can determine that vehicle battery data is associated with a particular instance of a vehicle battery charge.

At block 412, the vehicle metric data can be aggregated. In particular, the vehicle gateway device 150 can aggregate, over the period of time, the vehicle metrics into the corresponding vehicle metric buckets to generate aggregated bucketed vehicle metric data. The vehicle gateway device 150 can represent the aggregations differently based on the embodiment or in multiple ways. For example, the vehicle gateway device 150 can aggregate a cumulative time spent in each bucket. In the case of RPM buckets, the vehicle gateway device 150 can aggregate a cumulative time spent in each bucket (e.g., 1 minute and 10 seconds in the "green" bucket and 2 minutes and 15 seconds in the "red" bucket). Additional example aggregations can include: time spent with cruise control on and time spent with cruise control off; time spent coasting as true and time spent coasting as false; time spent with the accelerator pedal engagement over approximately 95 percent and time spent with the accelerator pedal engagement less than or equal to approximately 95 percent; and/or time spent idling as true and time spent idling as false. Additionally or alternatively, the vehicle gateway device 150 can represent the time spent in each bucket as a percentage. In some embodiments, the vehicle gateway device 150 can store the bucketed vehicle metric data and/or the aggregated bucketed vehicle metric data in the computer-readable stored medium(s) 330 of the vehicle gateway device 150.

In some embodiments, the vehicle gateway device 150 can aggregate, over the period of time, quantities. For example, if each bucket has discrete items (such as events), the vehicle gateway device 150 can aggregate the discrete items in each bucket. In the case of anticipation buckets, the vehicle gateway device 150 can aggregate the total number of any type of brake event in a first bucket and the total number of quick brake events in the second bucket. For example, the vehicle gateway device 150 can aggregate the first bucket to have a total of 15 of any type of brake events and the second bucket to have a total of 5 of quick brake events. Additionally or alternatively, the vehicle gateway device 150 can represent each aggregated bucket total as a percentage.

In some embodiments, the vehicle gateway device 150 can aggregate bucket(s) for a vehicle battery charge by determining charge record(s) from the vehicle battery data. An example charge record can include (i) data indicative of an amount of energy charged relative to a capacity of the battery (such as a percentage of the battery charged for a particular charge instance) and (ii) an amount of energy charged relative to a period of time (such as a charge amount in a unit of energy like kilowatt-hour (kWh)). Another example charge record can include (i) a start state of charge, (ii) an end state of charge, and (iii) an amount of energy charged. As described herein, the vehicle gateway device 150 can transmit historical vehicle battery data to the management server 140 and the management server 140 can determine charge record(s) from the historical vehicle battery data. Depending on the embodiment, the historical vehicle battery data can include charge record(s) or the historical vehicle battery data can include the underlying data with which the management server 140 can calculate the charge record(s).

At block 414, it can be determined whether the aggregation time threshold has been met. In particular, the vehicle gateway device 150 can determine whether the aggregation time threshold has been met. Example aggregation time thresholds can include 1 minute, 2 minutes, 5 minutes, etc. The vehicle gateway device 150 can maintain a running timer to determine whether the aggregation time threshold has been met. Additionally or alternatively, the vehicle gateway device 150 can maintain a last expiration time variable and can determine a difference between the last expiration time with a current time. When the difference between the last expiration time and the current time is greater than or equal to the aggregation time threshold, the vehicle gateway device 150 can determine that the aggregation time threshold has been met. If it has been determined that the aggregation time threshold has been met, the method can proceed to block 418 for transmitting the aggregated data. Otherwise, the method can return to block 402 to receive more vehicle data and operate in a loop until the aggregation time threshold has been met.

In some embodiments, there can be different time thresholds for different vehicle metrics. For example, metrics regarding RPM and fuel level can be provided to the management server 140 more regularly, such as every five minutes. As another example, the vehicle battery data and/or the battery charge record(s) can be provided once or twice a day from the vehicle gateway device 150 to the management server 140.

In some embodiments (while not illustrated), while the block 412 for aggregating bucketed vehicle metric data appears before the block 414 for determining whether the aggregation time threshold has been met, the reverse can occur. Specifically, the block 412 for aggregating bucketed vehicle metric data can occur after the block 414 that determines whether the aggregation time threshold has been met. For example, if the aggregation time threshold has been met (such as five minutes), the vehicle gateway device 150 can then aggregate the bucketed data and then proceed to block 418 for transmitting the aggregated data.

At block 418, the aggregated bucketed vehicle metric data can be transmitted. In particular, in response to determining that an aggregation time threshold is met, the vehicle gateway device 150 can transmit, to a receiving server system (such as the management server 140), the aggregated bucketed vehicle metric data. For example, the vehicle gateway device 150 can transmit any of the aggregated bucketed data relating to cruise control use, coasting, accelerator pedal use, idling, battery state, anticipation, motor rotations per minute, motor power, fuel level, engine revolutions per minute (RPM), speed, engine torque, engine load, brake use, etc. In particular, the vehicle gateway device 150 can transmit charge records to a computing device such as the management server 140. In some embodiments, if the vehicle gateway device 150 loses network connection, the vehicle gateway device 150 can queue aggregated vehicle data until it obtains the network connection again. As shown, after the data has been transmitted, the method can return to block 402 to receive more data and perform in a loop until the aggregation time threshold is met again.

Accordingly, the vehicle gateway device 150 can advantageously transmit vehicle data in an efficient manner. Example advantages (not all of which may be applicable in every embodiment) can include the following. For example, instead of the vehicle gateway device 150 transmitting vehicle data with a higher frequency (such as every millisecond), the vehicle gateway device 150 can transmit the vehicle data with a lower frequency. This can result in lower bandwidth usage. As another example, instead of transmitting vehicle individual data items (such as cruise control use, RPM, speed, engine torque, engine load, brake use, etc. for every millisecond), the vehicle gateway device 150 transmits aggregated vehicle data. Accordingly, the aggregated vehicle data can have a smaller data size than the total data size of the individual data items. In other words, the aggregated vehicle data can be a compressed, summary data representation of the raw vehicle data. This can be advantageous because the compressed vehicle data can use less network bandwidth and/or can be transmitted to the destination server faster in contrast to the individual data items that would use more network bandwidth and/or would be transmitted slower.

Turning to FIG. 4B, beginning at block 432, vehicle location data can be determined. In particular, the vehicle gateway device 150 can determine the vehicle location data. For example, the vehicle gateway device 150 can receive location data from the location device(s), such as GPS or GLONASS receivers. The location data can be associated with timestamps. Accordingly, the vehicle gateway device 150 can determine geolocation data associated with the vehicle 110, which can include time data.

At block 434, data from the additional device(s) can be determined. In particular, the vehicle gateway device 150 can receive data from the additional device(s). For example, the vehicle gateway device 150 can receive camera data and/or sensors data. Similar to the vehicle location data that can be associated with timestamps, the additional devices data can be associated with timestamps. At block 436, the vehicle location data and/or the additional devices data can be stored. In particular, the vehicle gateway device 150 can store the vehicle location data and/or the additional devices data in the computer-readable stored medium(s) 330 of the vehicle gateway device 150.

At block 438, data can be aggregated and/or bucketed. In particular, the vehicle gateway device 150 can aggregate the vehicle location data and/or the additional devices data. For example, as opposed to a time series that includes pairs of time values and data values for relatively small units of time, the vehicle gateway device 150 can aggregate at least one of the vehicle location data or the additional devices data to represent that a respective data value is associated with a period time. Additionally or alternatively, the vehicle location data and/or the additional devices data can be bucketed. The block 438 for aggregating/bucketing data can be similar to blocks 410, 412 of FIG. 4A for aggregating/bucketing data. For example, similar to the bucketed vehicle metric data that was aggregated by the vehicle gateway device 150 described above with respect to FIG. 4A, the vehicle location data and/or the additional devices data can be bucketed/aggregated by the vehicle gateway device 150. For example, in the case of vehicle location data, particular locations or location areas can each have respective buckets and the vehicle gateway device 150 can determine how much time the vehicle 110 spent at each location or location area over a period of time, i.e., a cumulative time for each location bucket. For example, in the case of additional sensor data, ranges of the sensor data can each have respective buckets and the vehicle gateway device 150 can determine how much time the sensor spent within the respective sensor ranges over a period of time, i.e., a cumulative time for each sensor range bucket.

At block 440, it can be determined whether the aggregation time threshold has been met. In particular, the vehicle gateway device 150 can determine whether the aggregation time threshold has been met. The block 440 for determining whether the aggregation time threshold has been met can be similar to block 414 of FIG. 4A for determining whether the aggregation time threshold has been met. For example, the aggregation time threshold can be the same for the aggregated vehicle data, the vehicle location data, and/or the additional devices data. Also, in some embodiments, while not illustrated, the block 438 for aggregating/bucketing data can be performed after it has been determined that the aggregation time threshold has been met. If the aggregation time threshold has been met, the method can proceed to block 444. Otherwise, the method can return to block 432 to receive more vehicle location data and/or additional devices data and perform in a loop until the aggregation time threshold has been met. At blocks 444, 446, the vehicle location data and/or the additional devices data can be transmitted to a receiving server system. In particular, the vehicle gateway device 150 can transmit the vehicle location data and/or the additional devices data (which can be aggregated/bucketed) to the management server 140. As shown, after the data has been transmitted, the method can return to block 432 to receive more data and perform in a loop until the aggregation time threshold is met again.

Figure 5A:
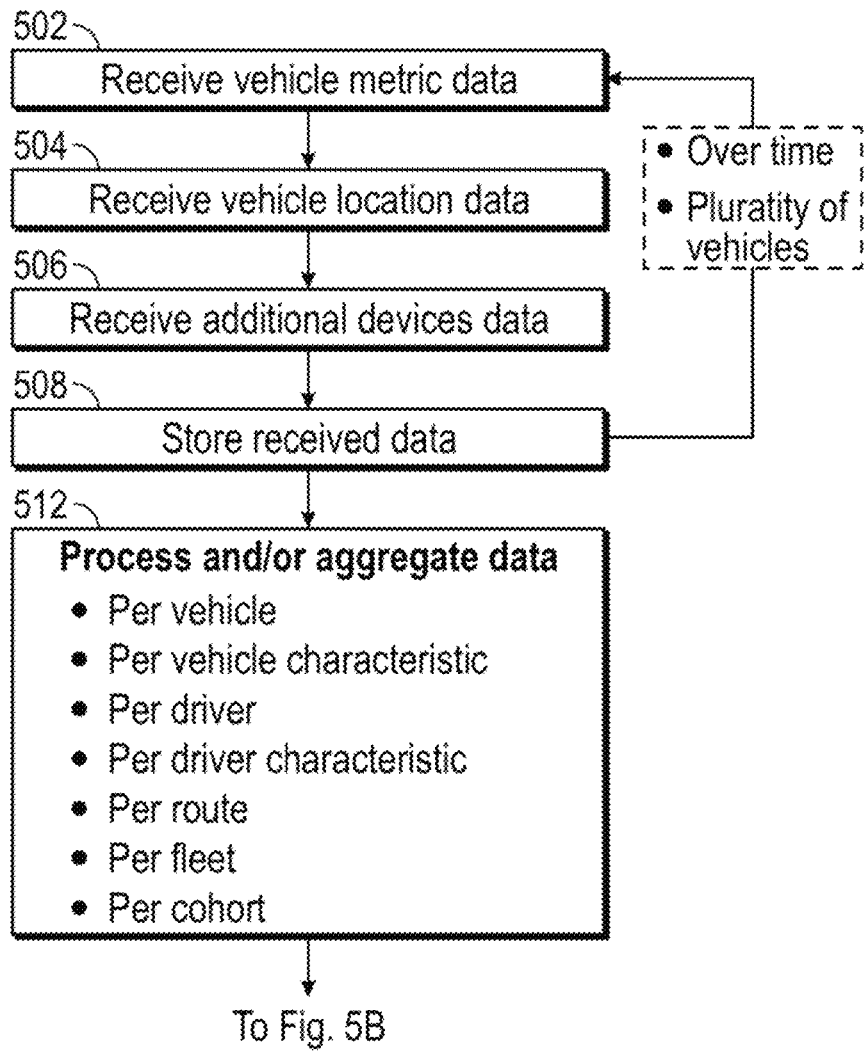
FIGS. 5A-5B are flowcharts illustrating example methods and functionality related to processing vehicle-related data and using the processed data, according to various embodiments of the present disclosure.
Figure 5B:
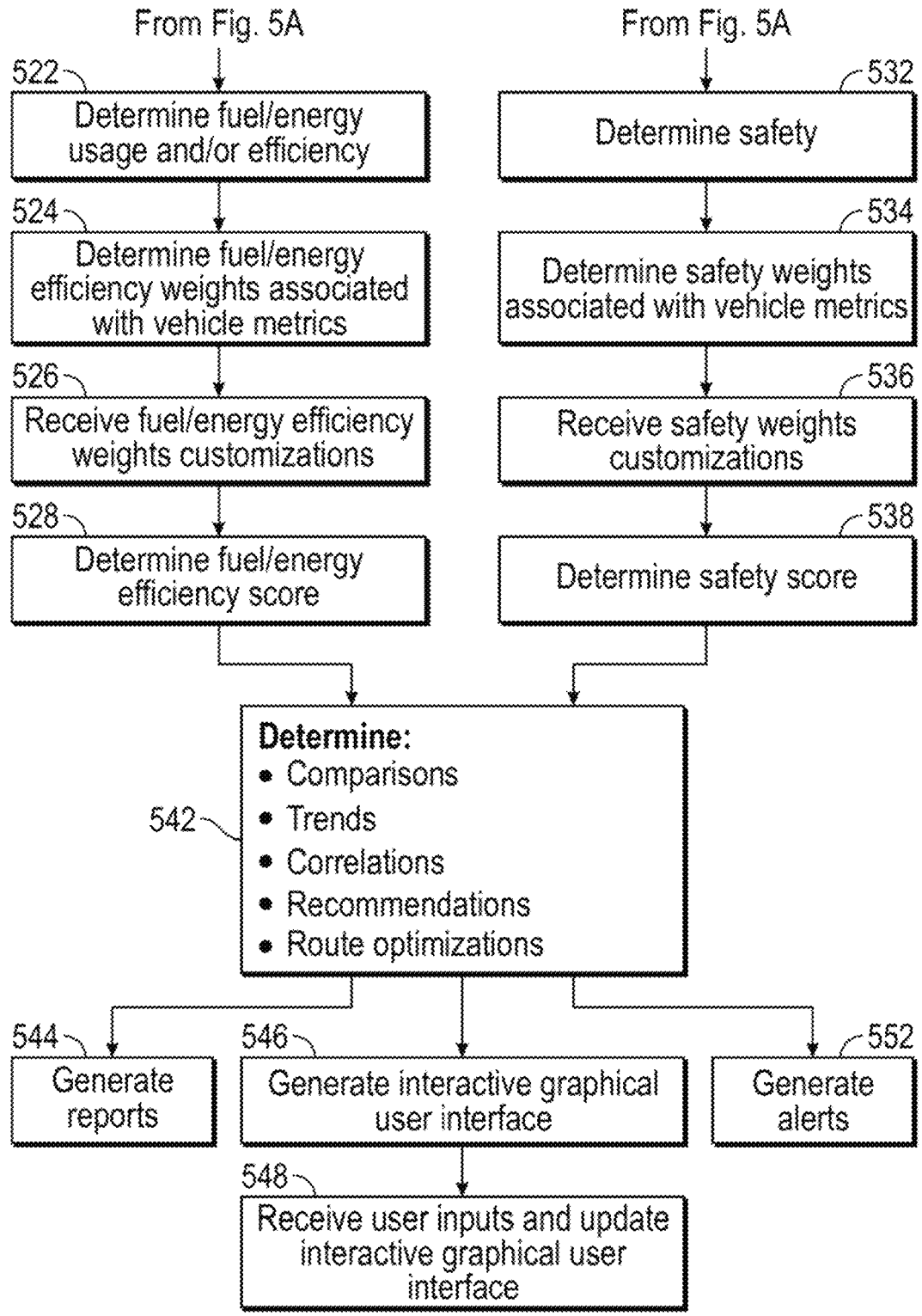

VII. Example Methods and Functionality for Processing Received and/or Aggregated Data FIGS. 5A-5B are flowcharts illustrating example methods and functionality related to processing vehicle-related data and using the processed data. Turning to FIG. 5A, beginning at blocks 502, 504, 506, data can be received. In particular, at block 502, a computing device (such as the management server 140) can receive vehicle metric data (such as the aggregated bucketed vehicle metric data) from the vehicle gateway device 150. At block 504, the computing device can receive vehicle location data from the vehicle gateway device 150. At block 506, the computing device can receive additional devices data from the vehicle gateway device 150. Other data can be received, such as data from third parties and/or data regarding fuel/energy purchasing. As described herein, the computing device (such as the management server 140) can receive the data in batches or intervals. At block 508, the received data can be stored. In particular, the management server 140 can store the received data in the computer-readable stored medium(s) 210, such as by storing the received data in the analysis-related database 256.

As depicted, the blocks 502, 504, 506, 508 for receiving and storing data can operate in a loop by returning to the first block 502. Thus, the management server 104 can receive and/or store data for multiple vehicle gateway devices and/or vehicles over time.

At block 512, the data can be processed and/or aggregated. In particular, the management server 140 can process and/or aggregate the data. As described herein, the management server 140 can receive bucketed data for a particular time window. Accordingly, the management server 140 can combine and/or take a portion of the bucketed data. For example, the management server 140 can determine a vehicle metric for a certain time period (such as one or several days) by at least combining bucketed data within the time period, where each bucket of data can correspond to a subset of the time period (such as bucketed data for every five minutes).

Figure 7A:
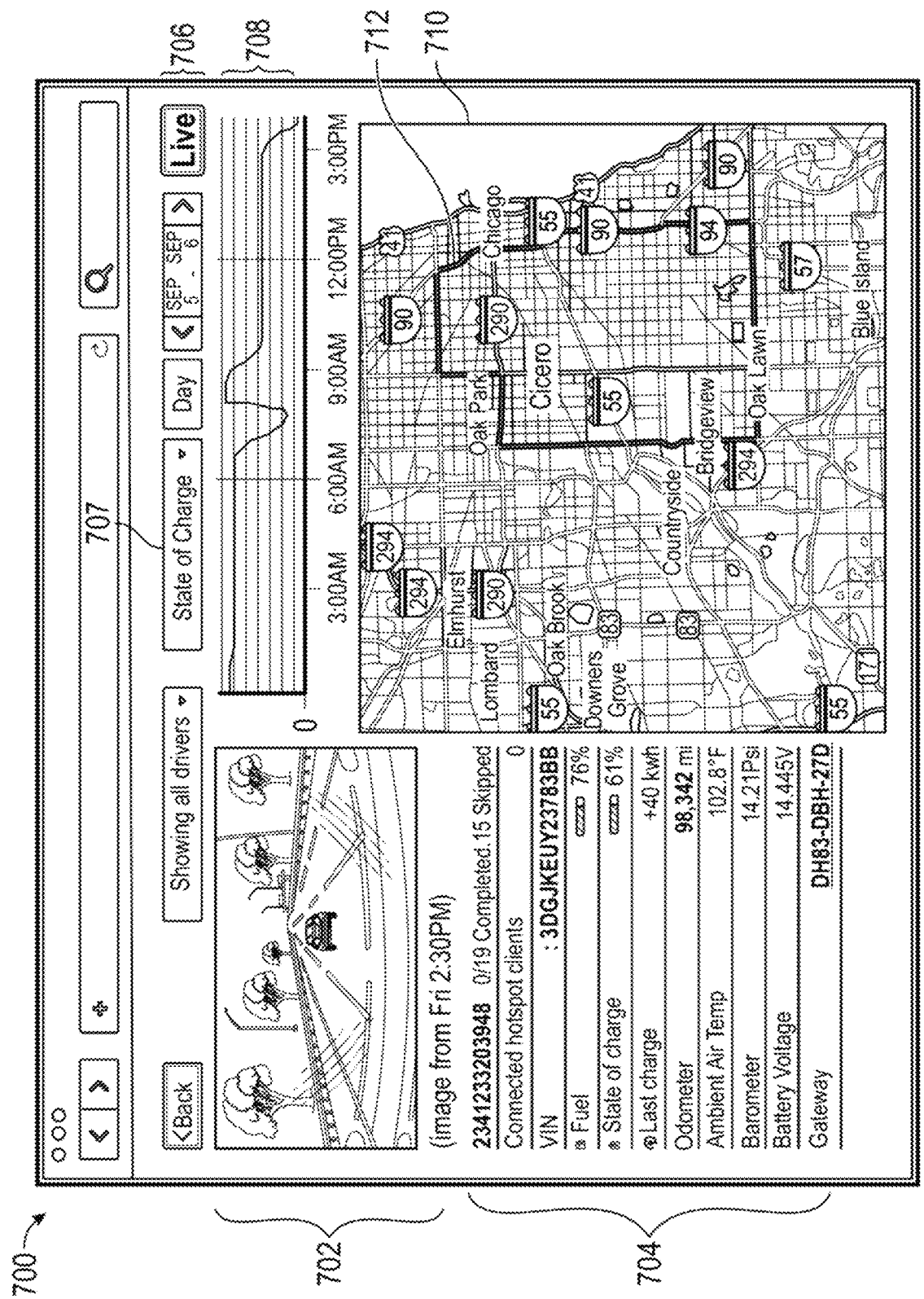
FIG. 7A illustrates an example interactive graphical user interface for presenting vehicle metadata, according to various embodiments of the present disclosure.
Figure 8A:
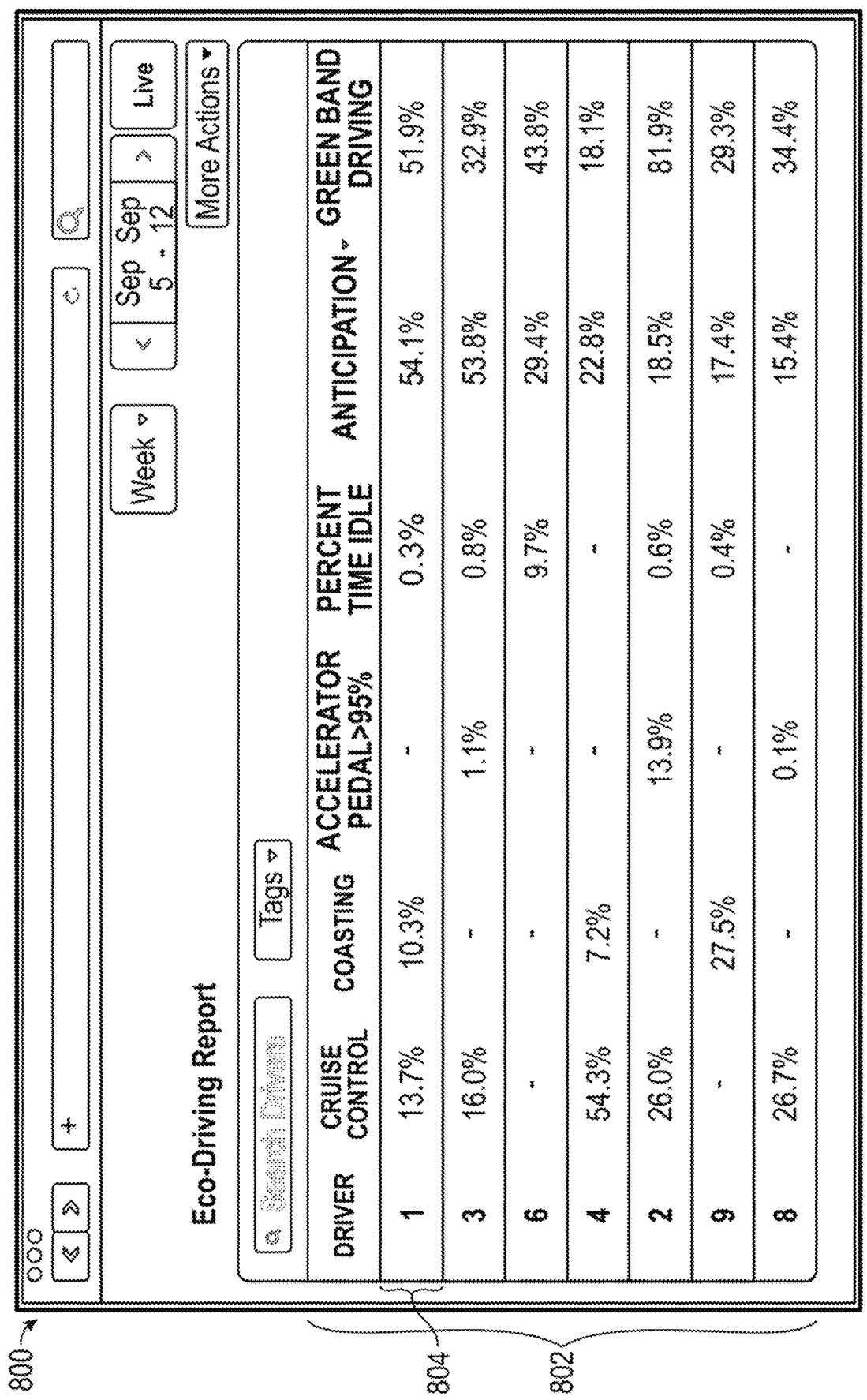

The management server 140 can aggregate/filter data based on a property in common. Example common properties can include a common vehicle, vehicle characteristic, driver, driver characteristic, route, fleet, cohort, and/or time period. The graphical user interfaces 700, 900, described in further detail below with respect to FIGS. 7A and 9, respectively, can depict aggregated data by vehicle. For example, as shown in FIG. 7A, the management server 104 can aggregate the state of charge (or other vehicle metric) of a particular vehicle. As shown in FIG. 9, the management server 104 can aggregate various metrics by vehicle to determine, for example, fuel/energy consumed or total miles driven. The graphical user interface 800, described in further detail below with respect to FIG. 8A, can depict aggregated data by driver. For example, as shown in FIG. 8A, the management server 104 can aggregate various vehicle metrics (such as cruise control, coasting, accelerator pedal, idling, anticipation, and/or RPM) by driver. The management server 104 can aggregate vehicle metrics from multiple vehicle gateway devices that are each associated with the same driver.

The management server 140 can combine different types of data. For example, the summary user interface 600, described in further detail below with respect to FIG. 6, can depict a combination of different types of data. To present the data in the summary user interface 600 of FIG. 6, the management server 140 can combine vehicle location data, vehicle metrics related to fuel/energy, speed data, and/or other vehicle metadata to display vehicle results, metadata, and the map 605. The management server 140 can aggregate the data based on a common characteristic, such as by a vehicle identifier.

The management server 104 can calculate some metrics. The summary user interface 900, described in further detail below with respect to FIG. 9, can depict some metrics that are calculated from other metrics. For example, as depicted in the user interface 900 of FIG. 9, the management server 104 can calculate estimated carbon emissions and/or effective mpg based on miles driven and/or other metrics.

In some embodiments, the management server 104 can pre-compute some metrics. For example, as the management server 104 receives data, the management server 104 can continuously process and/or aggregate the data on a running basis. Additionally or alternatively, the management server 104 can process and/or aggregate data in response to user requests. For example, the management server 104 can process and/or aggregate metrics in response to user selections to generate any of the user interfaces described herein.

From the block 512, the method can process data to determine different scores along different paths. For example, at block 522, fuel/energy usage and/or efficiency can be determined. In particular, the management server 104 can identify metrics associated with fuel/energy usage and/or efficiency. Example fuel/energy usage metrics can include, but are not limited to, fuel consumed, energy consumed, percent electric driving, total miles driven, carbon emissions, total emissions saved, energy recovered, and/or effective mpg. Example fuel/energy efficiency metrics can include, but are not limited to, cruise control use, coasting, accelerator pedal, time idling, anticipation, and/or RPM.

At block 524, fuel/energy efficiency weights associated with vehicle metrics can be determined. In particular, the management server 104 can determine fuel/energy efficiency weights using correlations. For example, the management server 104 can determine correlations among the vehicle metrics and the fuel/energy usage over various periods of time. Example correlations can indicate improved fuel/energy efficiency associated with one or more vehicle metrics, such as, but not limited to, cruise control use, coasting, accelerator pedal, time idling, anticipation, and/or RPM, and, in particular, a relative importance of particular vehicle metrics to efficient fuel/energy usage. The management server 104 can determine weightings of the one or more metrics based at least in part on the correlations. For example, it may turn out that RPM should have a higher weighting than coasting based on the impact on fuel/energy usage.

At block 526, fuel/energy efficiency weights customizations can be received. In particular, in some embodiments, the management server 104 can receive user-specified fuel/energy efficiency weights customizations. For example, an administrator can specify the relative importance of particular vehicle metrics for the purpose of determining fuel/energy efficiency.

At block 528, a fuel/energy efficiency score can be determined. In particular, the management server 104 can determine a fuel/energy efficiency score based on weights and the vehicle metric data. For example, the management server 104 can determine a fuel/energy efficiency score for a driver, route, vehicle, fleet, and/or cohort by combining multiple vehicle metrics according to the weightings. In some embodiments, a fuel/energy efficiency score can be calculated based on predefined weightings, which may not be based on system-determined correlations. The vehicle metrics can be weighted equally and/or differently. Example fuel/energy efficiency scores can be represented as a percentage, a letter, or some other indicator. The summary user interface 850, described in further detail below with respect to FIG. 8B, can depict some fuel/energy efficiency scores. As depicted in the user interface 850 of FIG. 8B, a letter score can be assigned to a vehicle, such as the first score 836, and/or to a group of vehicles, such as the second score 838. The management server 104 can assign a score to individual vehicle metrics. In some embodiments, predefined and/or user-defined percentages or value ranges can be assigned score indicators, such as an "A," "B," etc. efficiency grade.

From the block 512, the method can process data to determine a safety score along the paths including block 532. At block 532, safety can be determined. In some embodiments, the management server 104 can determine safety from driver history data. Example driver history data can indicate incidents associated with safety, such as incidents that involve an insurance provide like a car accident. Additionally or alternatively, safety can be determined without driver history data. For example, in some embodiments, the management server 104 can estimate safety based on known predictor metrics, such as coasting, anticipation, brake events, accelerator pedal use, cruise control use, etc.

At block 534, safety weights associated with vehicle metrics can be determined. In particular, the management server 104 can determine safety weights using correlations. For example, the management server 104 can determine correlations among the vehicle metrics and the driver history data over various periods of time. Example correlations can indicate improved safety associated with one or more vehicle metrics, such as, but not limited to, reduced hard accelerator pedal use, anticipation, cruise control use, coasting, etc., and, in particular, a relative importance of particular vehicle metrics to safety. The management server 104 can determine weightings of the one or more metrics based at least in part on the correlations. For example, it may turn out that reduced hard accelerator pedal use and/or anticipation should have a higher weighting than cruise control use based on the impact to vehicle safety.

At block 536, safety weights customizations can be received. In particular, in some embodiments, the management server 104 can receive user-specified safety weights customizations. For example, an administrator can specify the relative importance of particular vehicle metrics for the purpose of determining safety.

At block 538, a fuel/energy efficiency score can be determined. In particular, the management server 104 can determine a fuel/energy efficiency score based on weights and the vehicle metric data. For example, the management server 104 can determine a fuel/energy efficiency score for a driver, route, vehicle, fleet, and/or cohort by combining multiple vehicle metrics according to the weightings. In some embodiments, a fuel/energy efficiency score can be calculated based on predefined weightings, which may not be based on system-determined correlations. The vehicle metrics can be weighted equally and/or differently. Example fuel/energy efficiency scores can be represented as a percentage, a letter, or some other indicator. The summary user interface 850, described in further detail below with respect to FIG. 8B, can depict some fuel/energy efficiency scores. As depicted in the user interface 850 of FIG. 8B, a letter score can be assigned to a vehicle, such as the first score 836, and/or to a group of vehicles, such as the second score 838. The management server 104 can assign a score to individual vehicle metrics. In some embodiments, predefined and/or user-defined percentages or value ranges can be assigned score indicators, such as an "A," "B," etc. efficiency grade.

At block 542, comparisons, trends, correlations, recommendations, and/or route optimizations can be determined. In particular, the management server 104 can determine comparisons, trends, and/or correlations between different fleets and/or organizations. For example, the management server 104 can identify fleet sizes of similar sizes and generate comparison data regarding fuel/energy efficiency and/or safety. Thus, different fleets and/or organizations can be compared, which can allow organizations to improve fuel/energy efficiency and/or safety.

The management server 104 can include recommendation logic. For example, management server 104 can include rules where if drivers, vehicles, routes, and/or fleets have efficiency and/or safety scores below certain thresholds, then corresponding recommendations can be output for the efficiency and/or safety issues.

The management server 104 can perform route optimization. For example, the management server 104 fuel purchasing. The management server 104 can use the data regarding vehicles, geolocation data regarding the vehicles, the vehicle fuel/energy efficiency, driving behavior, and/or fuel level, to make routing recommendations for fuel stops. An example recommendation can indicate that after a delivery a vehicle should fuel at a particular gas station because, based on data from fuel card vendors, that the particular gas station may not be cheapest, but the vehicle may not have to make a left turn in or out and it will get the vehicle back on the route without adding significant stop time.

At block 542, a report can be generated. In particular, the management server 104 can generate reports that correspond to any of the user interfaces described herein. At block 546, interactive graphical user interfaces can be generated. In particular, the management server 104 can generate user interfaces that correspond to or are similar to any of the user interfaces described herein, such as the user interfaces described in further detail below with respect to FIGS. 6, 7A-7C, 8A-8B, 9, 10A-10B, 11, 12, and 13. At block 548, user input can be received and the graphical user interfaces can update. In particular, the management server 104 can generate update user interfaces in response to receiving user input, such as user selections and/or filters.

At block 552, alerts can be generated. In particular, the management server 104 can generate alerts related to vehicle metrics. For example, the management server 104 can generate alerts related to fuel/energy state, such as low fuel/battery charge and/or a completion or expected completion of a battery recharge. In some embodiments, the alerts can be user defined.

VIII. Example Monitoring and Data Analysis Graphical User Interfaces

FIGS. 6, 7A-7C, 8A-8B, 9, 10A-10B, 11, 12, and 13 illustrate example interactive graphical user interfaces related to monitoring and analysis of data from vehicle gateway devices, according to various embodiments of the present disclosure. The interactive graphical user interfaces of FIGS. 6, 7A-7C, 8A-8B, 9, 10A-10B, 11, 12, and 13 may be provided by the management server 140, and may be accessible via user device(s) 120. In general, received data and analysis data are automatically gathered from multiple vehicle gateway devices 150 by the management server 140 (as described herein), and the received data and analysis data may then be further aggregated and analyzed to provide information and insights as described herein. Typically, the graphical user interfaces provided by the management server 140 are specific to an organization, and may include information from multiple vehicle gateway devices 150 associated with the organization.

Figure 6:
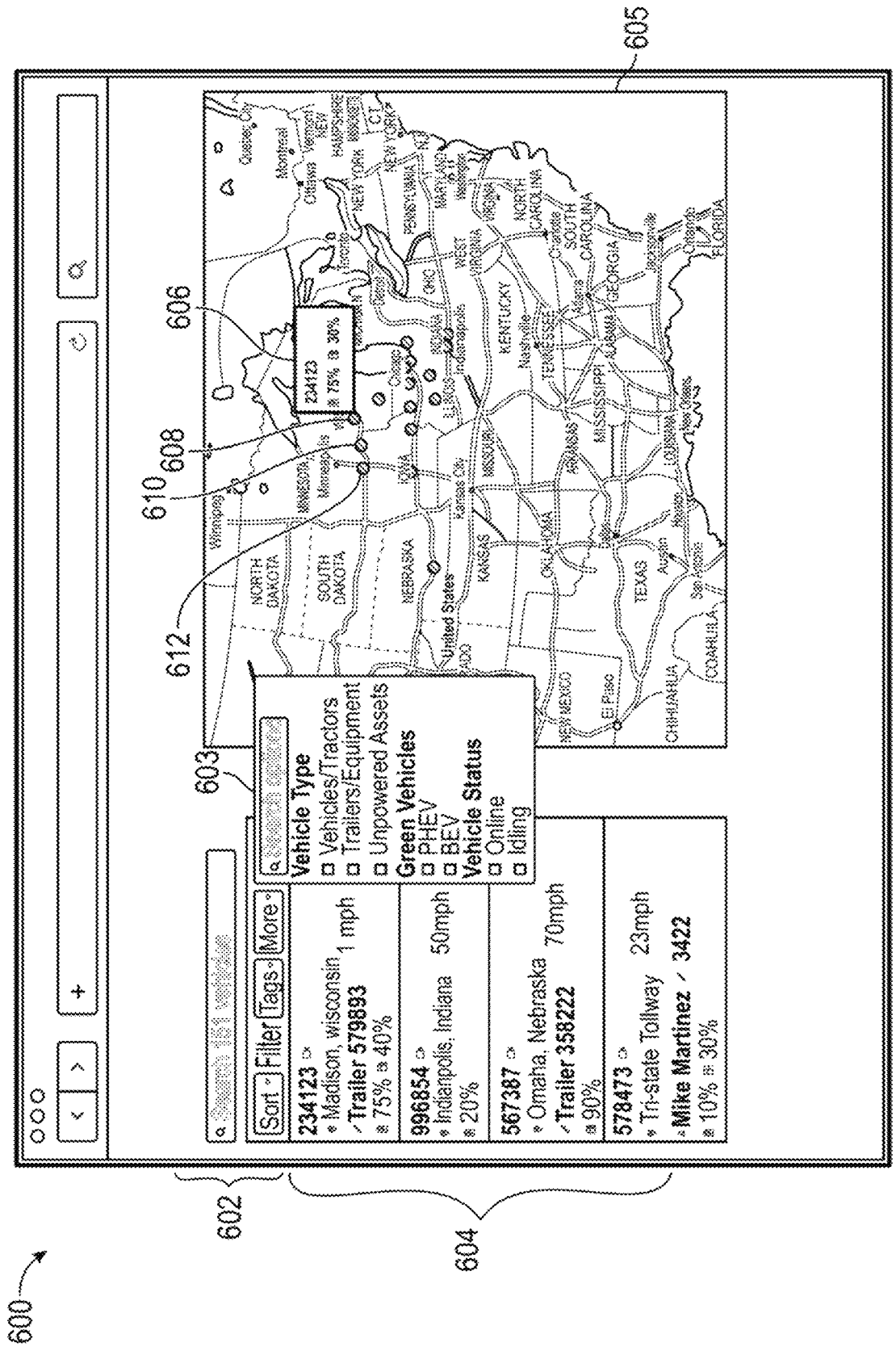
FIG. 6 illustrates an example interactive graphical user interface for searching/presenting vehicles and/or associated vehicle metadata, according to various embodiments of the present disclosure.

FIG. 6 illustrates an example interactive graphical user interface 600 for searching/presenting vehicles and/or associated vehicle metadata. The graphical user interface 600 can include search areas 602, 603, vehicle results 604, and a map 605. A user can search for vehicle(s) using the search areas 602, 603 by specifying text and/or filters. The map 605 can include annotations 606, 608, 610, 612 that correspond to results from the vehicle results 604. User selections, such as user input provided to the search areas 602, 603, can cause the vehicle results 604 and/or the map 605 to dynamically update. In particular, in response to user selection(s), the map can zoom-in on the filtered results. In some embodiments, an element associated with a vehicle in the graphical user interface 600 is selectable and can cause presentation of a vehicle-specific user interface, such as the graphical user interface 700 described below with respect to FIG. 7A.

FIG. 7A illustrates an example interactive graphical user interface 700 for presenting vehicle metadata for a particular vehicle. As described herein, a vehicle gateway device can transmit vehicle metadata, such as metrics and/or location data, to the management server 104, which can cause presentation of the graphical user interface 700 that can include or be based on the metadata. The graphical user interface 700 can include vehicle metadata 704. The graphical user interface 700 can include an image 702 captured from a camera in the vehicle. The graphical user interface 700 can include a map 710. The map 710 can be based on the location data received from the vehicle gateway device of the vehicle. The map 710 can display route(s) 712 of the vehicle. The graphical user interface 700 can include visualizations based on the vehicle metric(s), such as the visualization 708. The visualization 708 can visually depict a graph for the state of charge metric over a period of time. A user can change the metric associated with the visualization 708 with the metric selector 707, which can cause the visualization 708 to update accordingly. A user can select a particular date/time range of interest with the interface selector(s) 706 and may select how at least some of the data associated the vehicle should be aggregated (e.g., day, week, month, etc.) and presented within the graphical user interface 700. Using the interface selector(s) 706, the user may determine whether the displayed data is live data, and may select to view live, constantly updated data being received from the vehicle. As depicted, additional interface selector(s) 706 can allow a user to select a particular operator of the vehicle, which can cause graphical user interface 700 to update accordingly.

Figure 7B:
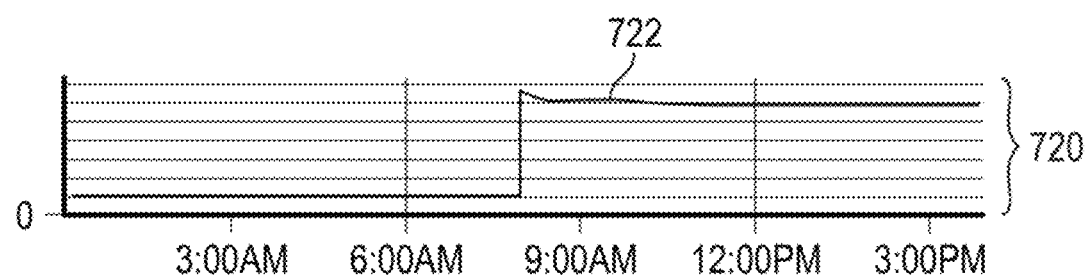
FIGS. 7B-7C illustrate example visualizations of battery charge metrics, according to various embodiments of the present disclosure.
Figure 7C:
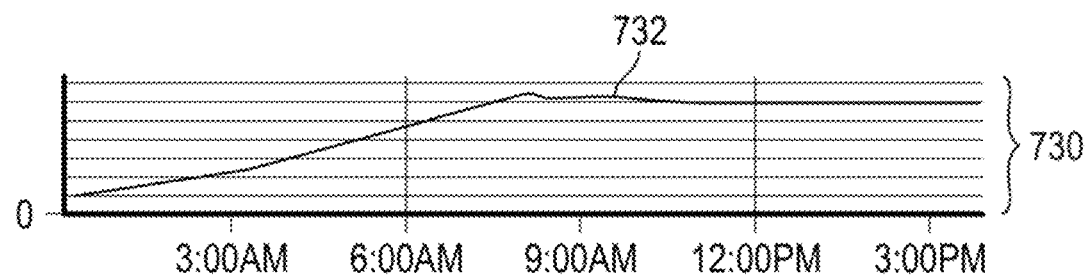

FIGS. 7B-7C illustrate example visualizations of battery charge metrics, which can be included in graphical user interfaces. In FIG. 7B, the visualization 720 includes a graph 722 that represents a vehicle battery's charge over time, as indicated by the vehicle metrics from the vehicle gateway device. As described herein, in some cases, the vehicle gateway device may be unable to accurately report a vehicle's battery charge while the vehicle is charging because the vehicle may be in an off state. Accordingly, the visualization 720 and the graph 722 can be generated by a system that does not have estimation features enabled and is reporting the most recent battery charge data as transmitted by the vehicle gateway device. As depicted, the graph 722 has a flat line and then suddenly and sharply increases in value. The sudden increase in value in the graph 722 can correspond to when the vehicle stopped charging and/or the vehicle was turned on again, which allowed the vehicle gateway device to transmit an updated vehicle charge metric.

In FIG. 7C, the visualization 730 includes a graph 732 that represents an estimated vehicle battery's charge over time. As mentioned above, the visualization 730 can be included in a graphical user interface. For example, the visualization 730 of FIG. 7C can be presented in the graphical user interface 700 and can replace the visualization 708 of FIG. 7A. In contrast with the graph 722 of FIG. 7B that included a sudden increase in charge value when the battery metric became available, the graph 732 of FIG. 7C can more accurately represent a vehicle charge because the server can estimate the graph 732 from historical data, as described herein.

FIGS. 8A-8B illustrate example interactive graphical user interfaces related to driver efficiency. In FIG. 8A, the graphical user interface 800 includes a vehicle metric summary area 802. The vehicle metric summary area 802 can include vehicle metrics, which can be based on aggregated and/or filtered data. As described herein, the vehicle metrics can be aggregated and/or filtered by driver and/or for a particular time period. For example, the first set of vehicle metrics 804 in the vehicle metric summary area 802 can be associated with a first driver, such as the driver "1" here.

The vehicle metrics in the vehicle metric summary area 802 can be associated with fuel/energy efficiency and/or safety. As depicted, the vehicle metrics can be associated with cruise control, coasting, the accelerator pedal, idling, anticipation, and RPM range(s) (e.g., "GREEN BAND DRIVING." The vehicle metrics in the vehicle metric summary area 802 can be fuel/energy efficiency and/or safety indicators. The vehicle metrics 804 can include percentages, which can indicate an amount of use of those particular features. For example, the first set of vehicle metrics 804 can include percentages, such as "13.7%," that indicates that a driver (here driver "1") used cruise control 13.7% of the time over the specified time period.

In FIG. 8B, the graphical user interface 850 can be similar to the graphical user interface 800 of FIG. 8A. Similar to the vehicle metric summary area 802 of FIG. 8A, the vehicle metric summary area 832 can include vehicle metrics and the vehicle metrics can be aggregated and/or filtered for a particular driver and/or for a particular time period. However, the vehicle metrics in FIG. 8B can be represented differently than the metrics in FIG. 8A. The vehicle metrics in the vehicle metric summary area 832 can include fuel/energy efficiency and/or safety indicators, a fuel/energy efficiency score for a particular driver, and/or an overall fuel/energy efficiency score for multiple drivers. For each of the vehicle metrics (such as cruise control, coasting, engine torque, idling, anticipation, and RPM range(s)), a fuel/energy efficiency and/or safety indicators can be assigned. As depicted, example indicators can be represented as a letter. While a letter for a score is used in FIG. 8B, other score representations can be used by the system. In some embodiments, a percentage and/or other numeric value for a vehicle metric can be determined for the results, and the percentage and/or or other numeric value within a range or threshold can be assigned an indicator, such as a score/letter. With reference to the first set of vehicle metrics 834, a fuel/energy efficiency score 836 can represent a combined score for a particular driver, where the score 836 can be based on the first set of vehicle metrics 834, as described herein.

In FIG. 8B, the graphical user interface 850 can further include aggregated vehicle metrics 840 and a fuel/energy efficiency score 838 for multiple drivers. The aggregated vehicle metrics 840 can be an aggregation of metrics for multiple drivers. Similarly, the fuel/energy efficiency score 838 can be a score for multiple drivers and/or can be based on the aggregated vehicle metrics 840.

FIG. 9 illustrates an example interactive graphical user interface 900 for analyzing vehicle fuel/energy usage. The graphical user interface 900 includes a fuel/energy usage summary area 902, which can include metrics related to fuel/energy usage. The fuel/energy usage metrics in the fuel/energy usage summary area 902 can be based on aggregated and/or filtered data. As described herein, the fuel/energy usage metrics can be aggregated and/or filtered by vehicle and/or for a particular time period. For example, the first set of fuel/energy usage metrics 904 in the fuel/energy usage summary area 902 can be associated with a first vehicle, such as the vehicle "14783" here. As depicted, example fuel/energy usage metrics can be related to fuel consumed, energy consumed, percentage of electric driving, total distance driven, carbon emissions, and/or fuel economy, such as effective miles per gallon.

FIGS. 10A-10B illustrate example interactive graphical user interfaces for analyzing vehicle charging. In FIG. 10A, the graphical user interface 1000 includes a vehicle charging summary area 1002, which can include summary metrics related to vehicle charging. The charging summary metrics in the vehicle charging summary area 1002 can be based on aggregated and/or filtered data. As described herein, the charging summary metrics can be aggregated and/or filtered by vehicle and/or for a particular time period. For example, the first set of charging summary metrics 1004 in the vehicle charging summary area 1002 can be associated with a first vehicle, such as the vehicle "14783" here. As depicted, example charging summary metrics can be related to number of charges, a statistical measure of charge time (such as average charge time), and/or an amount of energy charged (such as a total kilowatt-hour (kWh) charged). In some embodiments, portions of the vehicle charging summary area 1002 are selectable. For example, an element associated with a vehicle, such as the "14783" text or the "34873" text, can be selected by a user, which can cause the user interface to update and display details regarding charge events associated with the respective vehicle, which can be described in further detail below with respect to FIG. 10B.

In FIG. 10B, the graphical user interface 1050 includes a vehicle charging summary area 1052. The vehicle charging summary area 1052 can include depictions of charge events, which can be based on aggregated and/or filtered data. As described herein, each charge event can be stored as a charge record in a database. The charge events can be aggregated and/or filtered by vehicle and/or for a particular time period. For example, the charge events in the vehicle charging summary area 1052 can be for a particular vehicle, such as the vehicle "34873" here. Each charge event in the vehicle charging summary area 1052 can include information such as a start state of charge, an end state of charge, a last charge, a start time, an end time, and/or a duration.

FIG. 11 illustrates an example interactive graphical user interface 1100 for analyzing vehicle fuel/energy usage. The graphical user interface 1100 of FIG. 11 can be similar to the graphical user interface 900 of FIG. 9 for analyzing vehicle fuel/energy usage. The graphical user interface 1100 includes a fuel/energy usage summary area 1102, which can include metrics related to fuel/energy usage. The fuel/energy usage metrics in the fuel/energy usage summary area 1102 can be aggregated and/or filtered by vehicle and/or for a particular time period. As depicted, example fuel/energy usage metrics can be related to an amount of electric driving, energy consumed, energy recovered, fuel economy (such as effective miles per gallon), and/or emissions saved.

Figure 13:
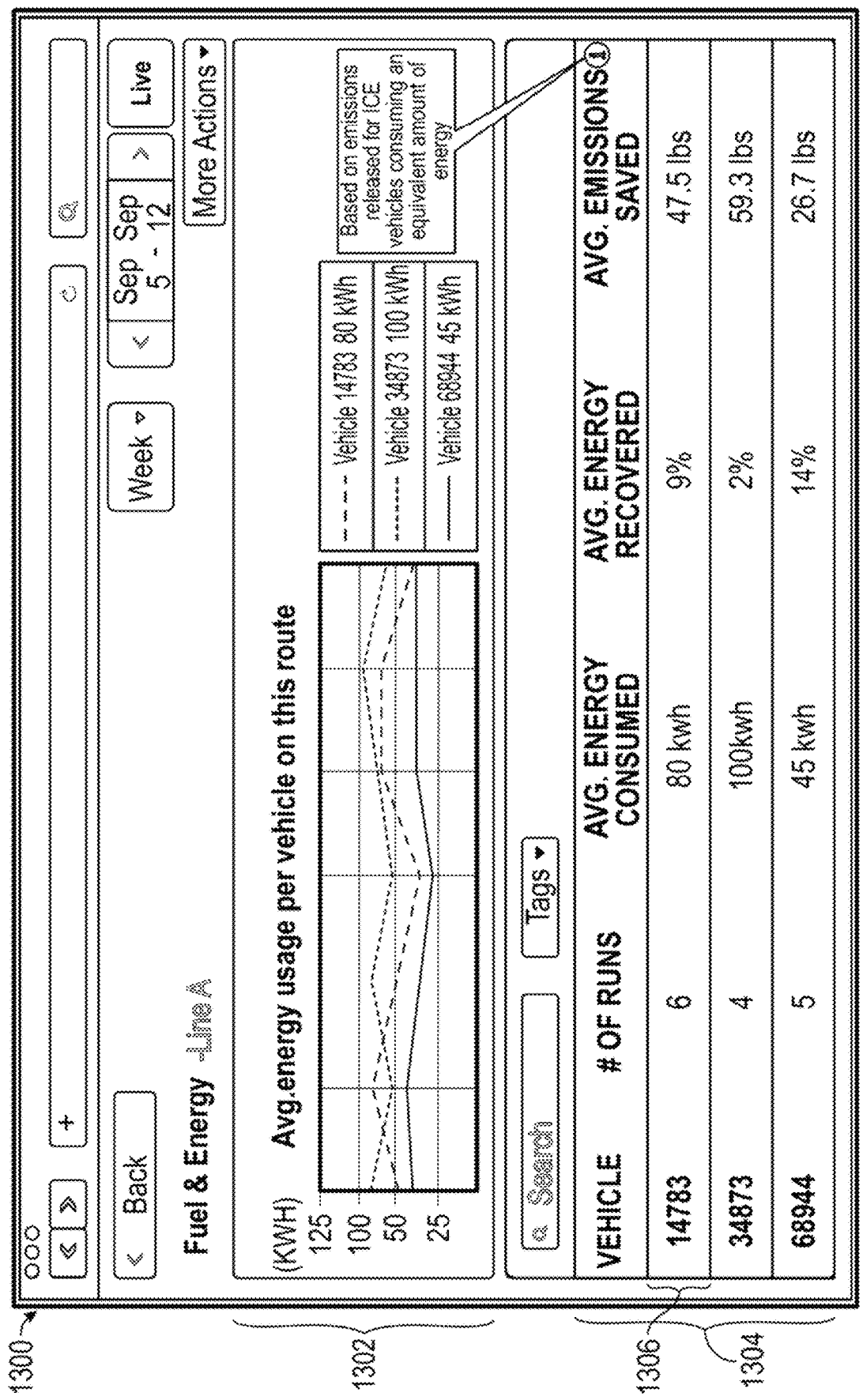

FIGS. 12 and 13 illustrate example interactive graphical user interfaces for analyzing route efficiency and/or fuel/energy usage. In FIG. 12, the graphical user interface 1200 includes a fuel/energy summary area 1202, which can include metrics related to fuel/energy usage. The graphical user interface 1200 of FIG. 12 can be similar to the graphical user interface 1100 of FIG. 11 for analyzing vehicle fuel/energy usage. However, a difference between the graphical user interface 1200 of FIG. 12 and the graphical user interface 1100 of FIG. 11 can be the characteristic upon which vehicle metrics are aggregated. The fuel/energy usage metrics in the fuel/energy summary area 1202 can be aggregated and/or filtered by route (instead of vehicle) and/or for a particular time period. For example, the first set of fuel/energy metrics 1204 in the fuel/energy summary area 1202 can be associated with a first route, such as the "Line A"

route here. As depicted, example fuel/energy efficiency and/or usage metrics can be related to cruise control (such as a number of times cruise control was used during a run on that route), number of runs, a statistical measure of energy consumed (such as an average), a statistical measure of energy recovered (such as an average), and/or a statistical measure of emissions saved (such as an average).

In the graphical user interface 1200, the element 1206 for a particular route (here Line A) can be selectable. User selection of the element 1206 can cause presentation of a route-specific user interface, such as the graphical user interface 1300 described below with respect to FIG. 13.

Figure 14:
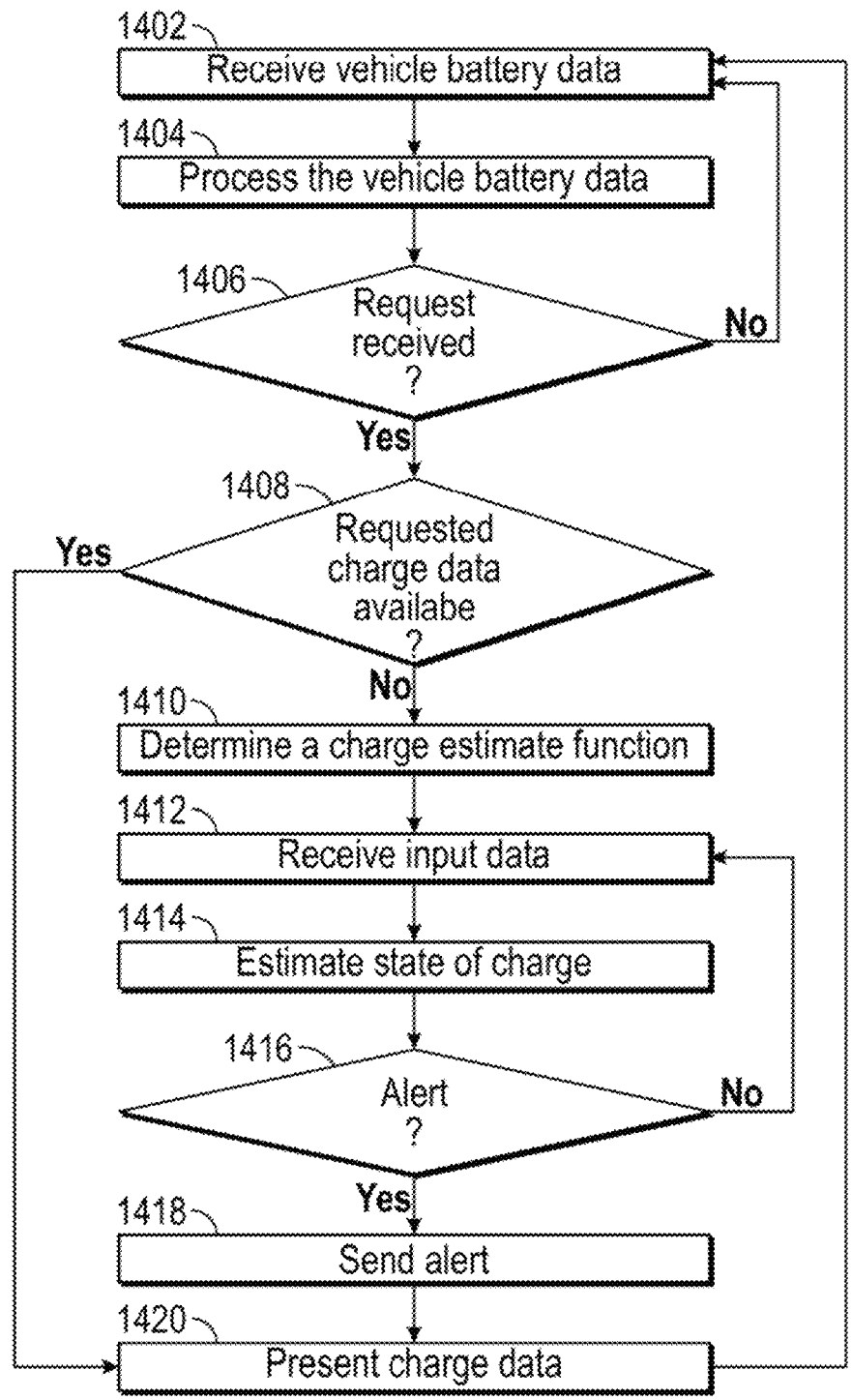
FIG. 14 is a flowchart illustrating example methods and functionality for vehicle battery charge estimation, according to various embodiments of the present disclosure.

In FIG. 13, the graphical user interface 1300 includes a fuel/energy visualization area 1302 and a fuel/energy summary area 1304, which can include metrics related to fuel/energy usage for a particular route. The fuel/energy visualization area 1302 and/or the fuel/energy summary area 1304 can include vehicle metrics, which can be based on aggregated and/or filtered data. As described herein, the vehicle metrics can be aggregated and/or filtered by vehicle, for a particular route, and/or for a particular time period. For example, fuel/energy visualization area 1302 can include one or more graphs that depict a statistical measure of fuel/energy usage per vehicle over time for a particular route. As another example, with respect to the fuel/energy summary area 1304, the first set of fuel/energy summary metrics 1306 can be associated with a first vehicle on the particular route, such as the vehicle "14783" here on the "Line A" route. As depicted, example fuel/energy usage metrics per vehicle on a particular route can be related to number of runs, a statistical measure of energy consumed (such as an average), a statistical measure of energy recovered (such as an average), and/or a statistical measure of emissions saved (such as an average). IX. Example Methods and Functionality for Vehicle Battery Charge Estimation FIG. 14 is a flowchart illustrating example methods and functionality for vehicle battery charge estimation. The flowchart of FIG. 14 can be similar to the flowcharts of FIGS. 5A-5B that are related to processing vehicle-related data and using the processed data.

Beginning at block 1402, vehicle battery data can be received. In particular, a computing device (such as the management server 140) can receive vehicle battery data from the vehicle gateway device 150. In some embodiments, the management server 140 can receive vehicle battery data, such as charge records associated with a battery from the vehicle. Example vehicle battery data (such as charge records) can include: (i) a start state of charge, (ii) an end state of charge, and (iii) an amount of energy charged. Example depictions of charge records can be shown in FIG. 10B. Additional example vehicle battery data (such as charge records) can include: (i) data indicative of an amount of energy charged relative to a capacity of the battery and (ii) an amount of energy charged relative to a period of time. The start and end state of charges can be represented as a percentage. Similarly, data indicative of an amount of energy charged relative to a capacity of the battery can be represented as a percentage. An amount of energy charged and/or an amount of energy charged relative to a period of time can in a unit of energy, such as a kilowatt-hour (kWh). In some embodiments, the vehicle gateway device 150 can determine the charge records. As described herein, some vehicle computers are turned off while charging and it may not be possible to receive charge information in substantially real-time. Accordingly, the management server 140 can receive vehicle battery data that is historical and represents previous charge event(s).

In some embodiments, the vehicle battery data can be in a less processed format than a charge record format. For example, instead of a charge record, the vehicle battery data can be in a format closer to what the vehicle gateway device 150 receives from a battery management system (BMS). Accordingly, the management server 140 can process the vehicle battery data as described below with respect to the next block 1404.

At block 1404, the vehicle battery data can be processed. In particular, the management server 140 can process the vehicle battery data. For example, processing by the management server 140 can include storing the vehicle battery data in the analysis-related database 256. Additionally or alternatively, the management server 140 can determine (i) a start state of charge, (ii) an end state of charge, and (iii) an amount of energy charged, (iv) data indicative of an amount of energy charged relative to a capacity of the battery, and/or (v) an amount of energy charged relative to a period of time from the vehicle battery data. As described herein, processing vehicle data can include processing of bucketed data.

At block 1406, it can be determined whether a state of charge request has been received. In particular, the management server 104 can determine whether a state of charge request has been received. A user computing device 120 can cause a state of charge request to be sent to the management server 140. For example, a user computing device 120 that requests the graphical user interface 700 of FIG. 7A, described above, can cause a state of charge request to be received by the management server 140 because the graphical user interface 700 can include a state of charge metric. An example state of charge request can be for a particular vehicle and for a particular time period. As depicted, if a state of charge request has not been received, the method can return to block 1402 to receive vehicle battery data in a loop over time, which can be from multiple vehicles. If a state of charge request has been received, the method can proceed to block 1408.

At block 1408, it can be determined whether the requested charge data is available. In particular, the management server 140 can determine whether the requested charge data is available. As described herein, a vehicle computer can be turned off while a vehicle is charging and it may not be possible for the vehicle gateway device 150 to receive a current state of charge from the vehicle's battery management system. Accordingly, while the vehicle gateway device is unable to transmit vehicle battery data associated with the current charge of the battery, a user computer device 120 can request the current state of charge of the battery and the method can proceed to subsequent blocks 1410, 1412, 1414, 1416, 1418, 1420. In particular, if a state of charge request for a current state of charge request is sent while the current state of charge is unavailable, then the method can proceed to the next block 1410. Conversely, charge data can be available if, for example, the vehicle computer is turned on or the state of charge request is for a historical state of charge and the historical data is available. If the charge data is available, then the method can proceed to block 1420.

At block 1410, a charge estimate function can be determined. In particular, the management server 140 can determine a charge estimate function. An example charge estimate function can output an estimated current state of charge based on historical vehicle battery data. In some embodiments, the management server 140 can determine a customized charge estimate function, which is customized for a particular vehicle/battery. For example, the estimated current state of charge of a battery can be based on historical vehicle battery data from the same battery. Example input to a charge estimate function can include an approximate start time for a current charge of the battery, a last state of charge for the battery, and/or a current time. Example output of a charge estimate function can include one or more state of charge values over a period of time. An example charge estimate function can also be used by the management server 140 to determine an expected time when the vehicle battery will reach a certain state of charge.

In some embodiments, the management server 140 can determine a charge estimate function from one or more charge records that indicate (i) a start state of charge, (ii) an end state of charge, and (iii) an amount of energy charged, (iv) data indicative of an amount of energy charged relative to a capacity of the battery, and/or (v) an amount of energy charged relative to a period of time from the vehicle battery data. A charge estimate function based on one or more charge records can define a linear function with an equation substantially similar to y=mx+b. For example, a linear equation can be determined from a start state of charge, an end state of charge, and an amount of energy charged over a period of time. Similarly, a linear equation can be determined data from (i) an amount of energy charged relative to a capacity of the battery and (ii) an amount of energy charged relative to a period of time. The management server 140 can determine a charge estimate function from multiple charge records by combining multiple charge records, such as by taking an average, a weighted average, or a decaying average based on the age of the charge record.

Additionally or alternatively, the management server 140 can determine a polynomial charge estimate function from one or more charge records. The historical vehicle battery data can include multiple data points, such as time series data for a charge event. The management server 140 can apply curve-fitting techniques to the multiple data points to generate an estimated polynomial function.

At block 1412, input data can be received. In particular, the management server 140 can receive input data. Example input data can be included in the charge state request. In particular, example input data can include an approximate start time for a current charge of the battery, a last state of charge for the battery, and/or a current time.

At block 1414, a state of charge can be estimated. In particular, the management server 140 can estimate a state of charge using the charge estimate function. The management server 140 can use at least some the initialization data as input to the charge estimate function to output a state of charge. Thus, while a vehicle computer is off/while the vehicle gateway device is unable to transmit vehicle battery data associated with the requested state of charge of the battery, the management server 140 can estimate a state of charge (such as a percentage) and/or state of charge over time (such as a graph) for the vehicle battery. As described herein, an example charge estimate function can be a linear or a polynomial function, which can output one or more states of charge based on the input and/or can be used to determine an estimated completion time or a time when the battery will reach a particular charge level. As described herein, an example charge estimate function can be customized for a particular vehicle/battery.

At block 1416, it can be determined whether an alert for the fleet, cohort, vehicle, battery, and/or charge event exists. In particular, the management server 140 can determine whether an applicable alert for the fleet, cohort, vehicle, battery, and/or charge event exists. In some embodiments, a user can define an alert for the fleet, cohort, vehicle, battery, and/or charge event. If an alert is applicable, the management server 140 can apply a charge alert condition to determine if an alert should be sent. An example charge alert condition can include a threshold state of charge for the battery that would cause the example charge alert condition to be satisfied. In other words, determining that the charge alert condition is satisfied can include identifying that the current state of charge is above a predefined charge level threshold. Thus, if a current estimated charge of the battery satisfies the charge alert condition based on the current time, the method can proceed to block 1418. At block 1418, an alert can be sent. In particular, the management server 140 can transmit an alert to the user computing device 120, such as an in-application alert, an email, a text message, etc. If the alert condition has not been satisfied, the method can return back to block 1412 to receive updated input data, such as an updated current time, which can cause the alert condition to be checked in a loop until the condition is satisfied or some other exit condition occurs.

At block 1420, charge data can be presented. In particular, the management server 140 can cause presentation of the charge data (such as a state of charge) in a report and/or a graphical user interface. Example output graphical user interfaces and/or visualizations of charge data are described in further detail above with respect to FIGS. 7A, 7C. The management server 140 can cause presentation of a visualization of the state of charge and/or the graph in a report and/or graphical user interface.

Customized User Interfaces for Sensor Data

As discussed above, a gateway device (e.g., a vehicle gateway device) may be in communication with a backend server. The gateway device may receive sensor data from a plurality of sensors associated with a physical asset (e.g., a vehicle, equipment, etc.). For example, the physical assets can include vehicles (e.g., automobiles, trailers, refrigerated trailers, refrigerated vehicles (e.g., box trucks, etc.), equipment (e.g., generators, sensors, motors, tools, physical apparatuses, etc.), or any other assets. It will be understood that while the disclosure may reference a vehicle, a trailer, a sensor, a motor, or any other particular asset, any physical asset may be used. Customers can deploy any number of physical assets. For example, customers can deploy vehicles, equipment, or any other physical assets in a fleet of physical assets. The physical assets may be grouped into a fleet of physical assets based on an identifier of the physical asset. For example, each physical asset may produce metadata identifying a respective fleet of physical assets.

Tracking and managing the fleet of physical assets deployed by and/or associated with a particular customer (e.g., managing maintenance issues of the fleet of physical assets) can be important. As each physical asset may include a plurality of sensors, tracking and managing the fleet of physical assets may be difficult. As discussed above, each physical asset may include a plurality of sensors to monitor characteristics (e.g., metrics associated with the physical asset). For example, a physical asset can include sensors to monitor particular features of the physical asset such as global position system ("GPS") tracking, temperature tracking, component performance tracking, and the like. The data received from the plurality of sensors can be used to perform and/or schedule maintenance or other operations (e.g., automatically) for the physical asset. For example, a sensor may indicate that an oil level of the physical asset is low and may be indicative of a need to change the oil. However, when the physical asset is part of a fleet of physical fleets, managing each physical asset of the fleet of physical assets simultaneously and/or in real time can be difficult due to the large amount of sensor data associated with a fleet of physical assets and the high frequency at which the sensor data is produced.

Further, when the fleet of physical assets is deployed at remote sites and/or individual physical assets of the fleet of physical assets are deployed at different sites, managing the fleet of physical assets can be difficult and challenging. For example, if a first physical asset is deployed in California and a second physical asset is deployed in Virginia, managing and tracking the first and second physical assets simultaneously may be difficult due to differences in the location of each physical asset even though the physical assets may be considered a fleet of physical assets. As a result, systems may be unable to identify and troubleshoot maintenance issues across a fleet of physical assets in real time.

In some cases, traditional management systems may periodically send technicians to each physical asset of the fleet of physical assets to check the physical asset, perform routine maintenance, perform tests, and monitor the physical asset. For example, traditional management systems may create maintenance schedules and may send a technician periodically to each asset to confirm the desired operation of the physical asset. However, this process may be inefficient and expensive as some physical assets may not require testing, maintenance, and/or monitoring as frequently as other physical assets. For example, a trailer may require more extensive and/or frequent monitoring compared to a generator. Further, such monitoring may not be responsive to actual issues with the physical assets and may result in excessive or insufficient monitoring of the physical assets.

In some cases, traditional systems may rely on the customers to self-report issues with the physical assets. For example, traditional systems may provide a user interface for a user to submit an issue (e.g., to request performance of maintenance) for a particular physical asset. However, this process may also be inefficient and expensive as the issues may be identified and reported after a period of time for rectifying the issue. For example, the issue may no longer be repairable and/or the maintenance may be more expensive by the time the user alerts the system and the system provides a technician to perform the maintenance.

Additionally, due to the time consuming and inefficient process to obtain sensor data generated by the plurality of sensors for the fleet of physical assets, it can be time consuming and inefficient to compare the sensor data to particular data threshold values to determine a recommendation for maintenance. Specifically, each physical asset may be associated with separate sensor data and separate data threshold values and traditional systems may not be able to compare the sensor data to particular data threshold values in real time to determine a recommendation for maintenance. Further, when accessing the data generated by the plurality of sensors is inefficient, just identifying and filtering the data by traditional systems can be a significant issue.

As mentioned above, according to various embodiments of the present disclosure, an improved system can include gateway devices that route sensor data to the system (e.g., a backend server such as the management server system). Each gateway device may be attached to a respective physical asset of the fleet of physical assets (e.g., a grouping of physical assets). For example, the fleet of physical assets can include a fleet of vehicles (e.g., trailers, refrigerated trailers, etc.). The gateway device can obtain sensor data generated by a plurality of sensors associated with a particular physical asset. For example, the plurality of sensors may include a temperature sensor, a lock sensor, a humidity sensor, a cargo monitor sensor, a latch sensor, a door monitor sensor, or any component monitoring sensor to monitor a component of the physical asset. Each of the plurality of sensors may transmit sensor data to the gateway device. The plurality of sensors may transmit the sensor data to the gateway device via a first network. For example, the plurality of sensors may transmit the sensor data to the gateway device via a local area network or a personal area network. In some cases, the plurality of sensors may transmit the sensor data to the gateway device via a Bluetooth connection. Each of a plurality of gateway devices can transmit obtained sensor data to a management server system. In some embodiments, the gateway device and/or the management server system may implement a machine learning model trained to identify the occurrence of a particular feature within received sensor data and/or to identify an event based on the occurrence of the particular feature. The management server system may receive sensor data from a plurality of gateway devices. For example, the management server system may receive sensor data from one or more gateway devices associated with a first physical asset, one or more gateway devices associated with a second physical asset, etc. Therefore, the management server system may receive a large amount of data (e.g., in real time) at a high frequency from the plurality of gateway devices.

Based on the obtained sensor data, the management server system may generate a user interface. For example, the management server system can generate the user interface in real time based on the obtained sensor data. Further, the management server system may cause display of the user interface on a user computing device. The user interface generated by the management server system can include visualizations of the fleet of physical assets. For example, each of the visualizations may include a virtual representation of a particular physical asset.

To generate the visualizations of the fleet of physical assets, the management system may identify a subset of sensor data associated with each physical asset of the fleet of physical assets. The management system may identify the subset of sensor data associated with each physical asset based on metadata associated with the sensor data. For example, each sensor, each gateway device, a different component of the physical asset, or the physical asset may provide metadata (e.g., with the sensor data or separate from the sensor data) identifying the sensor, gateway device, physical asset, etc. associated with the sensor data. The virtual representation of each physical asset may be based on the subset of sensor data associated with the particular physical asset. Each of the virtual representations may identify sensor data associated with a particular physical asset, a particular gateway device, a particular sensor, or any other device.

The visualizations may identify characteristics (e.g., metrics) of each physical asset of the fleet of physical assets based on the obtained sensor data. For example, the visualizations may identify a location, a status, a utilization, a job, maintenance information, a battery voltage, an engine status, fuel information, gateway device information, or other information identifying a particular physical asset. Further, the visualizations may identify characteristics of sensors, gateway devices, or other components of each physical asset of the fleet of physical assets. Utilizing the visualizations, the management server system may provide data associated with the fleet of physical assets. For example, the management server system may indicate particular physical assets of the fleet of physical assets that have upcoming maintenance due, that have performance issues, etc. (e.g., by providing alerts), etc. Further, the management server system may utilize the visualizations to indicate, to a user computing device, sensor data (e.g., historical sensor data) associated with a particular physical asset. For example, the management server system may utilize the visualizations to provide temperature sensor data (e.g., historical temperature sensor data) for a refrigerated trailer. In some cases, the management server system may compare the sensor data to threshold data values and generate a report based on the comparison.

The management server system may include filters in the user interface to enable the filtering of the visualizations provided via the user interface. For example, the filters may include drop-down menus, search bars, or any other interactive parameters that enable users to select particular filters via a user computing device. The user may select a filter and provide a filter for the visualizations. For example, the filter may include a search query, a manner of processing, sorting, and/or presenting the visualizations, etc. The user computing device may route a network communication to the management server system identifying the selected filter. Based on the selected filter, the management server system can filter the obtained sensor data to identify a portion of the sensor data associated with the filter. Further, the management server system can filter the fleet of physical assets that are associated with the filtered portion of the sensor data. The management server system can generate and/or cause display of an updated user interface that includes visualizations of the filtered fleet of physical assets. Further, the management server system may also update the visualizations in real time as sensor data is obtained. For example, the management server system may obtain additional sensor data from the plurality of gateway devices and may update the visualizations in real time based on obtaining the additional sensor data. In some embodiments, the management server system may implement a plurality of filters (e.g., a plurality successive filters) to filter the sensor data.

Therefore, the management server system can receive and log sensor data related to physical assets. The sensor data may include location data, engine status data, utilization data, maintenance data, etc. The management server system can generate user interfaces and visualizations of each physical asset (including historical data of the physical asset) and provides options for filtering the physical assets based on any of the sensor data. The management server system can apply customizable rules to each physical asset to provide customized alert notifications.

Example User Interfaces for a Fleet of Vehicles

Figure 15:
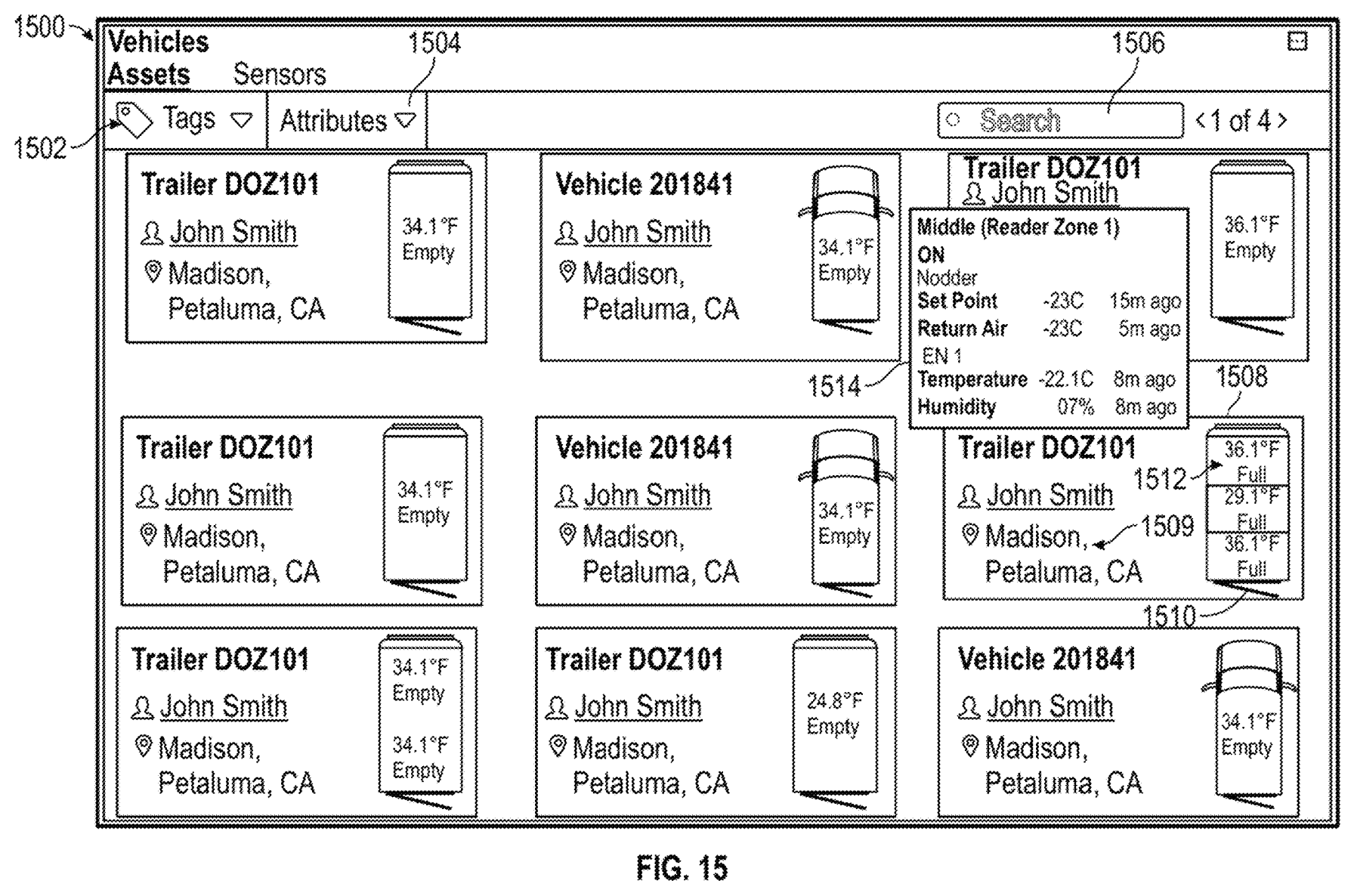
Figure 16:
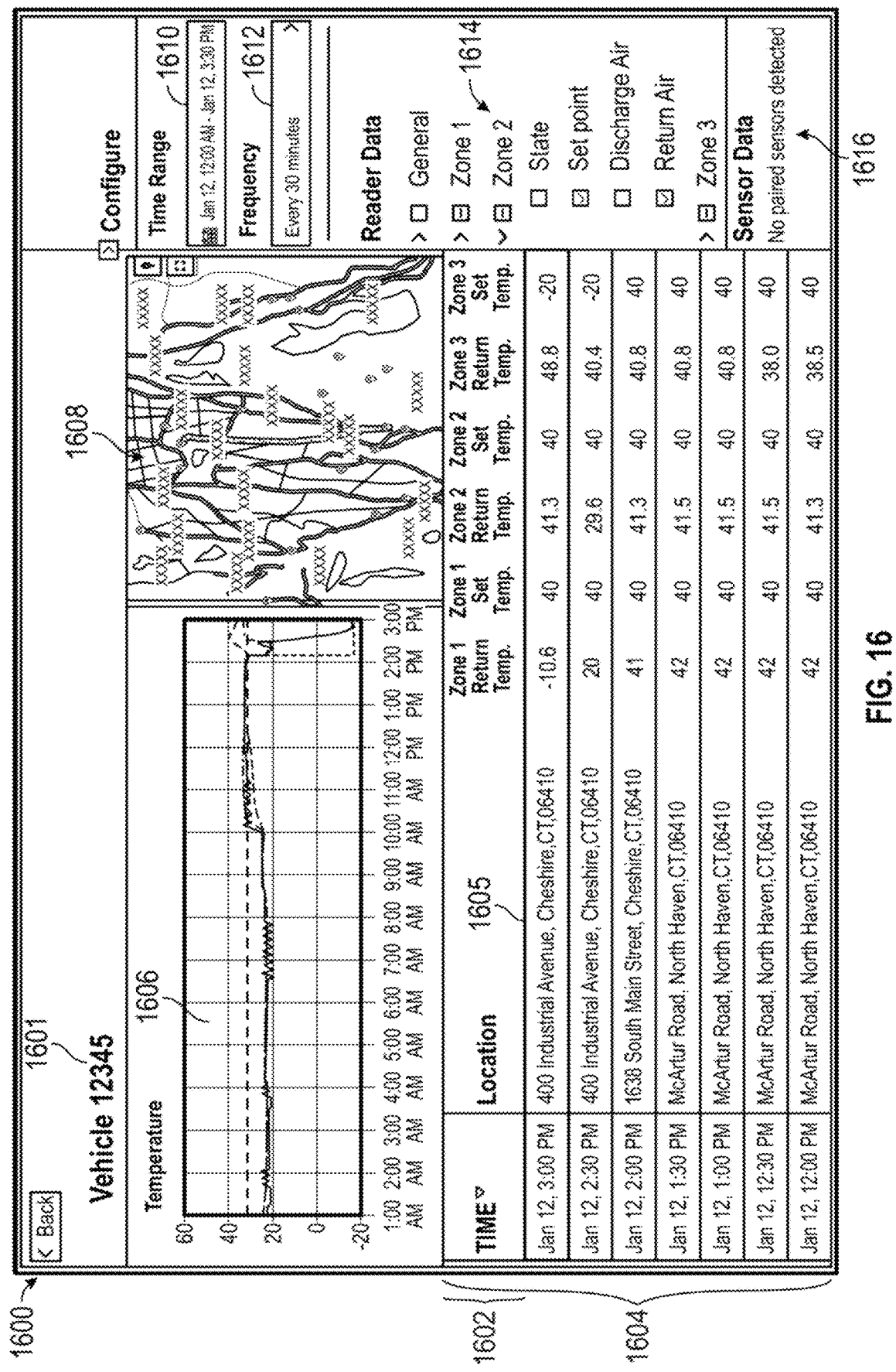
FIG. 16 illustrates an example interactive graphical user interface for presenting vehicle metadata, according to various embodiments of the present disclosure.
Figure 17:
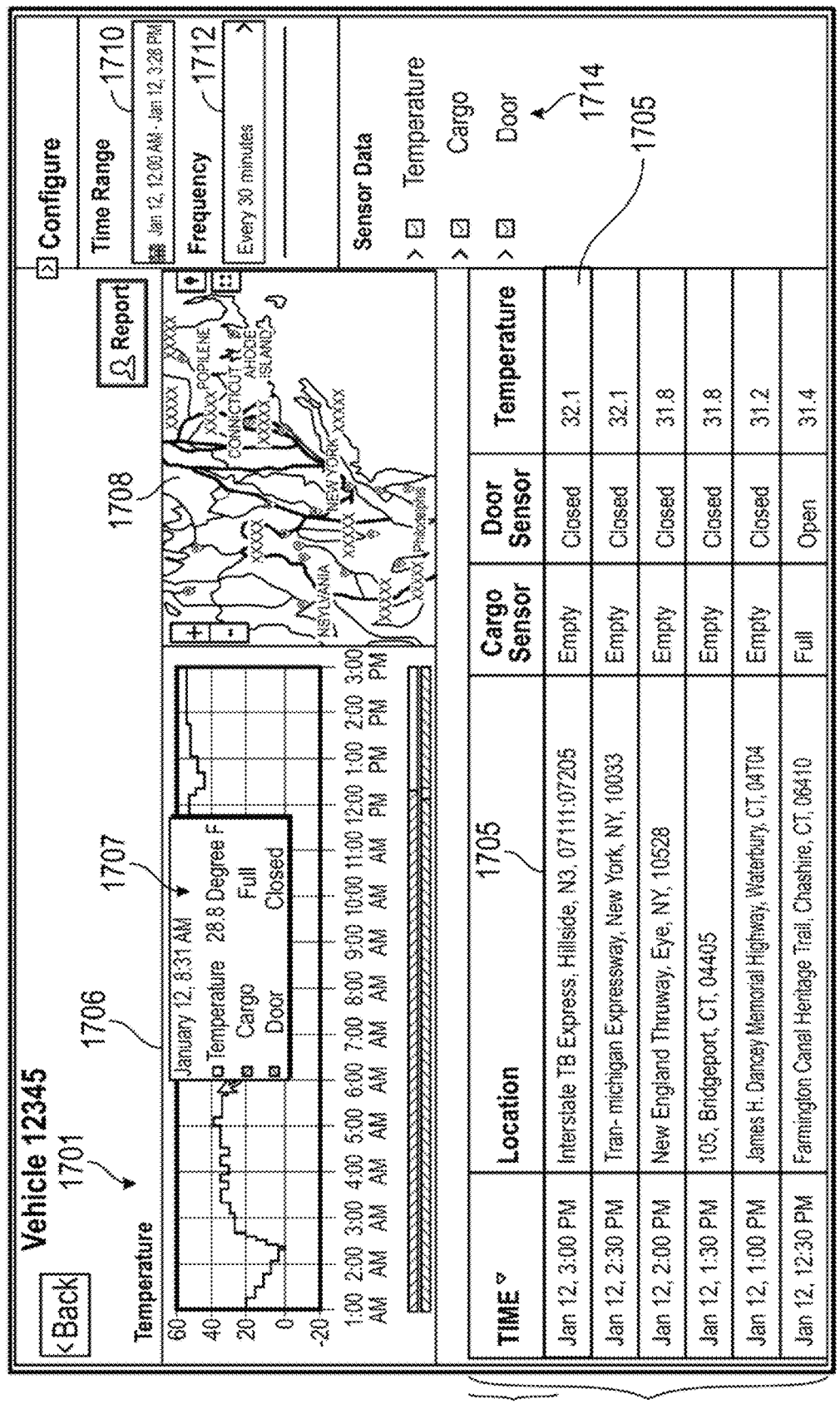
FIG. 17 illustrates an example interactive graphical user interface for presenting vehicle metadata, according to various embodiments of the present disclosure.

FIGS. 15, 16, and 17 illustrate example interactive graphical user interfaces related to monitoring and analysis of data from vehicle gateway devices associated with a fleet of vehicles, according to various embodiments of the present disclosure. The interactive graphical user interfaces of FIGS. 15, 16, and 17 may be provided by the management server 140, and may be accessible via user device(s) 120. In general, the management server system may automatically gather sensor data (e.g., received and analyzed sensor data) from multiple vehicle gateway devices 150, and the management server system may further process (e.g., aggregate, analyze, etc.) the sensor data to provide information and insights as described herein. In some embodiments, the graphical user interfaces provided by the management server 140 may be specific to an organization, and may include information from multiple vehicle gateway devices 150 associated with the organization. Further, the graphical user interfaces may include information from multiple vehicle gateway devices 150 associated with multiple vehicles associated with the organization. It will be understood that while the graphical user interfaces of FIGS. 15, 16, and 17 reference an implementation with respect to a plurality of vehicles, the graphical user interfaces may be implemented with respected to any physical asset.

FIG. 15 illustrates an example interactive graphical user interface 1500 for providing visualizations of a virtual representation of each vehicle of a fleet of vehicles based on obtained sensor data. The example interface 1500 is illustrative of an improved, customized interface that the management server system generates and presents to a user via a user computing device. For example, the management server system may generate and present the example interface 1500 to a user based on the user registering, via the user computing device, a fleet of vehicles (e.g., by indicating that the fleet of vehicles should be linked or grouped).

In the example of FIG. 15, the example interface 1500 includes a visualization of a virtual representation of each vehicle of a fleet of vehicles. The example interface 1500 includes a plurality of the visualizations. Further, the plurality of visualizations include data identifying various characteristics of the associated vehicle based on the sensor data associated with each vehicle. To generate the visualizations, the management server system may identify a portion of sensor data associated with each vehicle and may generate the visualizations based on the portion of sensor data associated with each vehicle.

The example interface 1500 may include a tags area 1502, an attributes area 1504, and a search area 1506. Each of the tags area 1502, the attributes area 1504, and the search area 1056 may correspond to a drop-down menu, a search bar, or an interactive parameter. Further, the tags area 1502, the attributes area 1504, and the search area 1056 may enable the user computing device to generate a selection and may provide the selection to the management server system to filter the fleet of vehicles and/or the sensor data. The tags area 1502 may enable the user to select a particular tag to filter the fleet of vehicles. For example, the tags area 1502 may enable the user to select a particular tag associated with a sensor, a vehicle gateway device, or a vehicle. In some embodiments, the tags area 1502 may enable the user to define customized tags. The attributes area 1504 may enable the user to select a particular attribute to filter the fleet of vehicles and/or the sensor data. The attributes area 1504 may enable the user to select a particular location, a maintenance status, a sensor status, a sensor report, etc. associated with a sensor, a vehicle gateway device, or a vehicle. For example, the attributes area 1504 may enable the user to filter the fleet of vehicles and/or the sensor data to identify vehicles with an associated temperature (e.g., a temperature above sixty degrees). The search area 1506 may enable the user to select a particular search term or query to filter the fleet of vehicles and/or the sensor data. For example, the search area 1506 may enable the user to query the sensor data based on a particular location, a maintenance status, a sensor status, a sensor report, etc. associated with a sensor, a vehicle gateway device, or a vehicle The example user interface 1500 may include a plurality of visualizations. Each of the plurality of visualizations may include a virtual representation of a particular vehicle. Further, each of the plurality of visualizations may identify one or more sections of a particular vehicle. It will be understood that the plurality of visualizations may be divided into any number of sections. For example, the number of sections may be based on the received data (e.g., the location of the sensors relative to the vehicle). The plurality of visualizations may identify characteristics of the particular vehicle based on sensor data associated with the particular vehicle.

In the example of FIG. 15, the plurality of visualizations includes a first visualization 1508. Each visualization may include identifying information associated with the vehicle. For example, the first visualization 1508 includes identifying information 1509 indicating a trailer name "BOZ101," a user "John Smith," a location "Madison, Petaluma, Calif." The first visualization 1508 includes a virtual representation of a trailer. Further, the first visualization 1508 includes a virtual representation of a trailer that is divided into three separate sections. Based on the sensor data associated with the trailer, the first visualization 1508 identifies a first section 1512 of the trailer, a second section of the trailer, a third section of the trailer, and a door 1510 of the trailer. The first visualization 1508 may identify characteristics associated with each section. In the example of FIG. 15, the first visualization 1508 indicates that the first section 1512 of the trailer has a temperate of 36.1 degrees Fahrenheit and a cargo status of full, the second section of the trailer has a temperature of 39.8 degrees Fahrenheit and cargo status of full, the third section of the trailer has a temperature of 36.1 degrees Fahrenheit and a cargo status of full, and the door 1510 of the trailer is open. Further, the visualizations may indicate potential issues associated with the vehicle. For example, the first visualization 1508 indicates that the second section of the trailer is outside of a desired temperature range and the door is open.

A user may interact with each visualization and cause display of an additional interface that provides additional information associated with a vehicle, a section of a vehicle, etc. In the example of FIG. 15, a user can interact with the visualization to generate an additional interface 1514. The additional interface 1514 indicates additional information associated with a section of a vehicle (e.g., a refrigerated trailer) including a status of on, a set point temperature of −23 degrees Celsius, a return air temperature of −23 degrees Celsius, a temperature of −22.1 degrees Celsius, and a humidity of 89%. In some cases, the additional interface 1514 can indicate a status, a temperature (e.g., a set point temperature, a return air temperature, etc.), and/or a humidity for each or a portion of the sections of a refrigerated trailer. Further, the additional interface 1514 may identify a time that each section was updated (e.g., the corresponding sensor data was received). The additional interface 1514 indicates that the set point temperature was updated 13 minutes ago, the return air temperature was updated 8 minutes ago, the temperature was updated 8 minutes ago, and the humidity was updated 8 minutes ago. In some embodiments, an element associated with a visualization of a particular vehicle in the example interface may be selectable and can cause presentation of a vehicle-specific user interface, such as the graphical user interface 1600 described below with respect to FIG. 16 and/or the graphical user interface 1700 described below with respect to FIG. 17.

FIG. 16 illustrates an example interactive graphical user interface 1600 for providing an additional visualization of a virtual representation of a particular vehicle of a fleet of vehicles based on obtained sensor data. The example interface 1600 is illustrative of an improved, customized interface that the management server system generates and presents to a user via a user computing device. As discussed above, the management server system may generate and present the example interface 1600 to a user based on the user interacting with a particular visualization of a particular vehicle.

In the example of FIG. 16, the example interface 1600 includes a visualization of a virtual representation of a particular vehicle of a fleet of vehicles. The example interface 1600 includes a visualization that includes data identifying various characteristics of the associated vehicle based on the sensor data associated with the vehicle. To generate the visualization, the management server system may identify a portion of sensor data associated with the vehicle and may generate the visualization based on the portion of sensor data associated with the vehicle. The example interface 1600 may include a vehicle identifier 1601 identifying the vehicle corresponding to the visualization by the example interface 1600. In the example of FIG. 16, the vehicle identifier 1601 identifies Vehicle 12345.

The example interface 1600 can include a plurality of sensor data associated with the particular vehicle. The example interface 1600 may include sensor data that has been processed (e.g., aggregated, filtered, etc.) by the management server system. Specifically, the management server system may filter the sensor data to identify the sensor data associated with sensors, vehicle gateway devices, or components of the vehicle. In the example of FIG. 16, the sensor data includes temperature sensor data from temperatures sensors in each zone (e.g., section) of the vehicle (e.g., a refrigerated trailer), location data from a location sensor of the vehicle, and time data. The example interface 1600 may include a first section 1602 identifying the different types of data and a second section 1604 identifying the sensor data associated with the vehicle. In the example of FIG. 16, the first section 1602 includes a time component, a location component, a zone 1 return temperature component, a zone 1 set temperature component, a zone 2 return temperature component, a zone 2 set temperature component, a zone 3 return temperature component, and a zone 3 set temperature component. Further, the second section 1604 includes sensor data values for each component of the first section 1602. In an example row 1605 of the second section 1604, the second section indicates a time period of January 12, 3:00 PM. a location of 400 Industrial Avenue, Cheshire, Conn. 06410, a zone 1 return temperature of −10.8 degrees Celsius, a zone 1 set temperature of 40 degrees Celsius, a zone 2 return temperature of 41.3 degrees Celsius, a zone 2 set temperature of 40 degrees Celsius, a zone 3 return temperature of 48.8 degrees Celsius, and a zone 3 set temperature of −20 degrees Celsius.

The example interface 1600 can include a map 1608. The map 1608 can be based on the location data received from a vehicle gateway device of the vehicle. For example, the vehicle gateway device may obtain location data from the sensors associated with the vehicle and may route the location data to the management server system. In another example, the vehicle gateway device may include one or more sensors to generate the location data and the vehicle gateway device may route the generated location data to the management server system. The map 1608 can display a historical route of the vehicle. The map 1608 and the route displayed via the map 1608 may be based on an identified time range, an identified vehicle, etc. For example, the map 1608 may identify a particular route of the vehicle during a particular time range. In some embodiments, the management server system may update the map 1608 in real time and the map 1608 can display a real time route of the vehicle.

Further, the example interface 1600 can include a graph 1606. The graph 1606 can be based on sensor data received from the sensors associated with the vehicle. For example, the graph 1606 can include sensor data displayed in the second section 1604. The graph 1606 can display historical or real time sensor data associated with the vehicle. The graph 1606 may be based on an identified time range, an identified vehicle, etc. For example, the graph 1606 may identify sensor data of the vehicle during a particular time range. In some embodiments, the management server system may update the graph 1606 in real time.

The example interface 1600 may include a time range filter 1610, a frequency filter 1612, a section filter 1614, and a sensor filter 1616. Each of the time range filter 1610, the frequency filter 1612, the section filter 1614, and the sensor filter 1616 may correspond to a drop-down menu, a search bar, or an interactive parameter. The management server system may build the time range filter 1610, the frequency filter 1612, the section filter 1614, and the sensor filter 1616 by identifying potential values of each of the time range filter 1610, the frequency filter 1612, the section filter 1614, and the sensor filter 1616 based on the sensor data. For example, the management server system may determine the sensor data corresponds to a three day time period and may build the time range filter 1610 such that a user can select a particular portion of the three day time period. Further, the time range filter 1610, the frequency filter 1612, the section filter 1614, and the sensor filter 1616 may enable the user computing device to generate a selection and may provide the selection to the management server system to filter the sensor data displayed via the example interface 1600. The time range filter 1610 may enable the user to select a particular time range (e.g., a real time or historical time range). The frequency filter 1612 may enable the user to select a particular frequency at which to update the sensor data (e.g., update the example interface 1600 based on updated sensor data). The section filter 1614 may enable the user to select a particular section of the vehicle and/or particular sensor data associated with a particular section (e.g., a state, a set point temperature, a discharge air temperature, or a return air temperature of the section). The sensor filter 1616 may enable the user to select a particular sensor of the vehicle. Based on selections received via the time range filter 1610, the frequency filter 1612, the section filter 1614, and the sensor filter 1616, the management server system can update the example interface 1600 (e.g., update the sensor data displayed by the example interface 1600).

FIG. 17 illustrates an example interactive graphical user interface 1700 for providing an additional visualization of a virtual representation of a particular vehicle of a fleet of vehicles based on obtained sensor data. The example interface 1700 is illustrative of an improved, customized interface that the management server system generates and presents to a user via a user computing device. As discussed above, the management server system may generate and present the example interface 1700 to a user based on the user interacting with a particular visualization of a particular vehicle. In some embodiments, the management server system may provide the example interface based on a user interaction with an element of an interface (e.g., an element of example interface 1500 of FIG. 15) or as a continuation of an interface (e.g., a continuation of example interface 1600 of FIG. 16).

In the example of FIG. 17, the example interface 1700 includes a visualization of a virtual representation of a particular vehicle of a fleet of vehicles. The example interface 1700 includes a visualization that includes data identifying various characteristics of the associated vehicle based on the sensor data associated with the vehicle. To generate the visualization, the management server system may identify a portion of sensor data associated with the vehicle and may generate the visualization based on the portion of sensor data associated with the vehicle. The example interface 1700 may include a vehicle identifier 1701 identifying the vehicle corresponding to the visualization by the example interface 1700. In the example of FIG. 17, the vehicle identifier 1701 identifies Vehicle 12345.

The example interface 1700 can include a plurality of sensor data associated with the particular vehicle. As discussed above, the example interface 1700 may include sensor data that has been processed (e.g., aggregated, filtered, etc.) by the management server system. In the example of FIG. 17, the sensor data includes temperature sensor data from a temperature sensor of the vehicle, location data from a location sensor of the vehicle, door status data from a door sensor of the vehicle, cargo sensor data from a cargo sensor of the vehicle, and time data. In some cases, the location data may be generated by and/or obtained from the vehicle gateway device. The example interface 1700 may include a first section 1702 identifying the different types of data and a second section 1704 identifying the sensor data associated with the vehicle. In the example of FIG. 17, the first section 1702 includes a time component, a location component, a cargo component, a door component, and a temperature component. Further, the second section 1704 includes sensor data values for each component of the first section 1702. In an example row 1705 of the second section 1704, the second section indicates a time period of January 12, 3:00 PM. a location of Interstate 78 Express, Hillside, N.J., 07111-07205, a cargo status of empty, a door status of closed, and a temperature of 32.1 degrees Celsius.

The example interface 1700 can include a map 1708. As discussed above, the map 1708 can be based on the location data received from the sensors associated with the vehicle. The map 1708 can display a historical or real time route of the vehicle. The map 1708 and the route displayed via the map 1708 may be based on an identified time range, an identified vehicle, etc.

Further, the example interface 1700 can include a graph 1706. The graph 1706 can be based on sensor data received from the sensors associated with the vehicle. For example, the graph 1706 can include sensor data displayed in the second section 1704. The graph 1706 can display historical or real time sensor data associated with the vehicle. The graph 1706 may be based on an identified time range, an identified vehicle, etc. In some embodiments, the user may interact with (e.g., click on, hover over, make eye contact with, etc.) a portion of the graph 1706. Based on the user interacting with the portion of the graph 1706, the management server system may provide an additional interface 1707. The additional interface 1707 may identify particular sensor data associated with the particular portion of the graph with which the user interacted. In the example of FIG. 17, the additional interface indicates a time period of January 12, 5:31 AM., a temperature of 28.8 degrees Fahrenheit, a cargo status of full, and a door status of closed.

The example interface 1700 may include a time range filter 1710, a frequency filter 1712, and a sensor filter 1716. Each of the time range filter 1710, the frequency filter 1712, and the sensor filter 1716 may correspond to a drop-down menu, a search bar, or an interactive parameter. The management server system may build the time range filter 1710, the frequency filter 1712, and the sensor filter 1716 by identifying potential values of each of the time range filter 1710, the frequency filter 1712, and the sensor filter 1716 based on the sensor data. Further, the time range filter 1710, the frequency filter 1712, and the sensor filter 1716 may enable the user computing device to generate a selection and may provide the selection to the management server system to filter the sensor data displayed via the example interface 1700. The time range filter 1710 may enable the user to select a particular time range (e.g., a real time or historical time range). For example, the user may select a time range from 12:00 PM to 12:30 PM on July 1st 2020. The frequency filter 1712 may enable the user to select a particular frequency (e.g., one minute, five minutes, thirty minutes, etc.) at which to update the sensor data (e.g., update the example interface 1600 based on updated sensor data). The sensor filter 1714 may enable the user to select a particular sensor of the vehicle (e.g., the cargo sensor, the temperature sensor, the door sensor, etc.). Based on selections received via the time range filter 1710, the frequency filter 1712, and the sensor filter 1716, the management server system can update the example interface 1700 (e.g., update the sensor data displayed by the example interface 1700).

Example User Interfaces for a Fleet of Physical Assets

Figure 18:
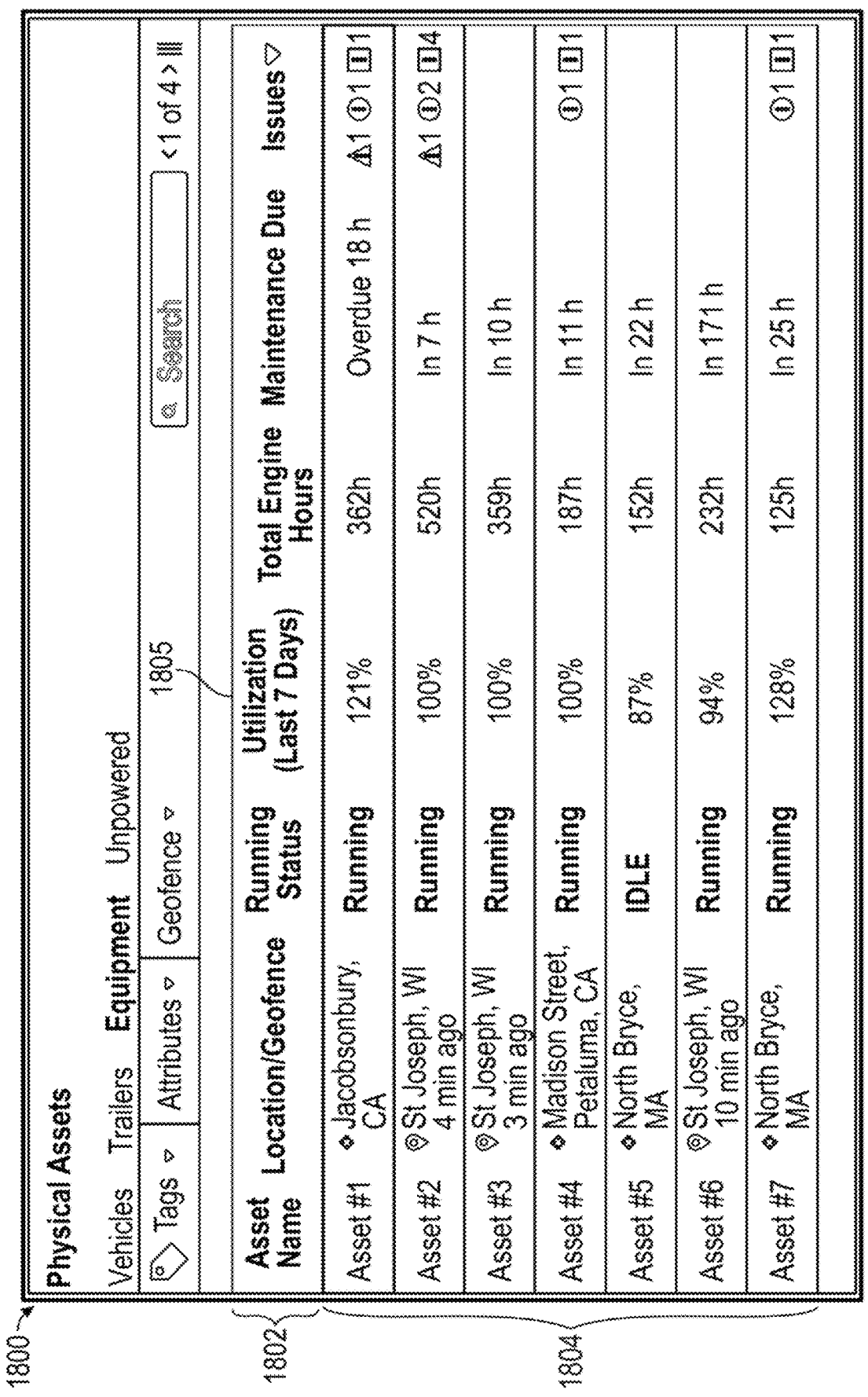
FIG. 18 illustrates an example interactive graphical user interface for presenting physical asset metadata, according to various embodiments of the present disclosure.
Figure 19:
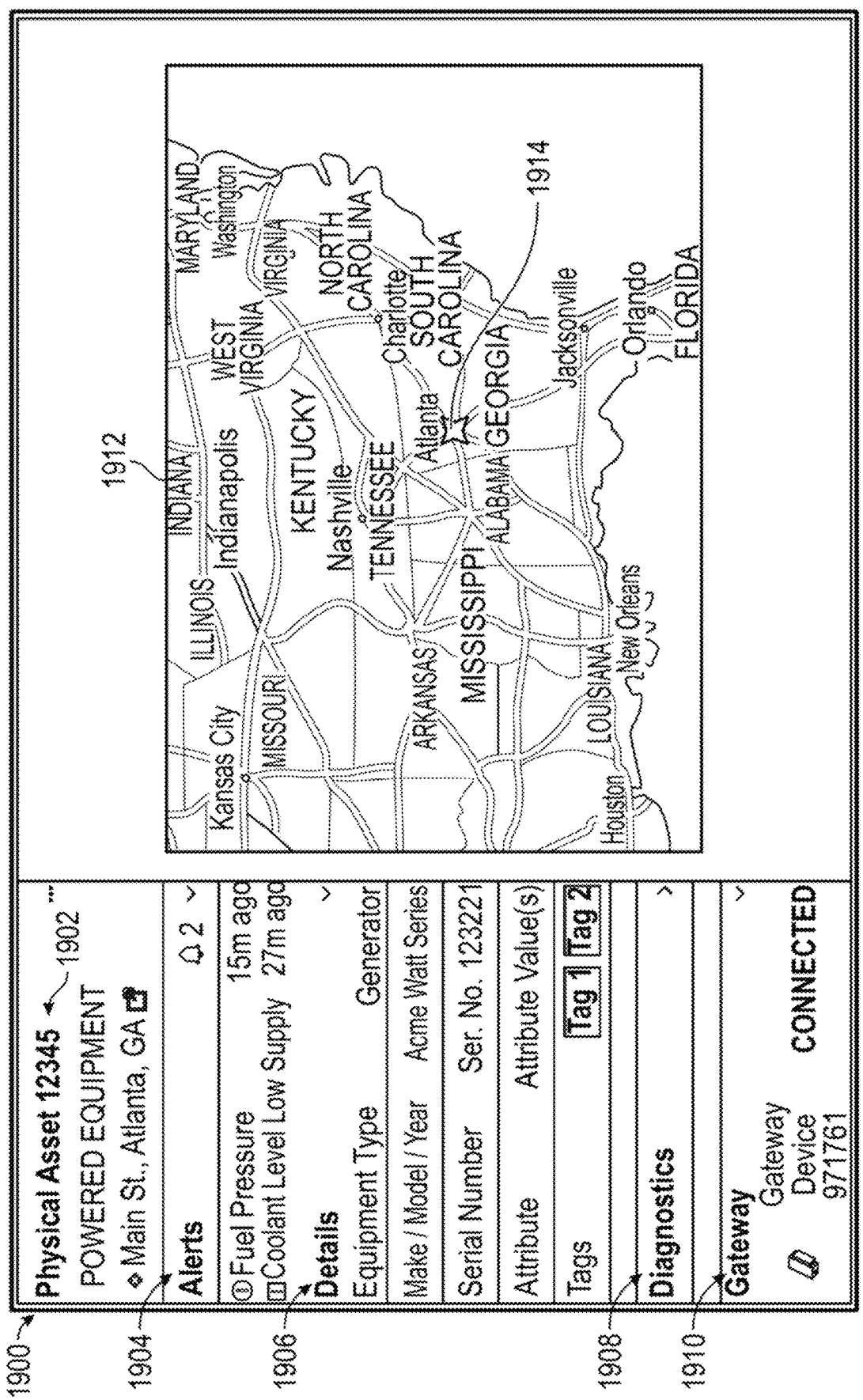
FIG. 19 illustrates an example interactive graphical user interface for presenting physical asset metadata, according to various embodiments of the present disclosure.
Figure 20:
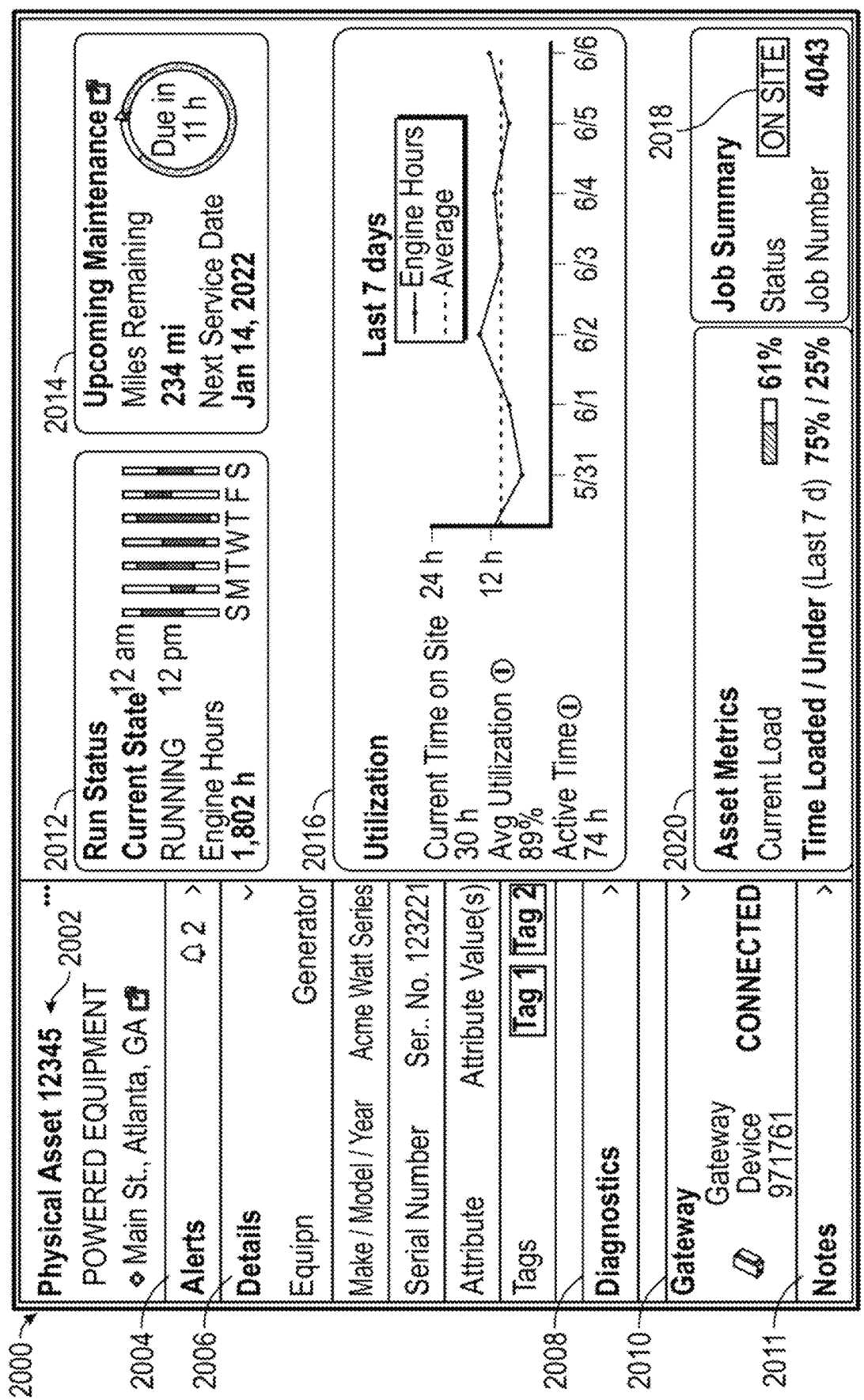
FIG. 20 illustrates an example interactive graphical user interface for presenting physical asset metadata, according to various embodiments of the present disclosure.

FIGS. 18, 19, and 20 illustrate example interactive graphical user interfaces related to monitoring and analysis of data from gateway devices associated with a fleet of physical assets, according to various embodiments of the present disclosure. The interactive graphical user interfaces of FIGS. 18, 19, and 20 may be provided by the management server 140, and may be accessible via user device(s) 120. In general, the management server system may automatically gather sensor data (e.g., received and analyzed sensor data) from multiple gateway devices, and the management server system may further process (e.g., aggregate, analyze, etc.) the sensor data to provide information and insights as described herein. In some embodiments, the graphical user interfaces provided by the management server 140 may be specific to an organization, and may include information from multiple gateway devices associated with the organization. Further, the graphical user interfaces may include information from multiple gateway devices associated with multiple physical assets associated with the organization.

FIG. 18 illustrates an example interactive graphical user interface 1800 for providing visualizations of a virtual representation of each physical asset of a fleet of physical assets based on obtained sensor data. The example interface 1800 is illustrative of an improved, customized interface that the management server system generates and presents to a user via a user computing device. For example, the management server system may generate and present the example interface 1800 to a user based on the user registering, via the user computing device, a fleet of physical assets.

Though not depicted in FIG. 18, the example interface 1800 may include a visualization of a virtual representation of each physical asset of a fleet of physical assets. The visualization may include a pictorial representation of a particular physical asset (e.g., a picture of a generator, a picture of a trailer, etc.).

The example interface 1800 may include a tags area, an attributes area, a search area, and a geofence area. Each of the tags area, the attributes area, the search area, and the geofence area may correspond to a drop-down menu, a search bar, or an interactive parameter. Further, the tags area, the attributes area, the search area, and the geofence area may enable the user computing device to generate a selection and may provide the selection to the management server system to filter the fleet of physical assets and/or the sensor data. For example, the tags area, the attributes area, the search area, and the geofence area may enable a user to select a particular tag, a particular attribute, a particular query, and/or a particular geofence to filter the fleet of physical assets and/or the sensor data.

The example interface 1800 can include a plurality of sensor data associated with the fleet of physical assets. The example interface 1800 may include sensor data that has been processed (e.g., aggregated, filtered, etc.) by the management server system. Specifically, the management server system may filter the sensor data to identify the sensor data associated with sensors, gateway devices, or components of each physical asset of the fleet of physical assets. In the example of FIG. 18, the sensor data includes location data, running status data, utilization data, total engine hours data, maintenance due data, and issues data. In some embodiments, the management server system may receive sensor data, calculate sensor data values based on the received sensor data, and generate a user interface that includes the calculated sensor data values. For example, the management server system may obtain sensor data indicating a time period for which the physical asset was turned on and, based on the time period, the management server system may calculate a total engine hours.

The management server system may calculate a plurality of sensor data values and include the plurality of sensor data values in the example interface 1800. The plurality of sensor data values may include a running status (e.g., an indication of whether a physical asset is running). The management server system may calculate the running status based on running status sensor data, engine rotations per minute data, load data, and/or load status data. Further, the plurality of sensor data values may include a connectivity status (e.g., an indication of whether a physical asset is connected to a network). The management server system may calculate the connectivity status based on a connection indicator and/or time of last connection. Further, the plurality of sensor data values may include a location status (e.g., an indication of a location of a physical asset). The management server system may calculate the location status based on a geofence data, user data, job data, and/or job status data. Further, the plurality of sensor data values may include a utilization status (e.g., an indication of whether a physical asset is overutilized or underutilized). The management server system may calculate the utilization status based on running hours data, runtime data, and/or job data. Further, the plurality of sensor data values may include a maintenance status (e.g., an indication of whether a physical asset is due for maintenance). The management server system may calculate the maintenance status based on previous maintenance data and/or scheduled maintenance data. Further, the plurality of sensor data values may include an engine health status (e.g., an indication of the health of the engine). The management server system may calculate the engine health status based on an engine fault code data, oil pressure data, and/or coolant data. Further, the plurality of sensor data values may include a fuel status. The management server system may calculate the fuel status based on fuel level data, fuel pressure data, fuel rate data, and/or other fuel data. Further, the plurality of sensor data values may include a battery voltage status. The management server system may calculate the battery voltage status based on battery data Further, the plurality of sensor data values may include an aftertreatment status. The management server system may calculate the aftertreatment status based on diesel data (e.g., diesel exhaust fluid data, diesel particulate filter data, etc.).

The example interface 1800 may include a first section 1802 identifying the different types of data and a second section 1804 identifying the sensor data associated with each physical asset. In the example of FIG. 18, the first section 1802 includes an asset name component, a location (e.g., geofence) component, a running status component, a utilization component, a total engine hours component, a maintenance due component, and an issues component. Further, the second section 1804 includes sensor data values for each physical asset of the fleet of physical assets. In an example row 1805 of the second section 1804, the second section 1804 indicates for asset #1 a location of Jacobsonbury, Calif., a running status of running, a utilization over the last seven days of 121%, a total engine hours of 362 hours, a maintenance due status of maintenance is overdue by 18 hours, and three issues with varying levels of importance (e.g., each color may correspond to a different importance of the issue with red indicating a high importance issue, orange indicating a medium importance issue, and yellow indicating a low importance issue). In some embodiments, an element associated with a visualization of a particular physical asset in the example interface may be selectable and can cause presentation of a physical asset-specific user interface, such as the graphical user interface 1900 described below with respect to FIG. 19 and/or the graphical user interface 2000 described below with respect to FIG. 20.

FIG. 19 illustrates an example interactive graphical user interface 1900 for providing an additional visualization of a virtual representation of a particular physical asset of a fleet of physical assets based on obtained sensor data. The example interface 1900 is illustrative of an improved, customized interface that the management server system generates and presents to a user via a user computing device. As discussed above, the management server system may generate and present the example interface 1900 to a user based on the user interacting with a particular visualization of a particular physical asset.

In the example of FIG. 19, the example interface 1900 includes data identifying various characteristics of the associated physical asset based on the sensor data associated with the physical asset. To generate the visualization, the management server system may identify a portion of sensor data associated with the physical asset and may generate the visualization based on the portion of sensor data associated with the physical asset. The example interface 1900 may include a physical asset identifier 1902 identifying the physical asset corresponding to the visualization by the example interface 1900. In the example of FIG. 19, the physical asset identifier 1902 identifies Physical Asset 12345. Further, the physical asset identifier identifies the type of the physical asset as powered equipment and the location of the physical asset as Main St., Atlanta Ga.

The example interface 1900 can include data associated with the particular physical asset. The example interface 1900 may include sensor data that has been processed (e.g., aggregated, filtered, etc.) by the management server system. Specifically, the management server system may filter and/or process the sensor data to identify the sensor data associated with sensors, gateway devices, or components of the physical asset. In the example of FIG. 19, the data includes location data, gateway device data, issue data, and physical asset data.

The example interface 1900 can include a map 1912. The map 1912 can be based on the location data received from the sensors associated with the physical asset. The map 1912 a location 1914 (e.g., a real time location and/or a historical location) of the physical asset. The map 1912 and the location 1914 may be based on an identified time range, an identified physical asset, etc. For example, the map 1912 may identify a particular location of the physical asset at a particular time. In some embodiments, the management server system may update the map 1912 and/or the location 1914 in real time.

The example interface 1900 further can include an alert area 1904, a physical asset area 1906, a diagnostics area 1908, and a gateway device area 1910. The alert area 1904 may identify one or more alerts associated with the physical asset. For example, the management server system may parse (e.g., filter) the sensor data to identify alerts associated with the physical asset and may display the alerts and a time of each alert (e.g., a time of the generation of the alert, a time of display of the alert, a time of an issue related to the alert, etc.) in the alert area 1904. In some embodiments, the management server system may parse the sensor data and generate alerts for display based on the parsed sensor data. The physical asset area 1906 may identify details associated with the physical asset. The diagnostics area 1908 may identify one or more diagnostics to be performed on the physical asset. In some embodiments, a user can interact with the diagnostics area 1908 to select the diagnostics and, based on the interaction, the management server system can automatically perform the selected diagnostics. In other embodiments, a user can interact with the diagnostics area 1908 to select the diagnostics and, based on the interaction, the management server system can generate a recommendation to perform the selected diagnostics. The gateway device area 1910 may identify one or more gateway devices associated with the physical asset and a status of the one or more gateway devices.

In the example of FIG. 19, the alert area 1904 identifies a fuel pressure alert received 15 minutes ago and a coolant level low supply alert received 27 minutes ago. Further, the physical asset area 1906 identifies, for the physical asset, an equipment type of generator, a make/model/year of Acme Watt Series, a serial number of Serial Number 123221, an attribute of various attribute values, and tags of tag 1 and tag 2. It will be understood that any tags and/or attributes may be associated with the physical asset. Further, the gateway device area 1910 identifies the gateway device associated with the physical asset as gateway device 971761 with a status of connected. In some embodiments, an element associated with a visualization of a particular physical asset in the example interface 1900 (e.g., diagnostics area 1908) may be selectable and can cause presentation of a diagnostics-specific user interface, such as the graphical user interface 2000 described below with respect to FIG. 20.

FIG. 20 illustrates an example interactive graphical user interface 2000 for providing diagnostics of a particular physical asset of a fleet of physical assets based on obtained sensor data. The example interface 2000 is illustrative of an improved, customized interface that the management server system generates and presents to a user via a user computing device. As discussed above, the management server system may generate and present the example interface 2000 to a user based on the user interacting with a particular visualization of a particular physical asset and/or a particular diagnostics area.

In the example of FIG. 20, the example interface 2000 includes data identifying various characteristics of the associated physical asset based on the sensor data associated with the physical asset. The management server system may identify a portion of sensor data associated with the physical asset and may generate the example interface 2000 based on the portion of sensor data associated with the physical asset. The example interface 2000 may include a physical asset identifier 2002 identifying the physical asset corresponding to the visualization by the example interface 2000. In the example of FIG. 20, the physical asset identifier 2002 identifies Physical Asset 12345. Further, the physical asset identifier identifies the type of the physical asset as powered equipment and the location of the physical asset as Main St., Atlanta Ga.

The example interface 2000 can include data associated with the particular physical asset. The example interface 2000 may include sensor data that has been processed (e.g., aggregated, filtered, etc.) by the management server system. Specifically, the management server system may filter and/or process the sensor data to identify the sensor data associated with sensors, gateway devices, or components of the physical asset. In the example of FIG. 20, the data includes location data, gateway device data, issue data, and physical asset data.

The example interface 2000 further can include an alert area 2004, a physical asset area 2006, a diagnostics area 2008, a gateway device area 2010, and a notes area 2011. The alert area 2004 may identify one or more alerts associated with the physical asset. The physical asset area 2006 may identify data associated with the physical asset. The diagnostics area 2008 may identify one or more diagnostics to be performed on the physical asset. The gateway device area 2010 may identify one or more gateway devices associated with the physical asset and a status of the one or more gateway devices. The notes area 2011 may identify one or more notes (e.g., notes from a user, a technician, etc.)

In the example of FIG. 20, the alert area 2004 identifies two alerts. Further, the physical asset area 2006 identifies, for the physical asset, an equipment type of generator, a make/model/year of Acme Watt Series, a serial number of Serial Number 123221, an attribute of various attribute values, and tags of tag 1 and tag 2. Further, the gateway device area 2010 identifies the gateway device associated with the physical asset as gateway device 971761 with a status of connected.

Further, the example interface 2000 can include one or more areas to display sensor data values. For example, the one or more areas can display sensor data values associated with a location (e.g., geofence), a running status, a utilization, a total engine hours, a maintenance, a load, a job, issues, etc. In the example of FIG. 20, the example interface 2000 includes a running status area 2012, a maintenance area 2014, a utilization area 2016, a job area 2018, and a load area 2020. The running status area 2012 can identify a current status of the physical asset (e.g., whether the physical asset is running), a historical status of the physical asset, and/or a total engine hours (e.g., the number of hours for which the physical asset (the engine of the physical asset) has been running). The maintenance area 2014 can identify a range (e.g., a time range, a mile range, an operation range, etc.) before maintenance is due, a next service date, and/or a next service time period. The utilization area 2016 can identify a time on site, a utilization, a historical utilization, and/or an active time for the physical asset. The job area 2018 may identify a status of a job associated with the physical asset, a location of the job, and/or a job identifier. The load area 2020 may identify a current load, a time period for which the physical asset is underload, and/or a time period for which the physical asset is overload.

In the example of FIG. 20, the running status area 2012 indicates that the physical asset is running and has a total engine hours of 1,802 hours. The maintenance area 2014 indicates that the physical asset has 234 miles remaining before maintenance is due and the next service is due Jan. 14, 2022 or in 11 hours. The utilization area 2016 indicates that the physical asset has been at the current site for 30 hours, has an average utilization of 89%, and an active time of 74 hours. The job area 2018 indicates that the physical asset is on site and the associated has a job identifier of 4043. The load area 2020 indicates that the physical asset has a current load of 61%, is loaded 75% of a particular time period, and is underloaded 25% of the particular time period.

Example Embodiments of Parsing Sensor Data and Generating User Interfaces

Figure 21:
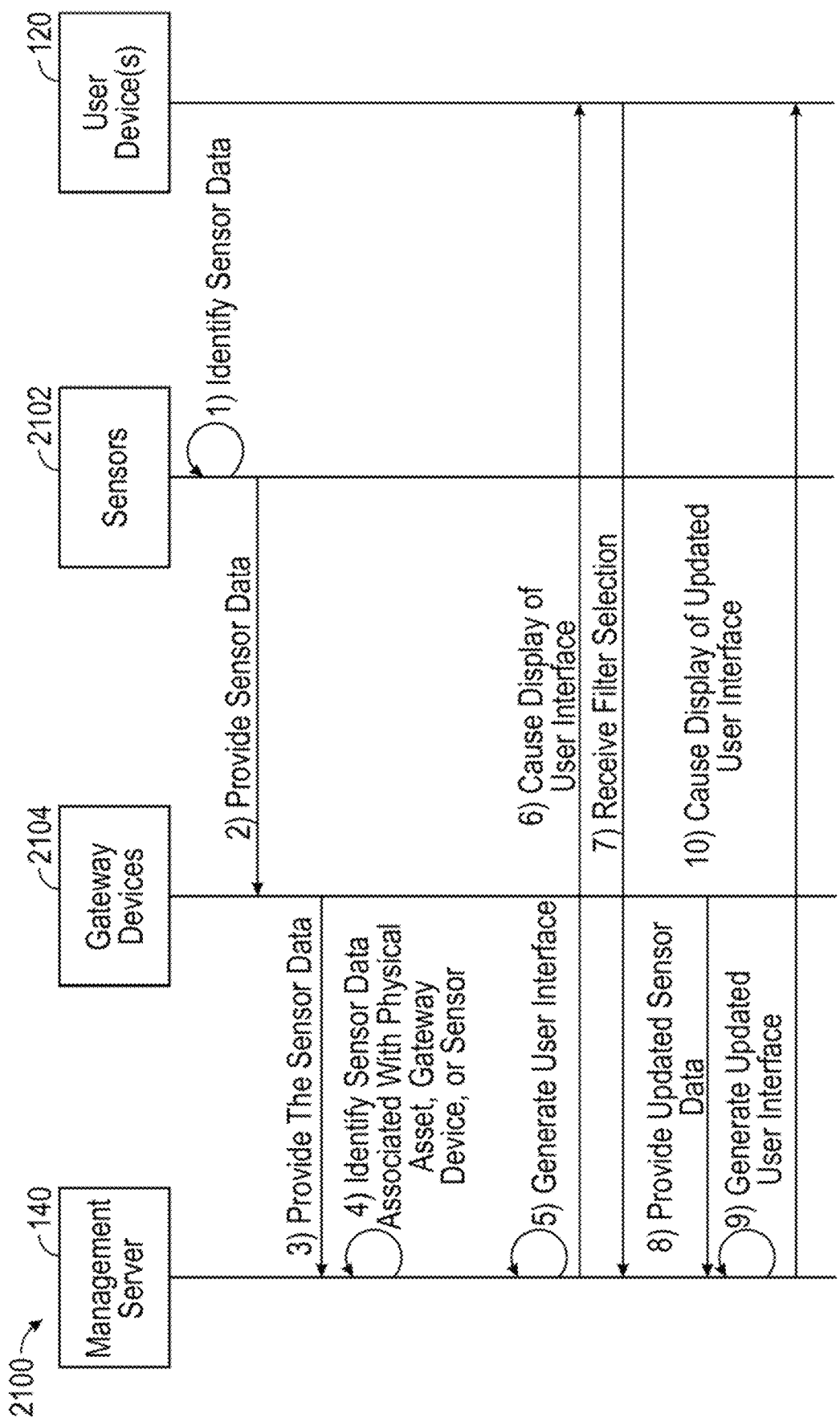
FIG. 21 illustrates an example flow diagram for obtaining sensor data and generating user interfaces, according to various embodiments of the present disclosure.

FIG. 21 depicts interactions among various components shown in FIG. 1 for causing displays of updated inter in accordance with aspects of the present disclosure. The environment 2100 may include various components implemented in a configuration as identified in FIG. 1. The environment 2100 may include a management server 140, gateway device(s) 2104, sensor(s) 2102, and user device(s) 120. It will be understood that the environment 2100 may include more, less, or different components.

As shown in FIG. 21 at [1], the sensors 2102 identify (e.g., generate) sensor data. The sensors 2102 may include a plurality of sensors associated with a physical asset (e.g., a vehicle). For example, the sensors 2102 may include one or more camera sensors, one or more audio sensors, one or more video sensors, etc. The sensors 2102 may generate the sensor data over a period of time. Therefore, the sensors 2102 can identify the sensor data.

At [2], the sensors 2102 provide sensor data to the gateway devices 2104. For example, the gateway devices 2104 can identify sensor data associated with the sensors 2102 (e.g., identify sensor data stored in a data store). In some embodiments, the gateway devices 2104 may receive the sensor data via a wired or a wireless connection. For example, the gateway devices 2104 may receive sensor data via one or more sensors that are integrated into the gateway devices 2104 and/or via a network connection. Further, the gateway devices 2104 may receive the sensor data as streaming data or as non-streaming data. Therefore, the gateway devices 2104 can identify the sensor data.

At [3], the gateway devices 2104 provide the sensor data to the management server 140. For example, the gateway devices 2104 can provide the sensor data periodically or aperiodically to the management server 140. Further, the gateway devices 2104 can provide the sensor data as batch data or as streaming data. In some embodiments, the gateway devices 2104 can provide the sensor data to the management server 140 in real time as the sensors 2102 generate the sensor data. Therefore, the gateway devices 2104 can provide the sensor data to the management server 140.

At [4], the management server 140 identifies sensor data associated with a physical asset (e.g., a particular vehicle), a gateway device, or a sensor. Further, the management server 140 can identify sensor data associated with a fleet of physical assets, multiple gateway devices, or multiple sensors. The management server 140 may identify sensor data based on metadata associated with the sensor data. For example, the management server 140 can utilize metadata that identifies a source of the sensor data, a gateway device used to route the sensor data, a physical asset associated with the sensor data, or any other identifying information to identify one or more physical assets, sensors, or gateway devices associated with the sensor data. The management server 140 may identify a particular portion of sensor data by parsing (e.g., filtering) the sensor data. Therefore, the management server 140 can identify the sensor data.

At [5], the management server 140 generates a user interface. Based on identifying the sensor data associated with one or more physical assets, one or more gateway devices, and/or one or more sensors, the management server 140 can identify particular physical assets, gateway devices, or sensors. Further, the management server 140 can generate virtual representations of the physical assets, the gateway devices, or sensors. The management server 140 can include virtualizations of the virtual representations in the user interface. Therefore, the management server 140 can generate the user interface.

At [6], the management server 140 causes display of the user interface at the user devices 120. The management server 140 can route the user interface to the user devices 120. Further, the management server 140 can route instructions that cause the user devices 120 to display the user interface (e.g., via a display of the user devices 120). Therefore, the management server 140 can cause display of the user interface at the user devices 120.

At [7], the management server 140 receives a filter selection from the user devices 120. The management server 140 may cause display of one or more filters at the user devices 120. For example, the management server 140 may cause display of the one or more filters via the user interface. In some embodiments, the management server 140 can cause display of the one or more filters in a separate user interface. The one or more filters may include a time range filter, a location filter, a physical asset filter, a gateway device filter, a sensor filter, an issue filter (e.g., a filter to identify physical assets with an issue or a particular issue), a maintenance filter (e.g., a filter to identify physical assets with maintenance due in a particular time period, maintenance performed in a particular time period), and/or a sensor data filter (e.g., a filter to identify physical assets associated with particular sensor data). Therefore, the management server 140 can receive the filter selection.

At [8], the gateway devices 150 provide updated sensor data to the management server. For example, the gateway devices 2104 can provide updated sensor data as the gateway devices 2104 receive the updated sensor data. Therefore, the gateway devices 2104 can provide the updated sensor data to the management server 140.

At [9], the management server 140 generates an updated user interface. Based on receiving the filter selection, the management server 140 can filter the sensor data based on the selected filter. In some embodiments, the management server 140 can filter sensor data (e.g., historical sensor data and/or updated sensor data) in real time. Further, based on receiving the updated sensor data and the filter selection, the management server 140 can generate a user interface that includes a visualization of a virtual representation of one or more physical assets, one or more gateway devices, and/or one or more sensors (e.g., based on the filter). Therefore, the management server 140 can generate the updated user interface.

At [10], the management server 140 causes display of the updated user interface at the user devices 120. The management server 140 can route the updated user interface to the user devices 120. Further, the management server 140 can route instructions that cause the user devices 120 to update the user interface displayed by the user devices 120 (e.g., replace the user interface with the updated user interface. Therefore, the management server 140 can cause display of the updated user interface at the user devices 120.

Example Method of Generating Updated User Interfaces

Figure 22:
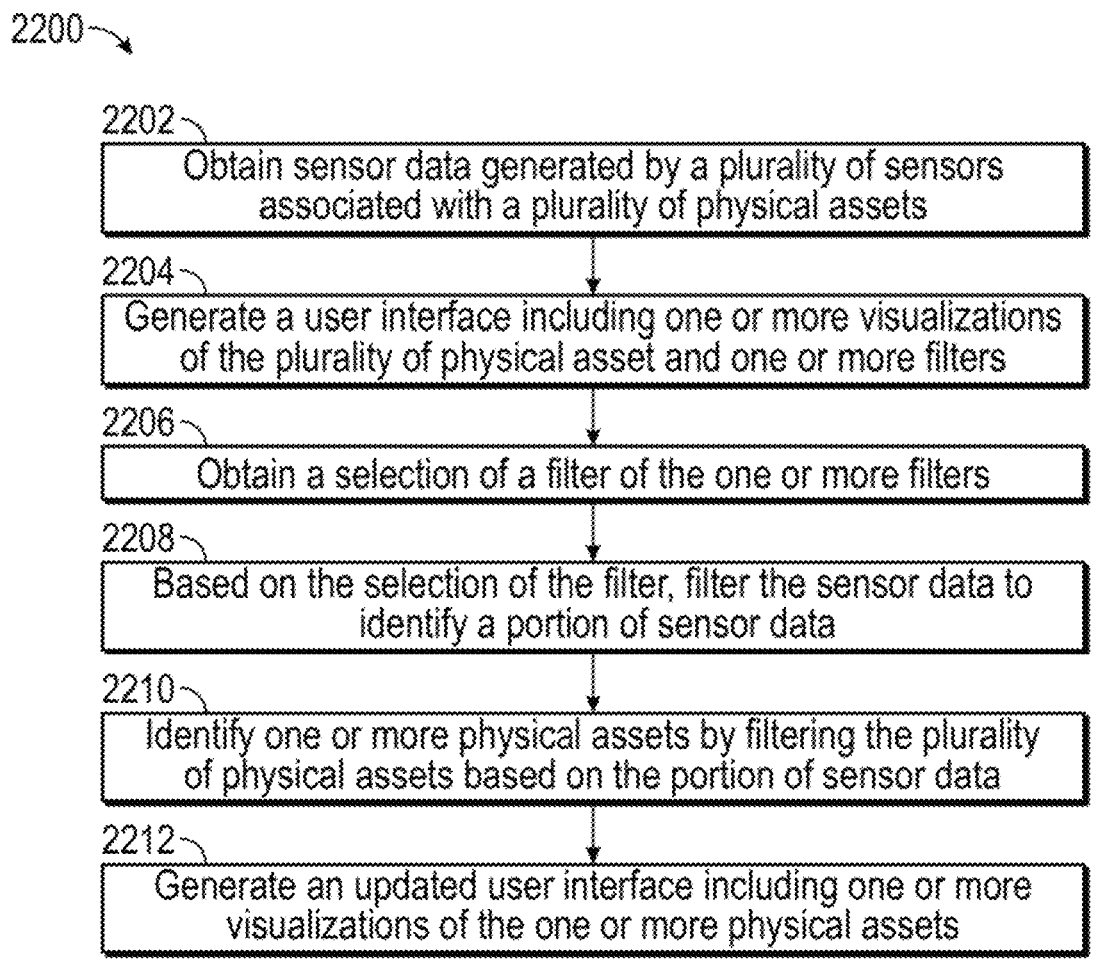
FIG. 22 illustrates an example method of filtering physical assets based on sensor data, according to various embodiments of the present disclosure.

FIG. 22 illustrates an example method 2200 of filtering sensor data to identify particular physical assets and generating an updated user interface, according to various embodiments described herein.

At block 2202, the management server system obtains sensor data generated by a plurality of sensors associated with a plurality of physical assets. The management server system can obtain the sensor data from a plurality of gateway devices (e.g., asset devices, asset gateway devices, vehicle devices, vehicle gateway devices, gateway systems, etc.). The sensor data may be associated with a plurality of images of a plurality of scenes. The sensor data may identify one or more objects of an image. In some embodiments, the sensor data may include streaming sensor data. In other embodiments, the sensor data may include batch sensor data. Further, the sensor data may be associated with a noisy environment and/or an obstructed environment. The management server system may store the sensor data in a data store of the management server system. Therefore, the management server system obtains the sensor data.

At block 2204, the management server system generates a user interface including one or more visualizations of the plurality of physical assets and one or more filters. The management server system can cause display of the user interface via a user computing device. The one or more visualizations may identify one or more characteristics of the plurality of physical assets based on the sensor data. The one or more characteristics may include a location of a physical asset, a status of a physical asset, a utilization of a physical asset, a job associated with the physical asset, maintenance information associated with the physical asset, a battery voltage associated with the physical asset, fuel information associated with the physical asset, a status of an engine of the physical asset, a gateway device associated with the physical asset, a status of the gateway device associated with the physical asset, issues associated with a physical asset, and/or any other information identifying a sensor, a gateway device, or a physical asset. Further, the one or more visualizations may be pictorial representations of the plurality of physical assets. The one or more filters may be filters of the plurality of characteristics. For example, a filter can identify a selection of a particular characteristic. In some embodiments, the plurality of characteristics may include temporal characteristics over the period of time.

The management server system may obtain rule information identifying rules (e.g., from a user computing device). The rules may indicate a manner of display the one or more visualizations. The management server system may generate the user interface based on the rules. Therefore, the management server system generates the user interface.

At block 2206, the management server system obtains a selection of a filter of the one or more filters. Based on causing display of the user interface, the management server system can obtain the selection of the filter from the user computing device. The management server system may obtain the selection of the filter as an input via a drop-down menu, a search bar, or an interactive parameter (e.g., a clickable parameter). For example, the filter may include a search term (e.g., a search query term), a field, a field value, etc. In some embodiments, the management server system may obtain a selection of a physical asset from the plurality of physical assets. Further, the management server system can generate an additional user interface. The additional user interface may indicate raw machine data associated with a physical asset (e.g., a sensor of a physical asset). The additional user interface may indicate a location of a physical asset. For example the additional user interface may include a map and indicate a location of the physical asset relative to the map. Further, the management server system may determine temporal characteristics (e.g., location data over time) of the plurality of physical assets based on the sensor data. In some embodiments, the additional user interface may include a map and indicate a plurality of locations of the physical asset over the period of time relative to the map based on the temporal characteristics. Therefore, the management server system obtains the selection of the filter.

At block 2208, the management server system, based on the selection of the filter, filters the sensor data to identify a portion of sensor data. The management server system may filter the sensor data using the filter to identify a portion of sensor data associated with a selected characteristic. To filter the sensor data, the management server system may query the sensor data using the filter. For example, the management server system may search the sensor data based on a search term included in the filter. In response to filtering the sensor data (e.g., searching the sensor data), the management server system can identify the portion of sensor data. Therefore, the management server system filters the sensor data.

At block 2210, the management server system identifies one or more physical assets by filtering the plurality of physical assets based on the portion of sensor data. The one or more physical assets may be associated may be associated with the portion of sensor data. For example, sensors associated with the one or more physical assets may generate the portion of sensor data. In some embodiments, the management server system can query a plurality of physical assets to identify the one or more physical assets. Therefore, the management server system identifies the one or more physical assets.

At block 2212, the management server system generates an updated user interface including one or more visualizations of the one or more physical assets. The management server system can cause display of the updated user interface via the user computing device. In some embodiments, the management server system can generate an updated user interface that identifies issues with physical assets. The management server system can determine one or more issues associated with a physical asset based on the sensor data. The management server system can cause display of the issues via the updated user interface. Further, the management server system can cause display of an identifier of a source of the issue (e.g., a particular sensor). In some embodiments, the management server system can obtain a diagnostic trouble code associated with the issues from an asset gateway device and cause display of the diagnostic trouble code. In other embodiments, the management server system can determine the diagnostic trouble code (e.g., based on information received from the asset gateway device) and cause display of the diagnostic trouble code. Further, the management server system can obtain an alert and cause display of the alert via the additional user interface based on the sensor data. Therefore, the management server system generates the updated user interface.

In some embodiments, the management server system can generate a report based on filtering the plurality of physical assets. For example, the management server system can automatically generate a report identifying temperature data associated with a physical asset. The management server system may automatically generate the report and provide the report to a system.

Example Method of Updating Visualizations of Vehicles

Figure 23:
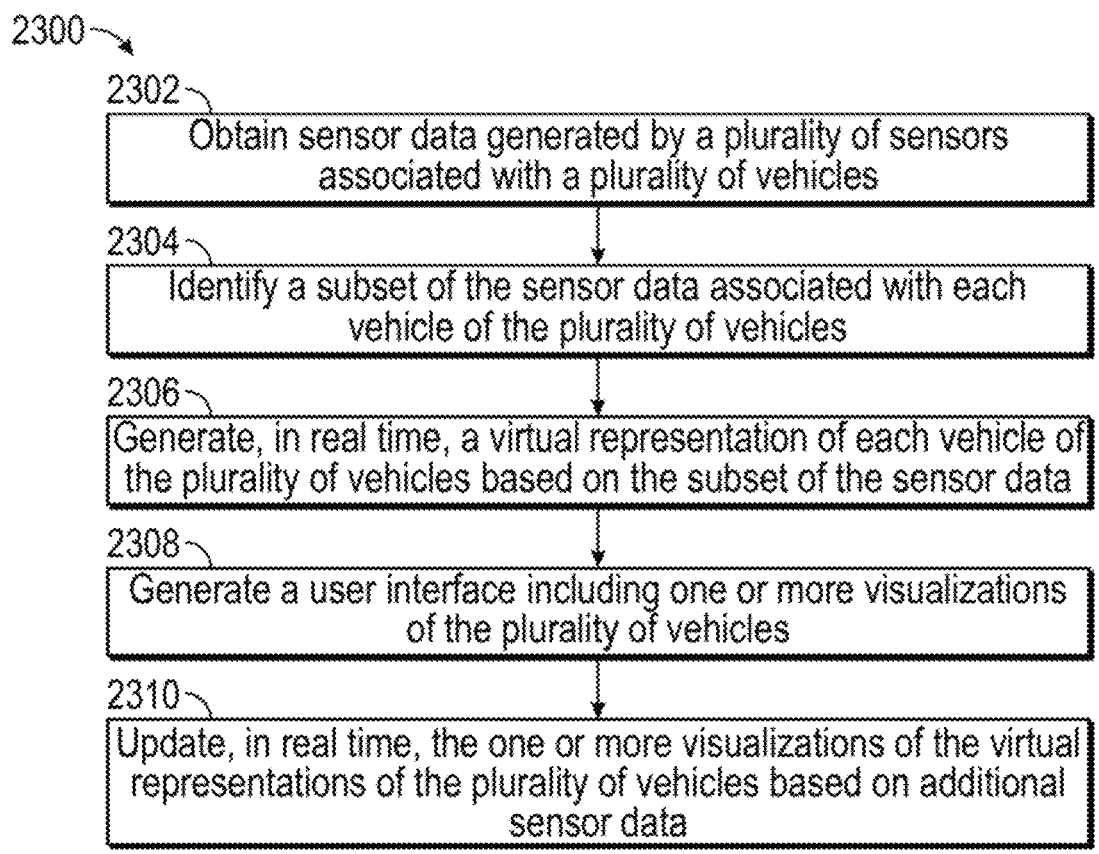
FIG. 23 illustrates an example method of updating visual representations of physical assets in real time, according to various embodiments of the present disclosure.

FIG. 23 illustrates an example method 2300 of generating virtual representations of a vehicle and updating the virtual representations in real time, according to various embodiments described herein. It will be understood that while the method 2300 references an implementation with respect to a plurality of vehicles, the method 2300 may be implemented with respected to any physical asset.

At block 2302, the management server system obtains sensor data generated by a plurality of sensors associated with a plurality of vehicles (e.g., a plurality of refrigerated trailers). The management server system can obtain the sensor data from a plurality of gateway devices (e.g., vehicle devices, vehicle gateway devices, gateway systems, etc.). Further, the sensor data may be generated by a plurality of sensors. For example, the sensor data may be generated by one or more of a temperature sensor, a lock sensor, a humidity sensor, a cargo monitor sensor, a latch sensor, a door monitor sensor, or any other sensor. In some embodiments, the sensors may transmit sensor data to a gateway device via a first network and the gateway device may transmit the sensor data (e.g., a subset of the sensor data) to the management server system via a second, different network. The sensor data may be associated with a plurality of images of a plurality of scenes. The sensor data may identify one or more objects of an image. In some embodiments, the sensor data may include streaming sensor data. In other embodiments, the sensor data may include batch sensor data. Further, the sensor data may be associated with a noisy environment and/or an obstructed environment. The management server system may store the sensor data in a data store of the management server system. Therefore, the management server system obtains the sensor data.

At block 2304, the management server system identifies a subset of the sensor data associated with each vehicle of the plurality of vehicles. The management server system may filter the sensor data to identify sensor data associated with each vehicle. Therefore, the management server system identifies the subset of the sensor data.

At block 2306, the management server system generates, in real time, a virtual representation of each vehicle of the plurality of vehicles based on the subset of the sensor data. The virtual representation may be a pictorial representation of a vehicle. Therefore, the management server system generates the virtual representation of each vehicle.

At block 2308, the management server system generates a user interface including one or more visualizations of the plurality of vehicles. The one or more visualizations may identify one or more sections (e.g., zones) of each vehicle. Further, the one or more visualizations of the virtual representations may identify one or more characteristics of each of the plurality of vehicles. The one or more characteristics may include a location of a vehicle, a temperature of a vehicle, a status of a vehicle, a job associated with a vehicle, maintenance information associated with a vehicle, a battery voltage associated with a vehicle, fuel information associated with a vehicle, a status of an engine of the vehicle, a gateway device associated with the vehicle, a status of the gateway device associated with the vehicle, issues associated with a vehicle, and/or any other information identifying a sensor, a gateway device, or a vehicle. In some embodiments, the one or more characteristics may be temporal characteristics (e.g., characteristics associated with a period of time). Further, the one or more visualizations identify characteristics associated with each zone of a vehicle (e.g., temperatures of each zone of a vehicle). The one or more visualizations may be pictorial representations of the plurality of vehicles. The management server system may route the user interface to a user computing device and cause display of the user interface.

In some embodiments, the management server system may compare a subset of sensor data associated with a vehicle, for each vehicle to a particular threshold value associated with the vehicle or a particular group of vehicles including the vehicle. For example, the management server system can compare temperature data associated with the vehicle to temperature threshold values. Based on the comparison, the management server system can generate comparison information (e.g., identifying vehicles associated with sensor data that did not satisfy the threshold values). Further, the management server system can route the comparison information to a user computing device. Therefore, the management server system generates the user interface.

At block 2310, the management server system updates, in real time, the one or more visualizations of the virtual representations of the plurality of vehicles based on additional sensor data. For example, the management server system can update the one or more visualizations based on obtaining the additional sensor data from the plurality of gateway devices. In some embodiments, the management server system may obtain a selection of a vehicle from the plurality of vehicles. Further, the management server system can generate an additional user interface. The additional user interface may indicate raw machine data associated with a vehicle (e.g., a sensor of a vehicle). The additional user interface may indicate a location of a vehicle. For example the additional user interface may include a map and indicate a location of the vehicle relative to the map. Further, the management server system may determine temporal characteristics (e.g., location data over time) of the plurality of vehicles based on the sensor data. In some embodiments, the additional user interface may include a map and indicate a plurality of locations of the vehicle over the period of time relative to the map based on the temporal characteristics. Further, the additional user interface may include a plurality of temperatures of the vehicle (e.g., a plurality of temperatures of different sections of the vehicle) over the period of time relative to the map. Each of the plurality of temperatures may be associated with a particular location of the map. Further, the management server system can obtain an alert and cause display of the alert via the additional user interface based on the sensor data. Therefore, the management server system updates the one or more visualizations.

Additional Implementation Details and Embodiments

Various embodiments of the present disclosure may be a system, a method, and/or a computer program product at any possible technical detail level of integration. The computer program product may include a computer readable storage medium (or mediums) having computer readable program instructions thereon for causing a processor to carry out aspects of the present disclosure.

For example, the functionality described herein may be performed as software instructions are executed by, and/or in response to software instructions being executed by, one or more hardware processors and/or any other suitable computing devices. The software instructions and/or other executable code may be read from a computer readable storage medium (or mediums).

The computer readable storage medium can be a tangible device that can retain and store data and/or instructions for use by an instruction execution device. The computer readable storage medium may be, for example, but is not limited to, an electronic storage device (including any volatile and/or non-volatile electronic storage devices), a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a solid state drive, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions (as also referred to herein as, for example, "code," "instructions," "module," "application," "software application," and/or the like) for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Java, C++, or the like, and procedural programming languages, such as the "C" programming language or similar programming languages. Computer readable program instructions may be callable from other instructions or from itself, and/or may be invoked in response to detected events or interrupts. Computer readable program instructions configured for execution on computing devices may be provided on a computer readable storage medium, and/or as a digital download (and may be originally stored in a compressed or installable format that requires installation, decompression or decryption prior to execution) that may then be stored on a computer readable storage medium. Such computer readable program instructions may be stored, partially or fully, on a memory device (e.g., a computer readable storage medium) of the executing computing device, for execution by the computing device. The computer readable program instructions may execute entirely on a user's computer (e.g., the executing computing device), partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart(s) and/or block diagram(s) block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks. For example, the instructions may initially be carried on a magnetic disk or solid state drive of a remote computer. The remote computer may load the instructions and/or modules into its dynamic memory and send the instructions over a telephone, cable, or optical line using a modem. A modem local to a server computing system may receive the data on the telephone/cable/optical line and use a converter device including the appropriate circuitry to place the data on a bus. The bus may carry the data to a memory, from which a processor may retrieve and execute the instructions. The instructions received by the memory may optionally be stored on a storage device (e.g., a solid state drive) either before or after execution by the computer processor.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. In addition, certain blocks may be omitted in some implementations. The methods and processes described herein are also not limited to any particular sequence, and the blocks or states relating thereto can be performed in other sequences that are appropriate.

It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. For example, any of the processes, methods, algorithms, elements, blocks, applications, or other functionality (or portions of functionality) described in the preceding sections may be embodied in, and/or fully or partially automated via, electronic hardware such application-specific processors (e.g., application-specific integrated circuits (ASICs)), programmable processors (e.g., field programmable gate arrays (FPGAs)), application-specific circuitry, and/or the like (any of which may also combine custom hard-wired logic, logic circuits, ASICs, FPGAs, etc. with custom programming/execution of software instructions to accomplish the techniques).

Any of the above-mentioned processors, and/or devices incorporating any of the above-mentioned processors, may be referred to herein as, for example, "computers," "computer devices," "computing devices," "hardware computing devices," "hardware processors," "processing units," and/or the like. Computing devices of the above-embodiments may generally (but not necessarily) be controlled and/or coordinated by operating system software, such as Mac OS, iOS, Android, Chrome OS, Windows OS (e.g., Windows XP, Windows Vista, Windows 7, Windows 8, Windows 10, Windows Server, etc.), Windows CE, Unix, Linux, SunOS, Solaris, Blackberry OS, VxWorks, or other suitable operating systems. In other embodiments, the computing devices may be controlled by a proprietary operating system. Conventional operating systems control and schedule computer processes for execution, perform memory management, provide file system, networking, I/O services, and provide a user interface functionality, such as a graphical user interface ("GUI"), among other things.

As described above, in various embodiments certain functionality may be accessible by a user through a web-based viewer (such as a web browser), or other suitable software program. In such implementations, the user interface may be generated by a server computing system and transmitted to a web browser of the user (e.g., running on the user's computing system). Alternatively, data (e.g., user interface data) necessary for generating the user interface may be provided by the server computing system to the browser, where the user interface may be generated (e.g., the user interface data may be executed by a browser accessing a web service and may be configured to render the user interfaces based on the user interface data). The user may then interact with the user interface through the web-browser. User interfaces of certain implementations may be accessible through one or more dedicated software applications. In certain embodiments, one or more of the computing devices and/or systems of the disclosure may include mobile computing devices, and user interfaces may be accessible through such mobile computing devices (for example, smartphones and/or tablets).

Many variations and modifications may be made to the above-described embodiments, the elements of which are to be understood as being among other acceptable examples. All such modifications and variations are intended to be included herein within the scope of this disclosure. The foregoing description details certain embodiments. It will be appreciated, however, that no matter how detailed the foregoing appears in text, the systems and methods can be practiced in many ways. As is also stated above, it should be noted that the use of particular terminology when describing certain features or aspects of the systems and methods should not be taken to imply that the terminology is being re-defined herein to be restricted to including any specific characteristics of the features or aspects of the systems and methods with which that terminology is associated.

Conditional language, such as, among others, "can," "could," "might," or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

The term "substantially" when used in conjunction with the term "real-time" forms a phrase that will be readily understood by a person of ordinary skill in the art. For example, it is readily understood that such language will include speeds in which no or little delay or waiting is discernible, or where such delay is sufficiently short so as not to be disruptive, irritating, or otherwise vexing to a user.

Conjunctive language such as the phrase "at least one of X, Y, and Z," or "at least one of X, Y, or Z," unless specifically stated otherwise, is to be understood with the context as used in general to convey that an item, term, etc. may be either X, Y, or Z, or a combination thereof. For example, the term "or" is used in its inclusive sense (and not in its exclusive sense) so that when used, for example, to connect a list of elements, the term "or" means one, some, or all of the elements in the list. Thus, such conjunctive language is not generally intended to imply that certain embodiments require at least one of X, at least one of Y, and at least one of Z to each be present.

The term "a" as used herein should be given an inclusive rather than exclusive interpretation. For example, unless specifically noted, the term "a" should not be understood to mean "exactly one" or "one and only one"; instead, the term "a" means "one or more" or "at least one," whether used in the claims or elsewhere in the specification and regardless of uses of quantifiers such as "at least one," "one or more," or "a plurality" elsewhere in the claims or specification.

The term "comprising" as used herein should be given an inclusive rather than exclusive interpretation. For example, a general purpose computer comprising one or more processors should not be interpreted as excluding other computer components, and may possibly include such components as memory, input/output devices, and/or network interfaces, among others.

While the above detailed description has shown, described, and pointed out novel features as applied to various embodiments, it may be understood that various omissions, substitutions, and changes in the form and details of the devices or processes illustrated may be made without departing from the spirit of the disclosure. As may be recognized, certain embodiments of the inventions described herein may be embodied within a form that does not provide all of the features and benefits set forth herein, as some features may be used or practiced separately from others. The scope of certain inventions disclosed herein is indicated by the appended claims rather than by the foregoing description. All changes which come within the meaning and range of equivalency of the claims are to be embraced within their scope.

What is claimed is:

1. A management server system comprising:
a computer readable storage medium having program instructions embodied therewith; and
one or more processors configured to execute the program instructions to cause the management server system to:
obtain, from a plurality of gateway devices, sensor data generated by a plurality of sensors, wherein the plurality of sensors are associated with a plurality of vehicles;
identify, for each vehicle of the plurality of vehicles, a subset of the sensor data associated with a particular vehicle;
generate, in real time, for each vehicle of the plurality of vehicles, a virtual representation of the particular vehicle based at least in part on the subset of the sensor data associated with the particular vehicle;
generate a user interface, wherein the user interface comprises one or more visualizations of virtual representations of the plurality of vehicles, and wherein the one or more visualizations of the virtual representations identify, for each vehicle of the plurality of vehicles, 1) one or more characteristics of the particular vehicle and 2) a plurality of zones of the particular vehicle, each zone of the plurality of zones associated with a particular subset of the one or more characteristics of the particular vehicle, wherein the one or more characteristics of each of the plurality of vehicles comprise a temperature characteristic of each of the plurality of vehicles; and
update, in real time, the one or more visualizations of the virtual representations of the plurality of vehicles based at least in part on obtaining additional sensor data from the plurality of gateway devices.

2. The management server system of claim 1, wherein the one or more processors are further configured to execute the program instructions to cause the management server system to:

compare, for each vehicle of the plurality of vehicles, the subset of the sensor data associated with the particular vehicle to a particular threshold value associated with the particular vehicle, wherein the user interface further comprises comparison information identifying one or more vehicles of the plurality of vehicles, wherein one or more subsets of the sensor data associated with the one or more vehicles does not satisfy one or more threshold values associated with the one or more vehicles.

3. The management server system of claim 1, wherein the plurality of vehicles comprises a plurality of refrigerated trailers.

4. The management server system of claim 1, wherein the one or more processors are further configured to execute the program instructions to cause the management server system to store the sensor data in a data store of the management server system.

5. The management server system of claim 1, wherein the one or more visualizations of the virtual representations comprise a pictorial representation of each of the plurality of vehicles.

6. The management server system of claim 1, wherein the temperature characteristic of each of the plurality of vehicles identifies a temperature of each of the plurality of vehicles, wherein the one or more characteristics of each of the plurality of vehicles further comprises at least one of:
  a location characteristic of a vehicle;
  a status characteristic of the vehicle identifying a status of the vehicle;
  a job characteristic of the vehicle identifying a job associated with the vehicle;
  a maintenance characteristic of the vehicle identifying maintenance information associated with the vehicle;
  a battery voltage characteristic of the vehicle identifying a battery voltage of the vehicle;
  a fuel characteristic of the vehicle identifying fuel information associated with the vehicle;
  a status characteristic of the vehicle identifying a status of an engine of the vehicle;
  a characteristic of a gateway device of the vehicle;
  a status characteristic of the gateway device of the vehicle identifying a status of the gateway device of the vehicle; or
  a characteristic of the vehicle comprising an identifier of the vehicle.

7. The management server system of claim 1, wherein the one or more processors are further configured to execute the program instructions to cause the management server system to:
  obtain a selection of a vehicle of the plurality of vehicles; and
  generate an additional user interface, wherein the additional user interface indicates a location of the vehicle.

8. The management server system of claim 1, wherein the one or more processors are further configured to execute the program instructions to cause the management server system to:
  obtain a selection of a vehicle of the plurality of vehicles; and
  generate an additional user interface, wherein the additional user interface comprises a map, and wherein the additional user interface indicates a location of the vehicle relative to the map.

9. The management server system of claim 1, wherein the plurality of sensors generate the sensor data over a period of time, wherein the one or more processors are further configured to execute the program instructions to cause the management server system to:
  obtain a selection of a vehicle of the plurality of vehicles;
  determine one or more temporal characteristics of the vehicle based at least in part on the sensor data; and
  generate an additional user interface, wherein the additional user interface comprises a map, and wherein the additional user interface indicates a plurality of locations of the vehicle over the period of time relative to the map based at least in part on the one or more temporal characteristics.

10. The management server system of claim 1, wherein the plurality of sensors generate the sensor data over a period of time, wherein the one or more processors are further configured to execute the program instructions to cause the management server system to:
  obtain a selection of a vehicle of the plurality of vehicles;
  determine one or more temporal characteristics of the vehicle based at least in part on the sensor data; and
  generate an additional user interface, wherein the additional user interface comprises a map, and wherein the additional user interface indicates a plurality of locations and a plurality of temperatures of the vehicle over the period of time relative to the map based at least in part on the one or more temporal characteristics, each of the plurality of temperatures associated with a particular location of the plurality of locations.

11. The management server system of claim 1, wherein the plurality of sensors generate the sensor data over a period of time, wherein the one or more processors are further configured to execute the program instructions to cause the management server system to:
  determine one or more temporal characteristics of a vehicle based at least in part on the sensor data, wherein the one or more visualizations of the virtual representations identify the one or more temporal characteristics of the vehicle over the period of time.

12. The management server system of claim 1, wherein the one or more processors are further configured to execute the program instructions to cause the management server system to:
  obtain a selection of a vehicle of the plurality of vehicles; and
  generate an additional user interface, wherein the additional user interface identifies raw machine data associated with the vehicle.

13. The management server system of claim 1, wherein the one or more processors are further configured to execute the program instructions to cause the management server system to:
  obtain one or more alerts; and
  generate an additional user interface, wherein the additional user interface identifies an alert of the one or more alerts based at least in part on the sensor data.

14. The management server system of claim 1, wherein the one or more processors are further configured to execute the program instructions to cause the management server system to:
  cause display, via a user computing device, of the user interface.

15. The management server system of claim 1, wherein the plurality of sensors comprises at least one of:
 a temperature sensor;
 a lock sensor;
 a humidity sensor;
 a cargo monitor sensor;
 a latch sensor; or
 a door monitor sensor.

16. The management server system of claim 1, wherein a subset of the plurality of sensors and a gateway device of the plurality of gateway devices are associated with a vehicle, wherein the subset of the plurality of sensors transmit the subset of the sensor data to the gateway device via a first network, and wherein the one or more processors are further configured to execute the program instructions to cause the management server system to obtain, from the gateway device, the subset of the sensor data via a second network.

17. The management server system of claim 1, wherein the one or more processors are further configured to execute the program instructions to cause the management server system to:
 compare, for each vehicle of the plurality of vehicles, the subset of the sensor data associated with the particular vehicle to a particular threshold value associated with the particular vehicle;
 generate comparison information based on comparing, for each vehicle of the plurality of vehicles, the subset of the sensor data associated with the particular vehicle to the particular threshold value; and
 route, to a user computing device, the comparison information.

18. A computer-implemented method comprising:
 obtaining, from a plurality of gateway devices, sensor data generated by a plurality of sensors, wherein the plurality of sensors are associated with a plurality of vehicles;
 identifying, for each vehicle of the plurality of vehicles, a subset of the sensor data associated with a particular vehicle;
 generating, in real time, for each vehicle of the plurality of vehicles, a virtual representation of the particular vehicle based at least in part on the subset of the sensor data associated with the particular vehicle;
 generating a user interface, wherein the user interface comprises one or more visualizations of virtual representations of the plurality of vehicles, and wherein the one or more visualizations of the virtual representations identify one or more characteristics of each of the plurality of vehicles, wherein the one or more characteristics of each of the plurality of vehicles comprise a temperature characteristic of each of the plurality of vehicles;
 updating, in real time, the one or more visualizations of the virtual representations of the plurality of vehicles based at least in part on obtaining additional sensor data from the plurality of gateway devices;
 comparing, for each vehicle of the plurality of vehicles, the subset of the sensor data associated with the particular vehicle to a particular threshold value associated with the particular vehicle;
 generating comparison information based on comparing, for each vehicle of the plurality of vehicles, the subset of the sensor data associated with the particular vehicle to the particular threshold value; and
 routing, to a user computing device, the comparison information.

19. A management server system comprising:
 a computer readable storage medium having program instructions embodied therewith; and
 one or more processors configured to execute the program instructions to cause the management server system to:
  obtain, from a plurality of gateway devices, sensor data generated by a plurality of sensors over a period of time, wherein the plurality of sensors are associated with a plurality of vehicles;
  identify, for each vehicle of the plurality of vehicles, a subset of the sensor data associated with a particular vehicle;
  generate, in real time, for each vehicle of the plurality of vehicles, a virtual representation of the particular vehicle based at least in part on the subset of the sensor data associated with the particular vehicle;
  generate a user interface, wherein the user interface comprises one or more visualizations of virtual representations of the plurality of vehicles, and wherein the one or more visualizations of the virtual representations identify one or more characteristics of each of the plurality of vehicles, wherein the one or more characteristics of each of the plurality of vehicles comprise a temperature characteristic of each of the plurality of vehicles;
  update, in real time, the one or more visualizations of the virtual representations of the plurality of vehicles based at least in part on obtaining additional sensor data from the plurality of gateway devices;
  obtain a selection of a vehicle of the plurality of vehicles;
  determine one or more temporal characteristics of the vehicle based at least in part on the sensor data; and
  generate an additional user interface, wherein the additional user interface comprises a map, and wherein the additional user interface indicates a plurality of locations of the vehicle over the period of time relative to the map based at least in part on the one or more temporal characteristics.

20. A management server system comprising:
 a computer readable storage medium having program instructions embodied therewith; and
 one or more processors configured to execute the program instructions to cause the management server system to:
  obtain, from a plurality of gateway devices, sensor data generated by a plurality of sensors, wherein the plurality of sensors are associated with a plurality of vehicles;
  identify, for each vehicle of the plurality of vehicles, a subset of the sensor data associated with a particular vehicle;
  generate, in real time, for each vehicle of the plurality of vehicles, a virtual representation of the particular vehicle based at least in part on the subset of the sensor data associated with the particular vehicle;
  generate a user interface, wherein the user interface comprises one or more visualizations of virtual representations of the plurality of vehicles, and wherein the one or more visualizations of the virtual representations identify one or more characteristics of each of the plurality of vehicles, wherein the one or more characteristics of each of the plurality of vehicles comprise a temperature characteristic of each of the plurality of vehicles;
  compare, for each vehicle of the plurality of vehicles, the subset of the sensor data associated with the particular vehicle to a particular threshold value associated with the particular vehicle, wherein the user interface further comprises comparison information identifying one or more vehicles of the plurality of vehicles, wherein one or more subsets of the sensor data associated with the one or more vehicles does not satisfy one or more threshold values associated with the one or more vehicles; and update, in real time, the one or more visualizations of the virtual representations of the plurality of vehicles based at least in part on obtaining additional sensor data from the plurality of gateway devices.

\* \* \* \* \*